(12) United States Patent
Lee et al.

(10) Patent No.: US 10,458,782 B2
(45) Date of Patent: Oct. 29, 2019

(54) FLEXIBLE APPARATUS AND METHOD FOR CONTROLLING OPERATION THEREOF

(71) Applicant: Samsung Electronics Co., Ltd., Suwon-si, Gyeonggi-do (KR)

(72) Inventors: Han-sung Lee, Seoul (KR); Geun-ho Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/100,868

(22) Filed: Aug. 10, 2018

(65) Prior Publication Data
US 2018/0347968 A1 Dec. 6, 2018

Related U.S. Application Data

(63) Continuation of application No. 13/954,098, filed on Jul. 30, 2013, now Pat. No. 10,060,732.

(30) Foreign Application Priority Data

Jul. 30, 2012 (KR) ........................ 10-2012-0083234

(51) Int. Cl.
*G01B 11/24* (2006.01)
*G06F 1/16* (2006.01)
(Continued)

(52) U.S. Cl.
CPC ............ *G01B 11/24* (2013.01); *G06F 1/1652* (2013.01); *G06F 1/1694* (2013.01); *G06F 3/033* (2013.01);
(Continued)

(58) Field of Classification Search
CPC ....................................................... G01B 11/24
(Continued)

(56) References Cited

U.S. PATENT DOCUMENTS 7,990,513 B2    8/2011    Belyaev
8,416,148 B1    4/2013    Park
(Continued)

FOREIGN PATENT DOCUMENTS

CN    102055821 A    5/2011
CN    102141883 A    8/2011
(Continued)

OTHER PUBLICATIONS

Korean Office Action dated Feb. 23, 2019, issued in a counterpart Korean application No. 10-2012-0083234.
(Continued)

*Primary Examiner* — Dominic J Bologna
*Assistant Examiner* — Omar H Nixon
(74) *Attorney, Agent, or Firm* — Jefferson IP Law, LLP

(57) ABSTRACT

A flexible apparatus is provided. The flexible apparatus includes a plurality of motion sensors mounted on different locations of the flexible apparatus, a storage configured to store operation information of the flexible apparatus corresponding to a bending shape, and a controller configured to determine a bending shape of the flexible apparatus based on a sensing value of each of the plurality of motion sensors, and to perform an operation corresponding to the determined bending shape based on the operation information stored in the storage.

20 Claims, 59 Drawing Sheets

(51) Int. Cl.
*G06F 3/033* (2013.01)
*G06F 3/0484* (2013.01)
*H04M 1/02* (2006.01)

(52) U.S. Cl.
CPC ......... *G06F 3/0484* (2013.01); *H04M 1/0268* (2013.01)

(58) Field of Classification Search
USPC ...................................................... 356/601
See application file for complete search history.

(56) References Cited

U.S. PATENT DOCUMENTS

| | | | |
|---|---|---|---|
| 8,502,788 B2 | 8/2013 | Cho | |
| 8,558,806 B2 | 10/2013 | Miyazawa et al. | |
| 8,654,087 B2 | 2/2014 | Kang et al. | |
| 8,928,580 B2 | 1/2015 | Hwang et al. | |
| 9,013,432 B2 | 4/2015 | Kang et al. | |
| 9,013,433 B2 | 4/2015 | Kang et al. | |
| 9,451,064 B2 | 9/2016 | Hwang et al. | |
| 9,671,870 B2 | 6/2017 | Kang et al. | |
| 9,946,358 B2 | 4/2018 | Kang et al. | |
| 2002/0180710 A1* | 12/2002 | Roberts | G06F 3/0414 345/173 |
| 2004/0008191 A1 | 1/2004 | Poupyrev et al. | |
| 2006/0238494 A1 | 10/2006 | Narayanaswami et al. | |
| 2007/0222935 A1 | 9/2007 | Belyaev | |
| 2008/0141181 A1 | 6/2008 | Ishigaki et al. | |
| 2009/0298547 A1 | 12/2009 | Kim et al. | |
| 2010/0011291 A1 | 1/2010 | Nurmi | |
| 2010/0045705 A1 | 2/2010 | Vertegaal et al. | |
| 2010/0053173 A1 | 3/2010 | Cohen et al. | |
| 2010/0060548 A1 | 3/2010 | Choi et al. | |
| 2010/0088061 A1 | 4/2010 | Horodezky et al. | |
| 2010/0117975 A1 | 5/2010 | Cho | |
| 2010/0141605 A1 | 6/2010 | Kang et al. | |
| 2011/0057873 A1 | 3/2011 | Geissler et al. | |
| 2011/0084898 A1 | 4/2011 | Ebbeling et al. | |
| 2011/0095975 A1 | 4/2011 | Hwang et al. | |
| 2011/0157045 A1 | 6/2011 | Miyazawa et al. | |
| 2011/0183722 A1* | 7/2011 | Vartanian | G06Q 30/02 455/566 |
| 2011/0187681 A1 | 8/2011 | Kim et al. | |
| 2012/0154273 A1* | 6/2012 | McDade, Sr. | G06F 3/0338 345/157 |
| 2013/0201093 A1* | 8/2013 | Kim | G06F 3/033 345/156 |
| 2013/0285922 A1* | 10/2013 | Alberth, Jr. | G06F 1/1694 345/173 |
| 2013/0328792 A1* | 12/2013 | Myers | G06F 1/1652 345/173 |
| 2013/0342509 A1 | 12/2013 | Kang et al. | |
| 2014/0002402 A1 | 1/2014 | Kang et al. | |
| 2014/0002419 A1* | 1/2014 | Thorson | G06F 3/147 345/175 |
| 2014/0292717 A1 | 10/2014 | Kang et al. | |
| 2015/0119112 A1 | 4/2015 | Hwang et al. | |
| 2017/0255271 A1 | 9/2017 | Kang et al. | |

FOREIGN PATENT DOCUMENTS

| | | |
|---|---|---|
| EP | 2 166 670 A1 | 3/2010 |
| EP | 2 479 658 A1 | 7/2012 |
| KR | 10-20100052227 A | 5/2010 |
| KR | 10-20100065418 A | 6/2010 |
| KR | 10-20110028650 A | 3/2011 |
| RU | 2 318 230 C2 | 2/2008 |

OTHER PUBLICATIONS

European Office Action dated Jan. 29, 2019, issued in a counterpart European application No. 13826483.3.

* cited by examiner

FIRST MOTION SENSOR

SECOND MOTION SENSOR

FLEXIBLE APPARATUS AND METHOD FOR CONTROLLING OPERATION THEREOF

CROSS-REFERENCE TO RELATED APPLICATION(S)

This application is a continuation application of prior application Ser. No. 13/954,098, filed on Jul. 30, 2013, which claimed the benefit under 35 U.S.C. § 119(a) of a Korean patent application filed on Jul. 30, 2012 in the Korean Intellectual Property Office and assigned Serial No. 10-2012-0083234, the entire disclosure of which is hereby incorporated by reference.

TECHNICAL FIELD

The present disclosure relates to a flexible apparatus and a method for controlling an operation thereof. More particularly, the present disclosure relates to a flexible apparatus which can sense a bending shape using a plurality of motion sensors and perform an operation according to the bending shape, and a method for controlling an operation thereof.

BACKGROUND

With the development of electronic technologies, various kinds of electronic apparatuses have been developed. In particular, display apparatuses such as television (TVs), Personal Computers (PCs), laptops, tablet PCs, mobile phones, and MP3 players are widely used to such an extent that they can be found in most households.

In order to meet consumer demands for new functions and new forms of displays, an effort to develop new forms of display apparatuses is ongoing. One of the results of this effort is a next generation display apparatus in the form of a flexible display apparatus.

The flexible display apparatus is a display apparatus that can be deformed or deformed into different shapes and configuration like paper. The flexible display apparatus can be deformed by a force that is applied by a user and thus may be used for various purposes. For example, the flexible display apparatus may be used for mobile apparatuses such as mobile phones, tablet PCs, electronic albums, Personal Digital Assistants (PDAs), and MP3 players.

In the related art, an electronic apparatus may be controlled by a user's touch manipulation or button manipulation. However, the flexible apparatus is flexible. Accordingly, there is a need for a new manipulation mechanism using characteristics of such a flexible apparatus.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a flexible apparatus, which can determine a bending shape effectively using a plurality of motion sensors, and a method for controlling an operation thereof.

In accordance with an aspect of the present disclosure, a flexible apparatus is provided. The flexible apparatus includes a plurality of motion sensors mounted on different locations of the flexible apparatus, a storage configured to store operation information of the flexible apparatus corresponding to a bending shape, and a controller configured to determine a bending shape of the flexible apparatus based on a sensing value of each of the plurality of motion sensors, and to perform an operation corresponding to the determined bending shape based on the operation information stored in the storage.

According to another aspect of the present disclosure, the controller may obtain a change in the sensing value of each of the plurality of motion sensors, and may determine the bending shape based on a difference between the changed sensing values. The bending shape may include a degree of bending and a bending direction.

According to another aspect of the present disclosure, the plurality of motion sensors may be sensors that sense a change in a position with reference to at least one of 3D space axes.

According to another aspect of the present disclosure, the plurality of motion sensors may be disposed on corner areas of the flexible apparatus.

According to another aspect of the present disclosure, the plurality of motion sensors may include a first motion sensor disposed on a center of a first edge area from among edge areas of the flexible apparatus, and a second motion sensor disposed on a center of a second edge area which is opposite the first edge area from among the edge areas of the flexible apparatus.

According to another aspect of the present disclosure, the flexible apparatus may further include a touch sensor configured to sense a user touch. The controller may activate the plurality of motion sensors according to the user touch.

According to another aspect of the present disclosure, the flexible apparatus may further include a bend sensor configured to sense a bending state of the flexible apparatus. The controller may determine the bending shape based on an output value of the bend sensor and the sensing values of the plurality of motion sensors.

According to another aspect of the present disclosure, when a predetermined calibration shape is sensed, the controller may calculate a compensation value based on a sensing value which is output from the bend sensor while the calibration shape is sensed, and may compensate for the sensing value of the bend sensor based on the compensation value.

According to another aspect of the present invention, the plurality of motion sensors may include at least one of an acceleration sensor, a geomagnetic sensor, and a gyro sensor.

According to another aspect of the present disclosure, the controller may determine at least one of general bending, folding, multi-bending, bending and move, bending and flat, bending and hold, bending and twist, twist, swing, shaking, and rolling based on a change in at least one of a pitch angle, a roll angle, and a yaw angle which are sensed by the plurality of motion sensors.

According to another aspect of the present disclosure, the flexible apparatus may further include a display configured to display a screen corresponding to the bending shape.

According to another aspect of the present disclosure, when bending occurs while a plurality of menus are displayed on the display, the controller may perform a menu navigation operation on the plurality of menus according to the bending shape, and the menu navigation operation may include at least one of an operation of moving a menu, an operation of selecting a menu, an operation of changing a menu page, an operation of scrolling a menu, an operation of displaying a main menu and a sub menu, and an operation of switching between a main menu and a sub menu.

In accordance with another aspect of the present disclosure, a method for controlling an operation of a flexible apparatus is provided. The method includes outputting, by a plurality of motion sensors mounted on different locations of the flexible apparatus, sensing values, determining a bending shape of the bent flexible apparatus by comparing the sensing values of the plurality of motion sensors, and performing an operation corresponding to the bending shape.

In accordance with another aspect of the present disclosure, the determining of the bending shape may include obtaining a change in the sensing value of each of the plurality of motion sensors, and determining the bending shape based on a difference between the changed sensing values, and the bending shape may include a degree of bending and a bending direction.

In accordance with another aspect of the present disclosure, the plurality of motion sensors may be sensors that sense a change in a position with reference to at least one of 3D space axes. The determining of the bending shape may include determining at least one of a bending direction, a degree of bending, a bending area, and a bending shape by comparing results of sensing changes in positions by the plurality of motion sensors.

In accordance with another aspect of the present disclosure, the method may further include when a user touch is sensed by a touch sensor, activating the plurality of motion sensors.

In accordance with another aspect of the present disclosure, the flexible apparatus may include a bend sensor configured to sense a bending state of the flexible apparatus. The determining of the bending shape may include determining the bending shape based on sensing values of the bend sensor and the plurality of motion sensors.

In accordance with another aspect of the present disclosure, the method may further include when a predetermined calibration shape is sensed, calculating a compensation value based on a sensing value which is output from the bend sensor while the calibration shape is sensed, and compensating for the sensing value of the bend sensor using the compensation value.

In accordance with another aspect of the present disclosure, the bending may include at least one of general bending, folding, multi-bending, bending and move, bending and flat, bending and hold, bending and twist, twist, swing, shaking, and rolling.

In accordance with another aspect of the present disclosure, the method may further include displaying a screen corresponding to the bending shape.

In accordance with another aspect of the preset disclosure, the method may further include displaying a plurality of menus, and when bending to perform a menu navigation operation occurs, performing a menu navigation operation on the plurality of menus according to the bending shape.

In accordance with another aspect of the present disclosure, the menu navigation operation may include at least one of an operation of moving a menu, an operation of selecting a menu, an operation of changing a menu page, an operation of scrolling a menu, an operation of displaying a main menu and a sub menu, and an operation of switching between a main menu and a sub menu.

According to the various embodiments as described above, the bending shape can be effectively sensed by the plurality of motion sensors. Accordingly, the operation of the flexible apparatus can be controlled easily using the bending manipulation.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
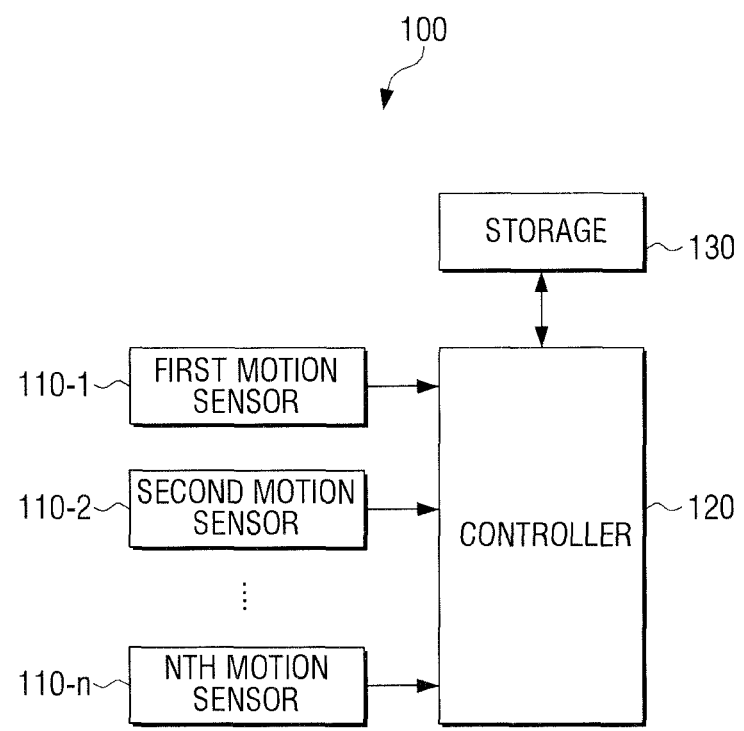
FIG. 1 is a block diagram illustrating a configuration of a flexible apparatus according to an embodiment of the present disclosure.

FIG. 1 is a block diagram illustrating a configuration of a flexible apparatus according to an embodiment of the present disclosure.

Referring to FIG. 1, a flexible apparatus 100 includes a plurality of motion sensors 110-1 to 110-*n*, a controller 120, and a storage 130.

The flexible apparatus 100 may be implemented by using various types of flexible display apparatuses, such as a mobile phone, a tablet PC, a laptop computer, an MP3 player, an electronic album, an electronic book, a television (TV), and a monitor, or may be implemented by using various types of apparatuses such as a remote controller, an input pad, and a mouse.

The plurality of motion sensors 110-1 to 110-*n* may be mounted on different locations of a body of the flexible apparatus 100. The body refers to a main body of the flexible apparatus 100 which includes a housing covering inner elements of the flexible apparatus 100.

The storage 130 may store information on various bending shapes and information on an operation of the flexible apparatus corresponding to each bending shape.

The controller 120 determines a bending shape by comparing sensing values of the plurality of motion sensors 110-1 to 110-*n*. Also, the controller 120 performs an operation corresponding to the determined bending shape based on the operation information stored in the storage 130. Examples of bending shapes and corresponding operations will be explained below.

Each of the motion sensors 110-1 to 110-*n* may sense a change in a position with reference to at least one of 3-Dimensional (3D) space axes. The motion sensors 110-1 to 110-*n* may be implemented by using various sensors such as a gyro sensor, a geomagnetic sensor, and an acceleration sensor. The acceleration sensor outputs a sensing value corresponding to acceleration of gravity which changes according to a tilt of an apparatus to which the sensor is attached. The gyro sensor is a sensor which, when a rotary motion occurs, detects an angular velocity by measuring Coriolis force exerted in a velocity direction of the motion. The geomagnetic sensor senses azimuth.

Figure 2:
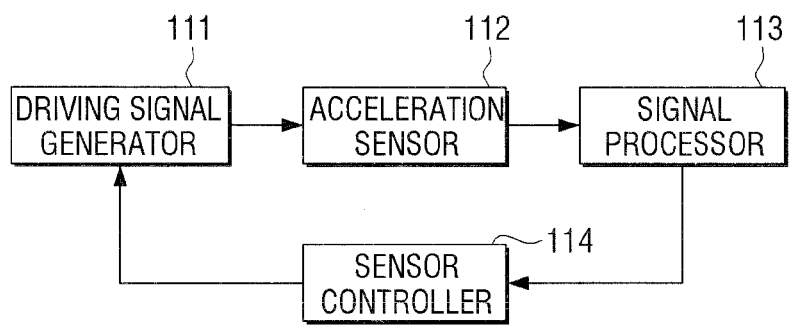
FIG. 2 is a block diagram illustrating an example of a motion sensor according to an embodiment of the present disclosure.

FIG. 2 is a view illustrating a motion sensor which includes an acceleration sensor according to an embodiment of the present disclosure.

Referring to FIG. 2, a motion sensor 110 includes a driving signal generator 111, an acceleration sensor 112, a signal processor 113, and a sensor controller 114.

The driving signal generator 111 generates a driving signal to drive the acceleration sensor 112. The driving signal is generated in the form of a pulse signal and a reverse pulse signal, and is provided to the acceleration sensor 112.

The acceleration sensor 112 may be implemented on 2 axes or 3 axes. For example, when the acceleration sensor 112 is implemented by using a 2-axis acceleration sensor, the acceleration sensor 112 include X and Y-axis acceleration sensors (not shown) which are perpendicular to each other. When the acceleration sensor 112 is implemented by using a 3-axis acceleration sensor, the acceleration sensor 112 includes X, Y, and Z-axis acceleration sensors which are disposed in different directions and perpendicular to one another.

The signal processor 113 converts outputs values of the X, Y, and Z-axis acceleration sensors into digital values, and provides the digital values to the sensor controller 114. The signal processor 113 may include a chopping circuit, an amplification circuit, a filter, and an Analogue-Digital (A/D) converter. Accordingly, the signal processor 113 chops, amplifies, and filters electric signals which are output from the 3-axis acceleration sensors, converts the electric signals into digital voltage values, and outputs the digital voltage values.

The sensor controller 114 outputs a control signal to the driving signal generator 111 to control whether to provide the driving signal. The motion sensor 111 may be activated or inactivated under the control of the sensor controller 114.

When the acceleration sensor 112 is activated and outputs an output value of each of the axis acceleration sensors, and the output values are processed by the signal processor 113, the sensor controller 114 normalizes the output values to be mapped within a predetermined range, and calculates a pitch angle and a roll angle using the normalized values.

For example, when the 2-axis acceleration sensor is provided, the sensor controller 114 normalizes output values using Equation (1):

$$Xt_{norm} = \frac{(Xt - Xt_{offset})}{Xt_{Scale}}$$

$$Yt_{norm} = \frac{(Yt - Yt_{offset})}{Yt_{Scale}}$$

$$Xt_{offset} = \frac{Xt_{max} + Xt_{min}}{2}, \quad Xt_{Scale} = \frac{Xt_{max} - Xt_{min}}{2}$$

$$Yt_{offset} = \frac{Yt_{max} + Yt_{min}}{2}, \quad Yt_{Scale} = \frac{Yt_{max} - Yt_{min}}{2}$$

Equation (1)

In Equation (1), Xt and Yt are output values of the X-axis and Y-axis acceleration sensors, respectively, $Xt_{norm}$ and $Yt_{norm}$ are normalized values of the X-axis and Y-axis acceleration sensors, $Xt_{max}$ and $Xt_{min}$ are a maximum value and a minimum value of Xt, respectively, $Yt_{max}$ and $Yt_{max}$ are a maximum value and a minimum value of Yt, respectively, $Xt_{offset}$ and $Yt_{offset}$ are offset values of the X and Y-axis acceleration sensors, respectively, and $Xt_{scale}$ and $Yt_{scale}$ are scale values of the X and Y-axis acceleration sensors, respectively. $Xt_{offset}$, $Yt_{offset}$, $X_{tScale}$ and $Y_{tScale}$ may be calculated in advance by rotating the flexible apparatus 100 in which the acceleration sensor 110 is mounted several times, and may be stored in a memory of the acceleration sensor 110 or the storage 130.

The sensor controller 114 may calculate a pitch angle and a roll angle by inserting the value of each of the axis acceleration sensors which is normalized as shown in Equation (1) into Equation (2):

$$\theta = \sin^{-1}(Xt_{norm})$$

$$\phi = \sin^{-1}\left(\frac{Yt_{noram}}{\cos\theta}\right)$$

Equation (2)

In Equation (2), θ is a pitch angle and Ø is a roll angle.

On the other hand, when the acceleration sensor 112 is implemented by using a 3-axis acceleration sensor, the sensor controller 114 may normalize output values of X, Y, and Z-axis acceleration sensors through the signal processor 113 by mapping the values onto values of a predetermined range, and may calculate a pitch angle and a roll angle using the normalized values.

The sensor controller 114 provides information on the pitch angle and the roll angle to the controller 120. The controller 120 compares the information provided from the sensor controller 114 and bending shape information stored in the storage 130, and determines a bending shape.

To achieve this, the storage 130 may store information on various bending shapes. The bending shape information is information on an operation of changing a shape of the flexible apparatus 100 by crooking, bending, and twisting the flexible apparatus 100, or information defining a characteristic of a bending shape. Various types of bending, such as general bending, folding, multi-bending, bending and move, bending and flat, bending and hold, bending and twist, twist, swing, shaking, and rolling may be set according to a type, a shape, a size, and a control operation of the flexible apparatus 100. The storage 130 may store values of the motion sensors when each bending occurs, or information on an operation matching the bending shape.

A variety of bending shape information may be set according to a number of motion sensors, a placement location, an axis direction, and a type. A method for determining a bending shape using a motion sensor is described below.

Determining Bending Shape Using Motion Sensor

Figure 3:
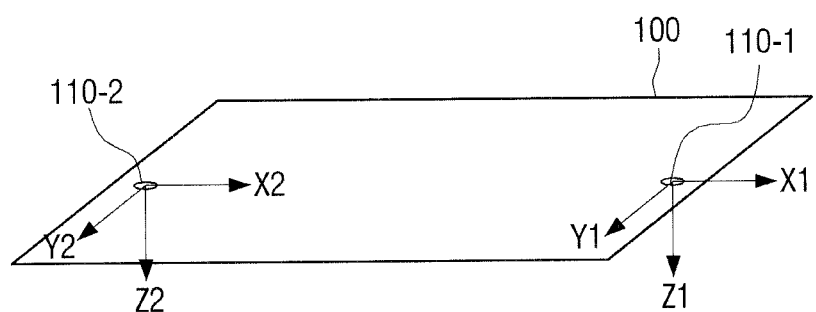
FIG. 3 is a view to illustrate axis directions of a plurality of motion sensors which are arranged in a flexible apparatus according to an embodiment of the present disclosure.

FIG. 3 is a view illustrating a configuration of a flexible apparatus in which two motion sensors are disposed according to an embodiment of the present disclosure.

Referring to FIG. 3, the two motion sensors 110-1 and 110-2 are disposed on opposite edges of the flexible apparatus. In FIG. 3, each of the motion sensors 110-1 and 110-2 is implemented by using a 3-axis acceleration sensor including X, Y, and Z axes, and the axes of the two motion sensors 110-1 and 110-2 are placed in the same directions.

The X1 axis of the first motion sensor 110-1 points toward the right edge of the flexible apparatus 100, the Y1 axis points toward the lower edge of the flexible apparatus 100, and the Z1 axis points in a downward direction perpendicular to a plane which is formed by the X1 axis and the Y axis. The X2, Y2, and Z2 axes of the second motion sensor 110-2 point in the same directions. An angle rotating about the X2 axis and the X2 axis is a roll angle, an angle rotating about the Y1 axis and the Y2 axis is pitch angle, and an angle about the Z1 axis and the Z2 axis is a yaw angle.

The controller 120 may sense a change in a position by comparing a sensing value of each axis of the motion sensors 110-1 and 110-2 and a reference coordinate system.

Figure 4:
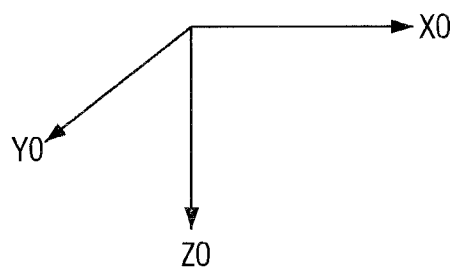
FIG. 4 is a view illustrating reference axis coordinates to detect a bending shape of a flexible apparatus according to an embodiment of the present disclosure.

FIG. 4 illustrates an example of a reference coordinate system according to an embodiment of the present disclosure.

Referring to FIG. 4, Z0 denotes a direction of gravity, X0 denotes east direction, and Y denotes south direction when the flexible apparatus is placed in a flat state.

The controller 120 may calculate the pitch angle and the roll angle using Equation (1) and Equation (2) as described above. The controller 120 may also calculate the pitch angle and the roll angle by inserting the sensing values output from the motion sensors 110-1 and 110-2 and the reference coordinate system into Equation (3):

$$g_{conversion\ coordinate\ system} =$$

$$C_{coordinates\ conversion\ matrix} \times g_{reference\ coordinate\ system}$$

$$\begin{bmatrix} g_X \\ g_Y \\ g_Z \end{bmatrix} = \begin{bmatrix} \cos\theta\cos\psi & \cos\theta\sin\psi & -\sin\theta \\ \sin\phi\sin\theta\cos\psi - \cos\phi\sin\psi & \sin\phi\sin\theta\sin\psi + \cos\phi\cos\psi & \sin\phi\cos\theta \\ \cos\phi\sin\theta\cos\psi + \sin\phi\sin\psi & \cos\phi\sin\theta\sin\psi - \sin\phi\cos\psi & \cos\phi\cos\varsigma \end{bmatrix}$$

$$\begin{bmatrix} 0 \\ 0 \\ -g \end{bmatrix} \Leftrightarrow \begin{bmatrix} g_X \\ g_Y \\ g_Z \end{bmatrix} \begin{bmatrix} g\sin\theta \\ -g\sin\phi\cos\theta \\ -g\cos\phi\cos\theta \end{bmatrix}$$

Equation (3)

In Equation (3), ϕ denotes Roll, θ denotes Pitch, ψ denotes Yaw, and g denotes gravity. According to Equation (3), $g_{conversion\ coordinate\ system}$ is calculated by multiplying $g_{reference\ coordinate\ system}$ and a coordinate conversion matrix. In Equation (3), gx, gy, and gz indicate gravity acceleration components that are sensed on X, Y, and Z axes. Specifically, gx, gy, and gz may be output values of the X, Y, and Z-axis acceleration sensors. θ is a pitch angle, Ø is a roll angle, Ψ is a yaw angle, and g is acceleration of gravity.

The pitch angle and the roll angle may be expressed by rearranging Equation (3) to Equation (4):

$$\text{Roll}(\phi) = \tan^{-1}\left(\frac{\hat{g}_Y}{\hat{g}_Z}\right)$$

$$\text{Pitch}(\theta) = \tan^{-1}\left(\frac{\hat{g}_X}{\sqrt{(\hat{g}_Y)^2 + (\hat{g}_Z)^2}}\right)$$

Equation (4)

The controller 120 may calculate the pitch angle and the roll angle using Equation (4).

Figure 5:
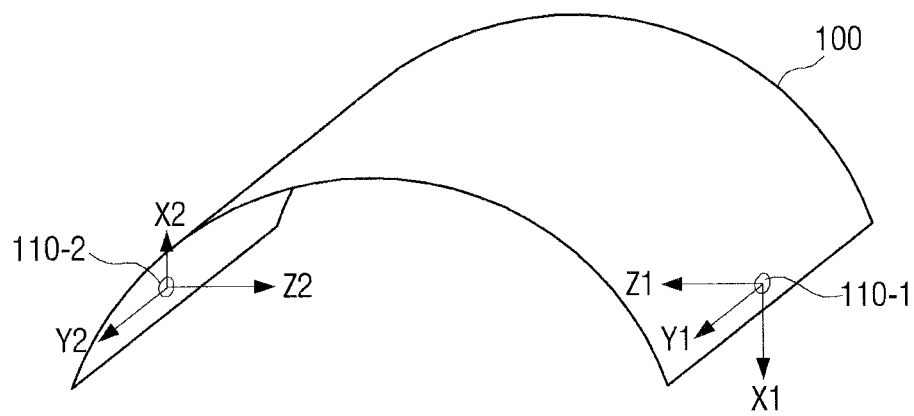
FIG. 5 is a view illustrating a bending shape in which a center of a flexible apparatus curves upwardly according to an embodiment of the present disclosure.

FIG. 5 is a view illustrating a bending shape in which a center of the flexible apparatus curves upwardly according to an embodiment of the present disclosure.

Referring to FIG. 5, when the flexible apparatus is bent, having its right edge and left edge oriented downward, the X1 axis of the first motion sensor 110-1 and the X2 axis of the second motion sensor 110-2 point downward in the direction of gravity. The Z1 axis and the Z2 axis point facing each other, and the Y1 axis and the Y2 axis are parallel to their previous axis directions.

Figure 6A:
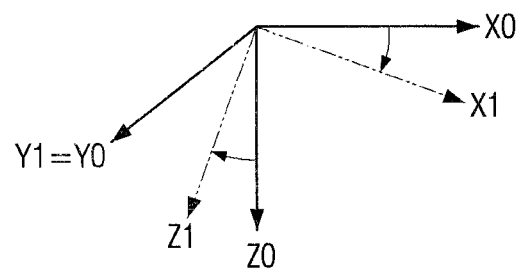
FIGS. 6A and 6B are views illustrating a change in a sensing value of a motion sensor when bending is performed according to an embodiment of the present disclosure.
Figure 6B:
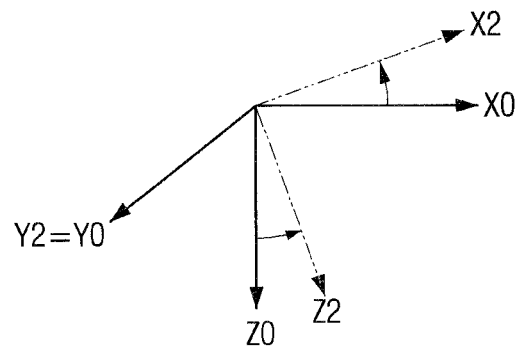

FIGS. 6A and 6B illustrate a change in the sensing value of the motion sensor when bending occurs according to an embodiment of the present disclosure.

Referring to FIG. 6A, the X1 axis and the Z1 axis of the first motion sensor 110-1, which is disposed on the right edge, move to the left in comparison with the X0 axis and the Z0 axis of the reference coordinate system.

Referring to FIG. 6B, the X2 axis and the Z2 axis of the second motion sensor 110-2, which is disposed on the left edge, move to the right in comparison with the X0 axis and the Z0 axis of the reference coordinate system.

When the axis directions of the first and second motion sensors 110-1 and 110-2 are changed as shown in FIGS. 6A and 6B, the gravity acceleration component, which is distributed to each axis, is sensed by the sensor of each axis and output. The controller 120 determines a relationship between the X1 value and the X2 value and a relationship between the Z1 value and the Z2 value by comparing output values of each axis. Accordingly, the controller 120 determines that a bending shape in which the center of the flexible apparatus 100 curves upwardly is performed.

Figure 7:
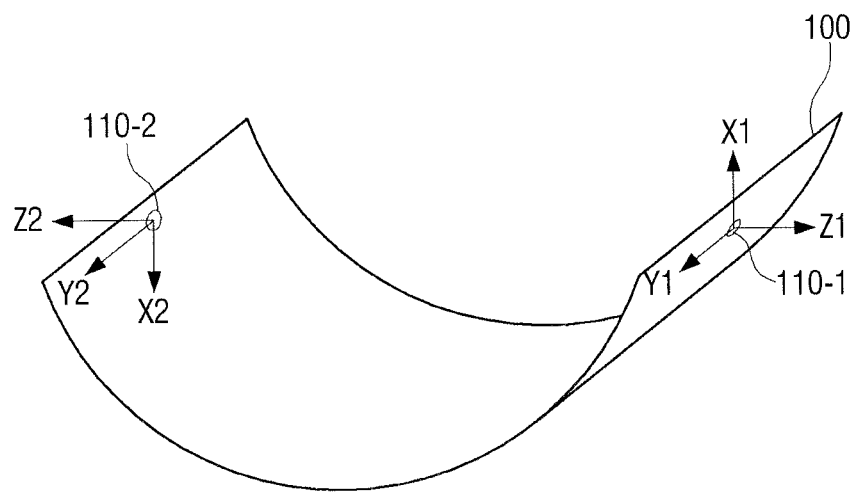
FIG. 7 is a view illustrating a bending shape in which a center of a flexible apparatus curves downwardly according to an embodiment of the present disclosure.

FIG. 7 is a view illustrating a bending shape in which a center of a flexible apparatus curves downwardly according to an embodiment of the present disclosure.

Referring to FIG. 7, the right edge and the left edge of the flexible apparatus are oriented upward by bending. Accordingly, the X1 axis of the first motion sensor 110-1 and the X2 axis of the second motion sensor 110-2 point upwardly in the opposite direction to gravity. The Z1 axis and the Z2 axis point in opposite directions, while the Y1 axis and the Y2 axis are parallel to their previous axis directions.

The bending area and the bending shape in FIG. 7 are the same as in FIG. 5, but the bending directions are opposite each other. Accordingly, when bending of FIGS. 5 and 7 is performed, the X axis accelerations and the Z axis accelerations have opposite signs.

When general bending is performed to have the center curved upward or downward as shown in FIGS. 5 and 7, the directions of the X1, X2, Z1, and Z2 axes are changed. As described above, the change in the directions of the Z1 and Z2 axes with reference to the Z0 axis refers to a yaw angle. However, since the acceleration sensors sense the same gravity acceleration, the acceleration sensors cannot measure the yaw angle. Accordingly, the yaw angle may be measured separately by means of the geomagnetic sensor or gyro sensor, or bending/unbending may be determined by sensing only a change in the pitch angle.

Although the general bending in which the center curves upwardly or downwardly is illustrated in FIGS. 5 and 7, the general bending includes bending of one edge area. When one of the first and second motion sensors 110-1 and 110-2 outputs the same value and the other sensor outputs a changed value, the controller 120 determines that the edge area where the other sensor is disposed is bent. In this case, when the change in the output value is less than or equal to a threshold value, the controller 120 determines that the general bending in which one edge area is bent is performed. When the change exceeds the threshold value, the controller 120 determines that folding is performed.

As described above, the bending may include bending and move, bending and flat, bending and hold, bending and twist, twist, swing, shaking, and rolling in addition to the general bending and the folding.

Figure 8:
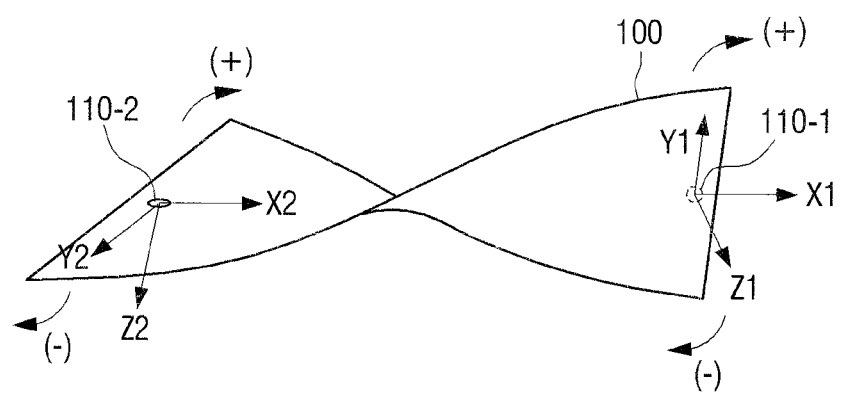
FIG. 8 is a view illustrating changes in axes of motion sensors when a twist occurs in a first direction according to an embodiment of the present disclosure.
Figure 9:
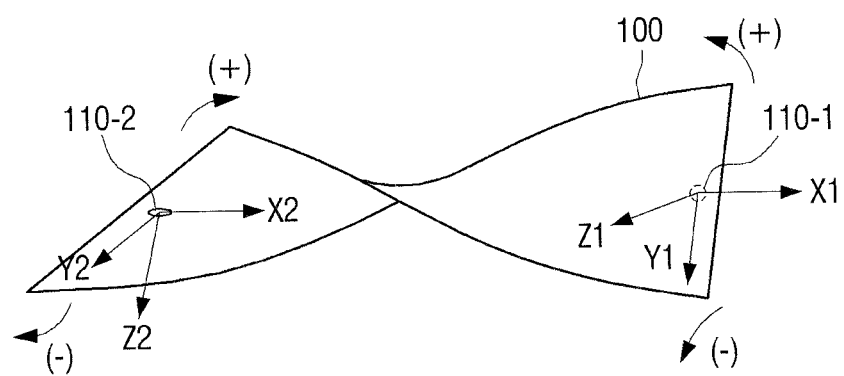
FIG. 9 is a view illustrating changes in axes of motion sensors when a twist occurs in a second direction according to an embodiment of the present disclosure.

FIGS. 8 and 9 are views to explain twist according to an embodiment of the present disclosure.

FIG. 8 illustrates a twist operation in which a right lower corner and a left upper corner of a flexible apparatus go up in the opposite direction to gravity, and a right upper corner and a left lower corner go down in the direction of gravity according to an embodiment of the present disclosure.

FIG. 9 illustrates a twist operation in which a right upper corner and a left lower corner of a flexible apparatus go up in the opposite direction to gravity and the right lower corner and the left upper corner go down in the direction of gravity according to an embodiment of the present disclosure.

When the twist operation is performed as shown in FIGS. 8 and 9, the X1 and X2 axes are still maintained in the same direction as that of the X0 axis, but the Y1, Y2, Z1, and Z2 axes are rotated with reference to the reference axis. Accordingly, the roll angle is changed. The controller 120 calculates the pitch angle and the roll angle using the sensing values of each of the first and second motion sensors 110-1 and 110-2, and obtains an absolute value of each of the pitch angle and the roll angle, and a change in the sign. Accordingly, it is determined whether the twist operation is performed or not.

Figure 10:
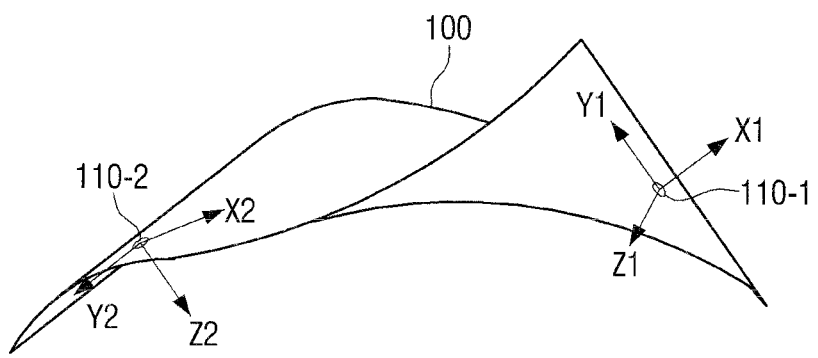
FIG. 10 is a view illustrating changes in axes of motion sensors when bending and twist occurs according to an embodiment of the present disclosure.

FIG. 10 illustrates bending and twist in which general bending is performed on a certain area and twist is performed on the other area according to an embodiment of the present disclosure.

Referring to FIG. 10, the left edge area of the flexible apparatus 100 curves upwardly and the right lower corner goes up in the opposite direction to gravity. Accordingly, the axes of the first and second motion sensor 110-1 and 110-2 are changed as shown in FIG. 10. When a change in the roll angle is sensed from the first motion sensor 110-1 and a change in the pitch angle is sensed from the second motion sensor 110-2, the controller 120 determines that the bending and twist is performed. The controller 120 determines a degree of bending using the pitch angle which is calculated based on the output values of the second motion sensor 110-2. The controller 120 may determine a degree of twist using the roll angle which is calculated based on the output values of the first motion sensor 110-1.

Although the controller 120 compares the output values of the motion sensors with reference to the reference coordinate system in the above-described embodiment, the controller 120 may determine bending/unbending with reference to an initial coordinate system which is set through a training process, besides the reference coordinate system. When the flexible apparatus 100 is placed in a flat state and a user setting command is input, the controller 120 may store sensing values of each motion sensor at that time as a reference value. The controller 120 determines bending/unbending by comparing sensing values of each motion sensor and the reference value.

In the above-described embodiment, the bending shape is determined using the two motion sensors. However, the number of motion sensors may be more than two.

Figure 11:
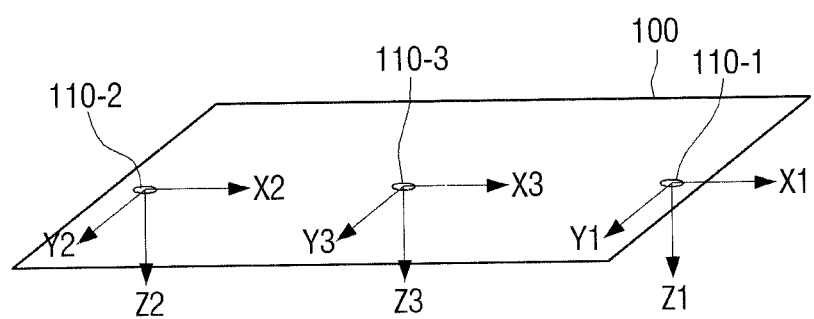
FIG. 11 is a view illustrating a configuration of a flexible apparatus which includes three motion sensors according to an embodiment of the present disclosure.

FIG. 11 illustrates a configuration of a flexible apparatus which includes three motion sensors according to an embodiment of the present disclosure.

Referring to FIG. 11, the flexible apparatus 100 includes a first motion sensor 110-1 and a second motion sensors 110-2 which are disposed on opposite edge areas, and a third motion sensor 110-3 which is disposed on a center area.

Figure 12A:
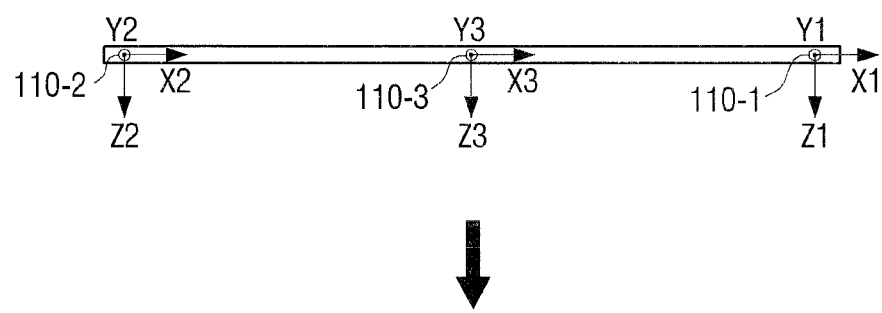
FIGS. 12A and 12B are views illustrating changes in axes of motion sensors when multi-bending occurs in a flexible apparatus including three motion sensors according to an embodiment of the present disclosure.
Figure 12B:
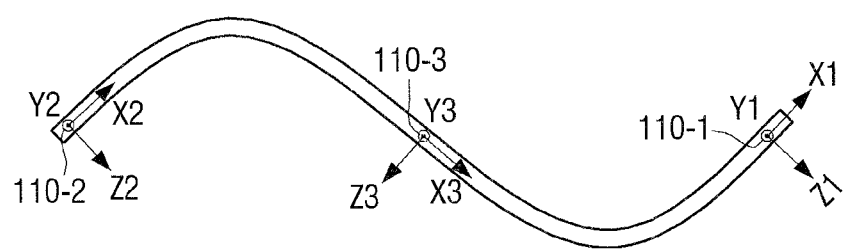

FIGS. 12A and 12B illustrate a cross section of the flexible apparatus of FIG. 11 according to an embodiment of the present disclosure.

Referring to FIG. 12A, the third motion sensor 110-3 has X3, Y3, and Z3 axes which are placed in the same form as those of the first and second motion sensors 110-1 and 110-2. The third motion sensor 110-3 may be placed on a location where a bending direction is changed when multi-bending in which two or more areas are bent is performed, (i.e., a location corresponding to an inflection point).

Referring to FIG. 12B, when multi-bending in which two or more areas are bent is performed, the Y1, Y2, and Y3 axes of the first to third motion sensors 110-1 to 110-3 are maintained parallel to the Y0 axis, and the X1, X2, and X3 axes and the Z1, Z2, and Z3 axes are rotated with reference to the Y0 and Z0 axes, respectively. The controller 120 calculates pitch angles based on the output values of the first to third motion sensors 110-1 to 110-3. The controller 120 determines whether the multi-bending is performed or not by comparing the pitch angels which are calculated by the first to third motion sensors 110-1 to 110-3.

Figure 13A:
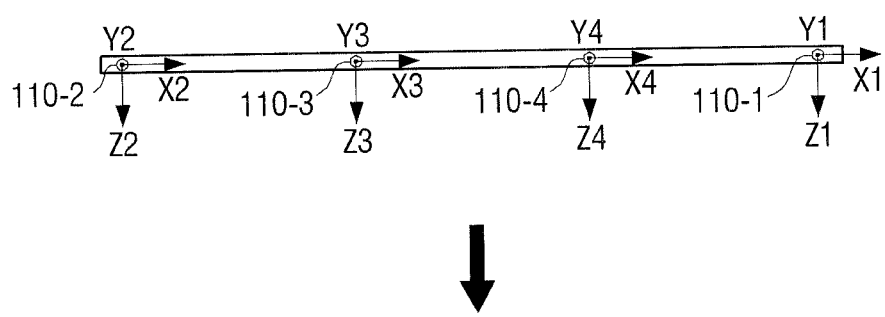
FIGS. 13A and 13B are views illustrating changes in axes of motion sensors when multi-bending occurs in a flexible apparatus including four motion sensors according to an embodiment of the present disclosure.
Figure 13B:
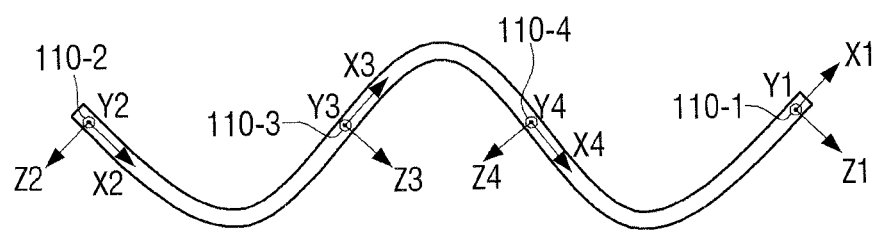

FIGS. 13A and 13B are views illustrating a configuration of a flexible apparatus which includes four motion sensors according to an embodiment of the present disclosure.

Referring to FIG. 13A, a first motion sensor 110-1 and a second motion sensor 110-2 are disposed on opposite edge areas and a third motion sensor and a fourth motion sensor 110-3 and 110-4 are disposed between the first and second motion sensors 110-1 and 110-2. The axes of the first to fourth motion sensors 110-1 and 110-4 are placed in the same directions.

Referring to FIG. 13B, when multi-bending in which three areas are bent is performed, the Y1, Y2, Y3, and Y4 axes of the first to fourth motion sensors 110-1 to 110-4 are maintained parallel to the Y0 axis, and the X1, X2, X3, and X4 axes and the Z1, Z2, Z3, and Z4 axes are rotated with reference to the Y0 and Z0 axes, respectively. The controller 120 may calculate pitch angles based on the output values of the first to fourth motion sensors 110-1 to 110-4. The controller 120 may determine whether the multi-bending is performed by comparing the pitch angles which are calculated by the first to fourth motion sensors 110-1 to 110-4.

When the sensing values of the plurality of motion sensors are output in sequence, the controller 120 may determine whether bending and move is performed based on those values. The bending and move recited herein refers to an operation in which one area is bent and the bent area moves to one side.

Figure 14:
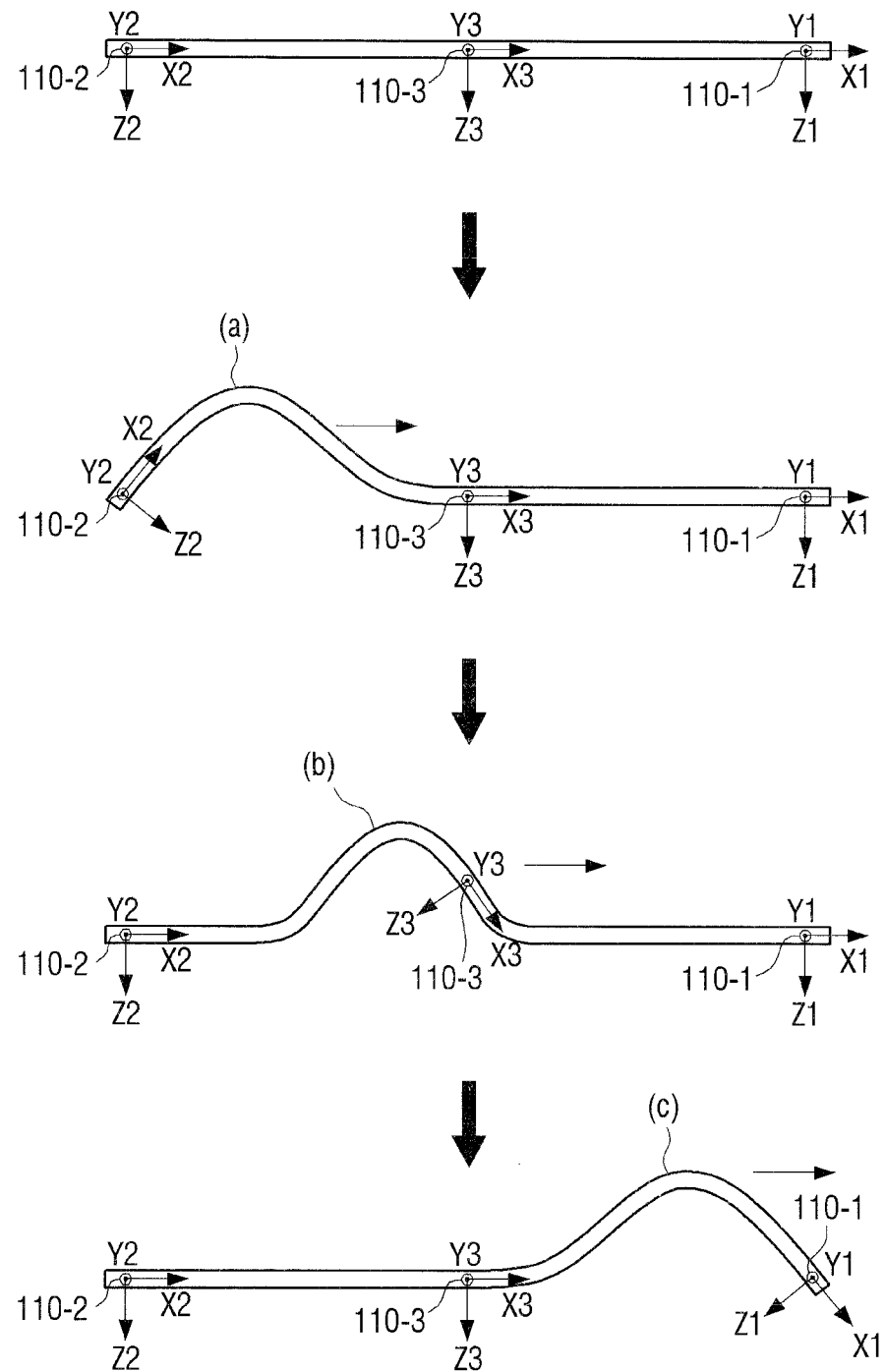
FIG. 14 is a view illustrating changes in axes of motion sensors when bending and motion occurs in a flexible apparatus including three motion sensors according to an embodiment of the present disclosure.

FIG. 14 is a view to illustrate a method for determining bending and move in the flexible apparatus which includes three motion sensors according to an embodiment of the present disclosure.

Referring to FIG. 14, when the bending and move is performed, the plurality of motion sensors output the sensing values corresponding to the bending state in sequence. The first and second motion sensors 110-1 and 110-2 are disposed on the opposite edge areas, and the third motion sensor 110-3 is disposed on the center area.

FIG. 14 illustrates bending and move which starts from the area where the second motion sensor 110-2 is disposed and moves to the area where the first motion sensor 110-1 is disposed. When the bending and move is performed, the bending move in direction of (a), (b), and (c) in sequence.

When a change in the pitch angle is sensed from the second motion sensor 110-2 which is a start point of the bending, a change in the pitch angle is sensed from the third motion sensor 110-3 after a predetermined time, and then a change in the pitch angle is sensed from the first motion sensor 110-1 again after a predetermined time, the controller 120 determines that bending is performed in the direction of (a), (b), and (c) in sequence.

Figure 15:
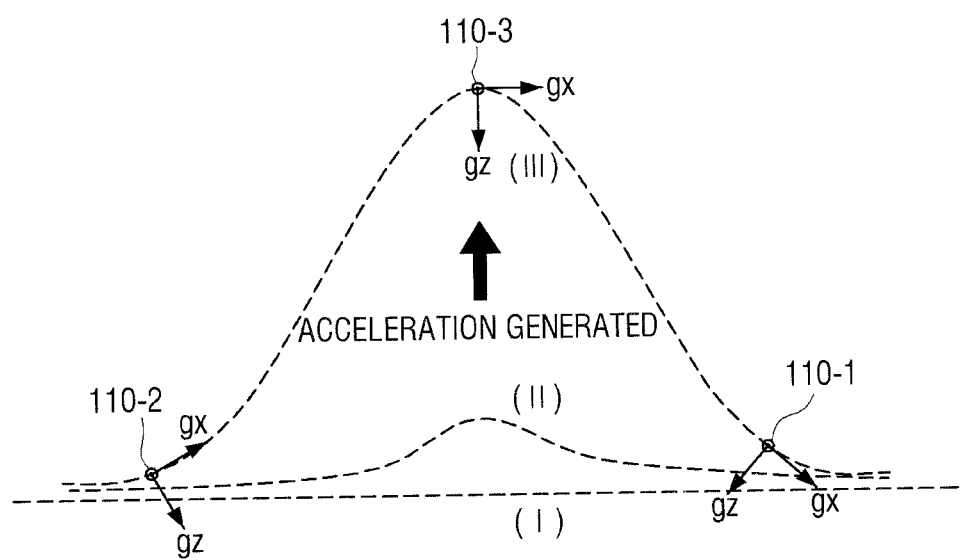
FIG. 15 is a view illustrating changes in axes of motion sensors when bouncing up occurs in a flexible apparatus including three motion sensors according to an embodiment of the present disclosure.

FIG. 15 is a view illustrating changes in axes of motion sensors when bouncing up is performed in a flexible apparatus including three motion sensors according to an embodiment of the present disclosure.

Referring to FIG. 15, when the user holds the opposite edges of the flexible apparatus 100 and bounces the flexible apparatus 100 up, the center of the flexible apparatus 100 goes up in sequence of (I), (II), and (III). The axis directions of the first and second motion sensors 110-1 and 110-2 are changed by bending and thus a gravity acceleration component sensed from each axis is changed. The third motion sensor 110-3 has the acceleration in an upward direction when the flexible apparatus 100 is bounced up. Accordingly, the output value of the Z axis is changed.

When the output values of the first and second motion sensors 110-1 and 110-2 are sensed with different signs and the output value of the Z3 axis of the third motion sensor 110-3 is reduced, the controller 120 determines that general bending in which the flexible apparatus is bounced up is performed one time.

When the center of the flexible apparatus is bent as shown in FIG. 15 and then is bent in the opposite direction, and these bending operations are repeated alternately, the controller 120 determines that swing is performed.

The controller 120 may determine other bending operations such as shaking and rolling based on the changes in the output values of the plurality of motion sensors.

Figure 16:
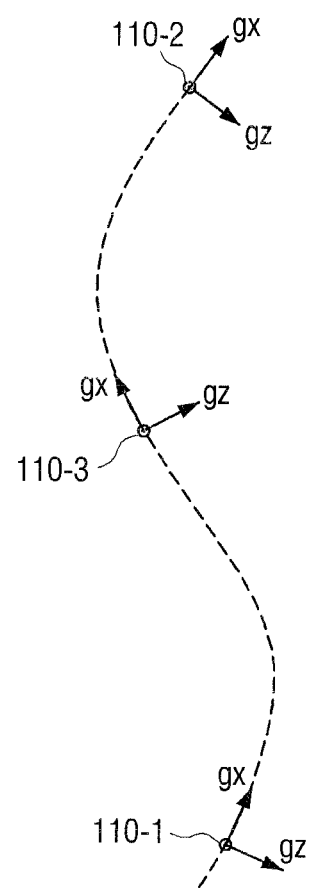
FIGS. 16 and 17 are views illustrating changes in axes of motion sensors when shaking occurs in a flexible apparatus including three motion sensors according to an embodiment of the present disclosure.
Figure 17:
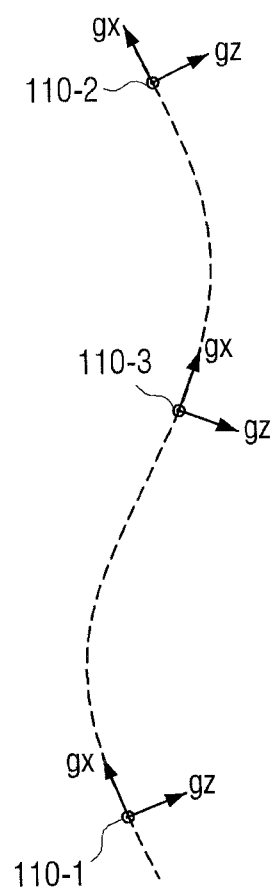

FIGS. 16 and 17 are views illustrating changes in axes of the motion sensors when shaking is performed according to an embodiment of the present disclosure. The shaking recited herein refers to an operation of holding the edge area of the flexible apparatus 100 with one hand and shaking the flexible apparatus 100.

Referring to FIGS. 16 and 17, when the user holds the left edge of the flexible apparatus 100, and has the right edge point downward and shakes the flexible apparatus 100, a bending direction at each point is changed alternately. Accordingly, the axis directions of the motion sensors 110-1 to 110-3 are changed in a regular pattern as shown in FIGS. 16 and 17. The controller 120 determines that the shaking is performed based on the output values of the motion sensor 110-1 to 110-3.

The number and placement locations of the motion sensors 110-1 to 110-3 may be set variously as described above.

FIGS. 18 to 21 are views to illustrate various examples of a configuration of a flexible apparatus in which a plurality of motion sensors are disposed according to an embodiment of the present disclosure.

Figure 18:
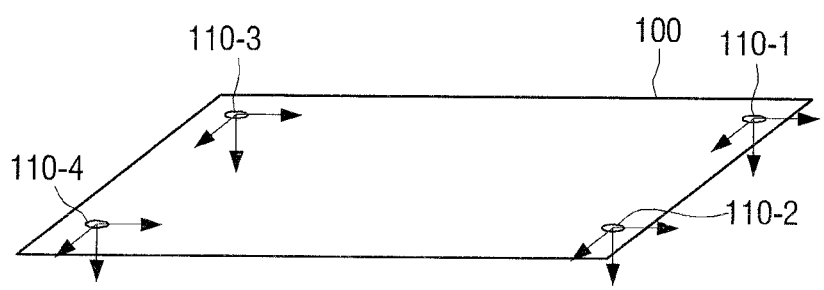
FIG. 18 is a view illustrating a configuration of a flexible apparatus where four motion sensors are disposed at corners according to an embodiment of the present disclosure.

Referring to FIG. 18, four motion sensors 110-1 to 110-4 are placed at corners of the flexible apparatus 100.

Figure 19:
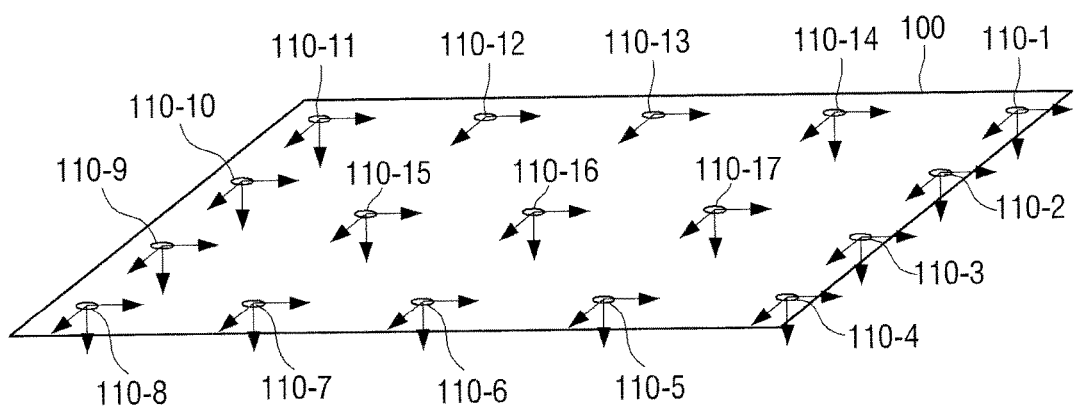
FIGS. 19, 20, and 21 are views illustrating a configuration of a flexible apparatus where a plurality of motion sensors are distributed according to an embodiment of the present disclosure.

FIG. 19 illustrates a plurality of motion sensors which are disposed on an overall surface of a flexible apparatus according to an embodiment of the present disclosure.

Referring to FIG. 19, a plurality of motion sensors 110-1 to 110-14 are disposed along the edge of the flexible apparatus 100 and a plurality of motion sensors 110-15 to 110-17 are disposed on the center.

Figure 20:
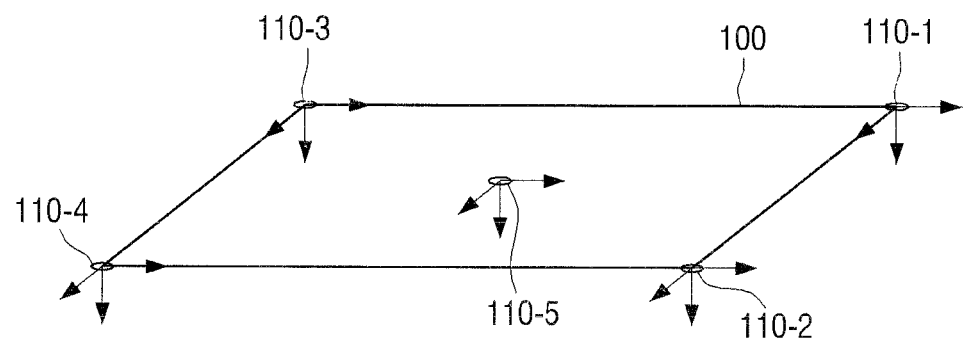

FIG. 20 illustrates the flexible apparatus 100 in which a plurality of motion sensors 110-1 to 110-4 are disposed at the corners, and a motion sensor 110-5 is disposed on the center.

Figure 21:
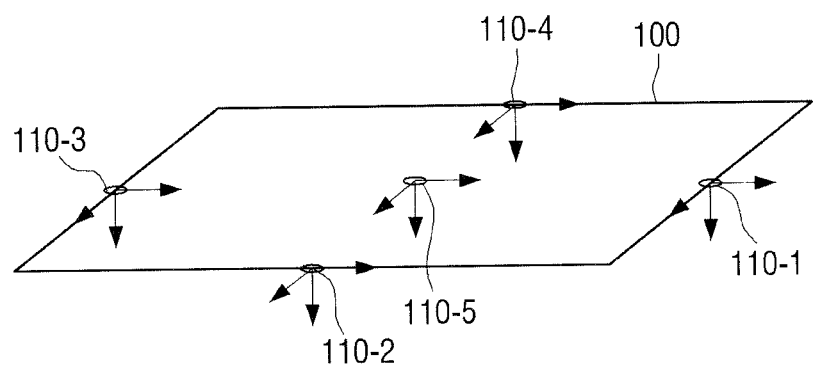

FIG. 21 illustrates the flexible apparatus 100 in which a plurality of motion sensors 110-1 to 110-4 are disposed on a center of each edge, and a motion sensor 110-5 is disposed on the center.

The controller 120 may determine whether rolling is performed based on a result of sensing by the motion sensors 110-1 to 110-$n$. The rolling refers to an operation of moving the flexible apparatus along the surface. When the rolling is performed, the axis of the motion sensor which is disposed on the edge area is rotated by more than 360°, and accordingly, the sensing value of the motion sensor is repeated in the same pattern period. The controller 120 may determine whether the rolling is performed based on the change in this sensing value.

The bending and flat or the bending and hold may be determined based on a time during which a bending state is maintained. When bending is sensed and held for a predetermined time, the controller 120 determines that the bending and hold is performed. The controller 120 may determine whether the bending and hold is performed using a timer. When bending is sensed and then a flat state is sensed, the controller 120 may determine that the bending and flat is performed.

In the above examples, the motion sensor consists of the acceleration sensor only. However, the motion sensor may also include the geomagnetic sensor or gyro sensor.

When the motion sensor is implemented by using the geomagnetic sensor, the motion sensor may sense azimuth based on an output value of a 2-axis or 3-axis fluxgate which senses earth's magnetic field. When the Z axis is placed in the same direction as that of the earth's magnetic field vector, a reference coordinate system of the geomagnetic sensor may be defined. The direction of the motion sensor's rotated is determined by comparing the sensed azimuth and the reference coordinate system.

When the motion sensor is implemented by using a 3-axis flux gate geomagnetic sensor, the controller 120 may normalize output values of the X, Y, and Z-axis fluxgates to map the fluxgates within a predetermined normalization range. The normalizing may be performed based on an equation having the same form as Equation (1). Normalization factors such as an offset value and a scale value are calculated using a minimum value and a maximum value from among output values of the X, Y, and Z-axis fluxgates, and the normalizing is performed using the normalization factors. The normalization factors such as the offset value and the scale value may be calculated in advance and stored in the storage 130. When there is no offset value or scale value calculated and stored in advance, the flexible apparatus including the geomagnetic sensor is placed in a flat state, a maximum value and a minimum value are measured by rotating the flexible apparatus one time, and an offset value and a scale value are calculated by applying the measured values to Equation (1), and are stored.

When the normalizing is performed, the controller 120 may calculate azimuth by applying a resulting value to the following equation. The equation for calculating the azimuth may be defined variously. For example, the azimuth may be calculated by Equation (5):

$$\lambda = \tan^{-1}(X\text{-axis output value}/Y\text{-axis output value}) \quad \text{Equation (5)}$$

In Equation (5), $\lambda$ is azimuth. When the flexible apparatus is flat, the azimuth may be a yaw angle. The X-axis output value and the Y-axis output value may refer to values that are obtained by normalizing output values of the X-axis and Y-axis fluxgates. Equation (5) may be used when the motion sensor is implemented by using the 2-axis fluxgate geomagnetic sensor only.

When the motion sensor includes both the 3-axis fluxgate geomagnetic sensor and the acceleration sensor, the yaw angle may be calculated more precisely using the pitch angle and the roll angle which are calculated by the acceleration sensor. The controller 120 may calculate the yaw angle using Equation (6):

$$\psi = \tan^{-1}\left( \frac{Y_{noram} * \cos\phi - Z_{norm} * \sin\phi}{X_{noram} * \cos\theta - Y_{noram} * \sin\theta * \sin\phi - Z_{noram} * \sin\theta * \cos\phi} \right) \quad \text{Equation (6)}$$

In Equation (6), $X_{norm}$, $Y_{norm}$, and $Z_{norm}$ are values that are obtained by normalizing output values of axes of an X, Y, and Z-axis fluxgate geomagnetic sensor, $\theta$ is a pitch angle, and $\varnothing$ is a roll angle. Equation (6) is an equation that is set when the value of the Z-axis perpendicular to the horizontal surface is set as a negative number. Equation (6) may have its sign changed according to an axis placement shape of the 3-axis fluxgate in the geomagnetic sensor which is mounted in the flexible apparatus 100.

When the motion sensor is implemented by using the gyro sensor, a relative position which is changed from a previous position by rotation is calculated by integrating an angular velocity of rotation which is sensed by the gyro sensor when the point where the gyro sensor is placed is moved with respect to time. An algorithm for calculating the relative position may be well-known algorithms. For example, a quaternion algorithm may be used. The controller 120 may determine a whole motion by comparing relative positions sensed by the motion sensors.

Figure 22:
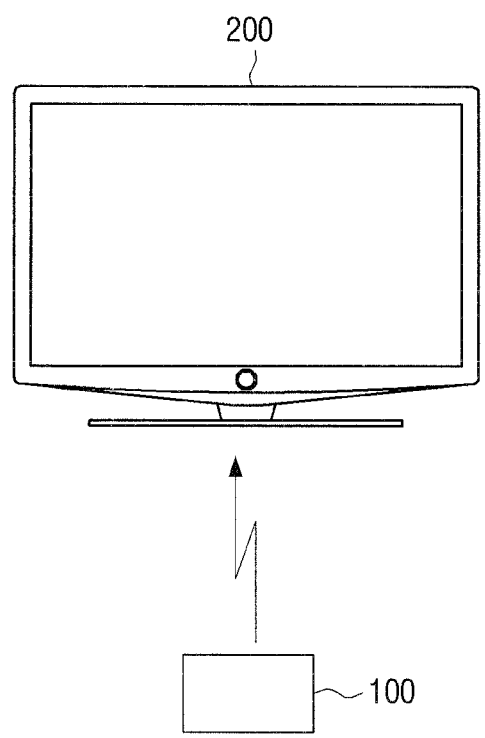
FIG. 22 is a view to illustrate a system for controlling an external apparatus using a flexible apparatus according to an embodiment of the present disclosure.

FIG. 22 is a system for controlling an external apparatus using a flexible apparatus according to various embodiments of the present disclosure.

Referring to FIG. 22, the external apparatus is implemented by using a display apparatus 100 such as a television (TV). The flexible apparatus 100 may be connected to the display apparatus in a wired or wireless manner.

When a variety of bending shapes is sensed as described above, the flexible apparatus 100 transmits a control signal corresponding to the bending shape to the display apparatus 100. The storage 130 stores information on various control commands corresponding to bending shapes. The control command may be a digital code that consists of a combination of code values such as 0 and 1. The controller 130 may transmit the control command using an IR lamp, or may transmit the control command in various wireless communication methods such as Bluetooth, Wi-Fi, Zigbee, and NFC, and may be connected to a wired interface such as a USB and may transmit the control command.

The display apparatus 200 may perform various operations according to a control signal which is transmitted from the flexible apparatus 100. For example, the display apparatus 100 may perform various operations such as turning on, turning off, channel changing, volume control, executing an application, moving a cursor, playing back a content, web browsing, turning a page, and adjusting an image quality.

Although FIG. 22 illustrates a system for controlling the external apparatus, the flexible apparatus may transmit a control command to a web server or other various external servers and may provide a service corresponding to a bending shape.

Figure 23:
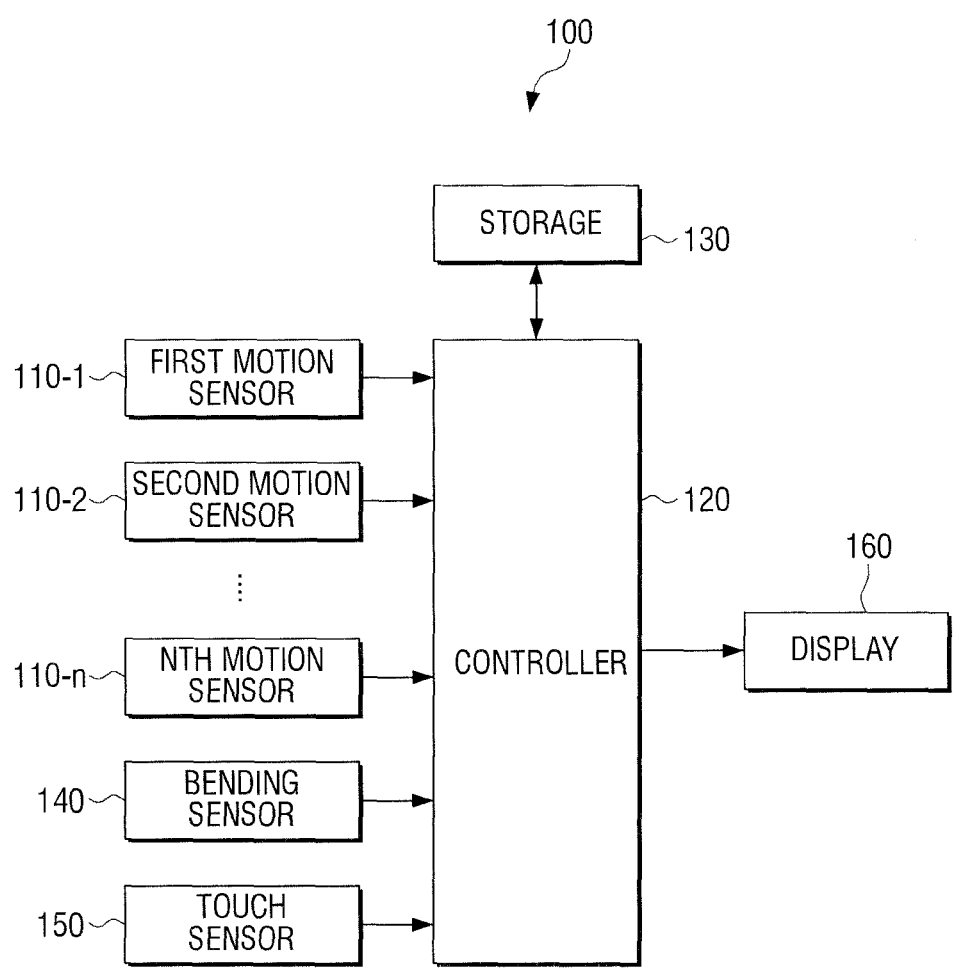
FIG. 23 is a block diagram illustrating a configuration of a flexible display apparatus according to various embodiments of the present disclosure.

FIG. 23 is a block diagram illustrating a configuration of a flexible display apparatus according to an embodiment of the present disclosure.

Referring to FIG. 23, the flexible display apparatus refers to an apparatus that has flexibility and has a display function. The flexible display apparatus 100 includes a plurality of motion sensors 110-1 to 110-n, a controller 120, a storage 130, a bending sensor 140, a touch sensor 150, and a display 160.

The controller 120 may sense a bending shape using the plurality of motion sensors 110-1 to 110-n as described in the above-described various embodiments. However, the controller 120 may also sense the bending shape using the bending sensor 140 and the touch sensor 150 as well. The bending sensor 140 includes a bend sensor and the touch sensor 150 includes a touch sensor. This is described below.

The display 160 displays various screens under the control of the controller 120. The display 160 may display a desktop screen including various icons, a lock screen, a standby screen, an application execution screen, a content playback screen, a folder screen, and a web browsing screen. The controller 120 may configure a screen corresponding to a bending shape and display the screen on the display 160.

An example of the operation corresponding to the bending shape is described below. The display 160 should have flexibility to be bent along with the body of the flexible apparatus.

Figure 24:
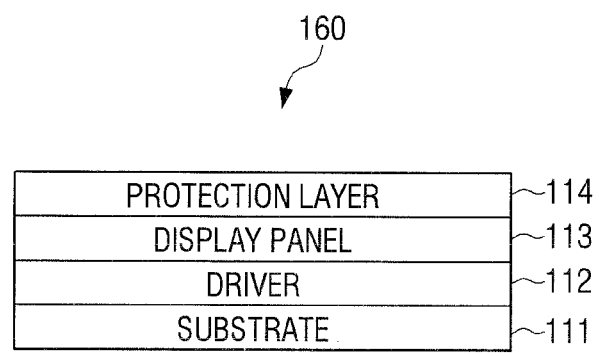
FIG. 24 is a view illustrating a configuration of a display which is included in the flexible display apparatus of FIG. 23 according to an embodiment of the present disclosure.

FIG. 24 is a view illustrating an example of a configuration of a display according to an embodiment of the present disclosure.

Referring to FIG. 24, the display 160 includes a substrate 111, a driver 112, a display panel 113, and a protection layer 114.

The substrate 111 may be a plastic substrate (e.g., a polymer film) which is deformable by an external pressure. The plastic substrate has a structure which is formed by barrier coating opposite surfaces of a base film. The base film may be implemented using various resins, such as Polylmide (PI), PolyCarbonate (PC), polyethyleneterephtalate (PET), polyethersulfone (PES), polythylenenaphthalate (PEN), and Fiber Reinforced Plastic (FRP). The barrier coating is performed on the opposite surfaces of the base film. An organic membrane or an inorganic membrane may be used for the purpose of maintaining flexibility. The substrate 111 may also be formed of a flexible material such as thin glass or metal foil.

The driver 112 drives the display panel 113. The driver 112 applies a driving voltage to a plurality of pixels which constitute the display panel 113, and may be implemented by using a-si TFT, a Low Temperature Poly Silicon (LTPS) TFT, or an Organic TFT (OTFT) and so on. The driver 112 may also be implemented in various forms according to the form of the display panel 113.

For example, the display panel 113 may include an organic light emitting substance which includes a plurality of pixel cells, and an electrode layer which covers opposite surfaces of the organic light emitting substance. The driver 112 may include a plurality of transistors corresponding to the plurality of pixel cells of the display panel 113. The controller 130 applies an electric signal to a gate of each transistor and controls the pixel cells connected to the transistors to emit light. Accordingly, various screens are displayed.

The display panel 113 may be implemented by using an ElectroLuminescent display (EL), an ElectroPhoretic Display (EPD), an ElectroChromic Display (ECD), a Liquid Crystal Display (LCD), an Active Matrix LCD (AMLCD), and a Plasma Display Panel (PDP), in addition to (or instead of) an Organic Light Emitting Diode (OLED). When the display panel 113 is embodied by the LCD, the display panel 113 cannot emit light by itself and thus may require a separate backlight unit. When the LCD does not use backlight, the LCD may use ambient light. In order to use the LCD display panel 113 without the backlight unit, an environment such as an outdoor environment which admits plenty of light may be used to operate the LCD.

The protection layer 114 protects the display panel 113. For example, the protection layer 114 may be made of ZrO, CeO2, or ThO2. The protection layer 114 may be manufactured as a transparent film and may cover the entire surface of the display panel 113.

Unlike in FIG. 24, the display 160 may also be implemented by using electronic paper (e-paper). The e-paper is a display that applies general ink characteristics to paper, and is different from a general flat panel display in that it uses reflected light. The electronic paper may change a picture or text using electrophoresis, which uses a twist ball or a capsule.

When the display 160 includes elements which are made of a transparent material, the display 160 may be implemented as a display apparatus that is bendable and transparent. For example, when the substrate 111 is made of a polymer material such as plastic having transparency, the driver 112 is implemented by using a transparent transistor, and the display panel 113 is implemented by using a transparent organic light emitting layer and a transparent electrode, the display 160 may have transparency.

The transparent transistor refers to a transistor that is manufactured by substituting opaque silicon of an existing thin film transistor with a transparent material such as zinc oxide or titanium oxide. The transparent electrode may be made of advanced materials such as Indium Tin Oxide (ITO) or graphene. Graphene refers to a material that has a planar structure of a honeycomb shape in which carbon atoms are connected to one another, and has transparency. The transparent organic light emitting layer may be implemented by using various materials.

The display 160 may be formed on an overall area or some areas of the flexible display apparatus 100. The motion sensors 110-1 to 110-n, the bending sensor 140, and the touch sensor 150 described above may be provided in the display 160 and may sense whether the display 160 is bent or not.

In the above-described embodiments, the controller 120 may determine the bending shape using a result of sensing by the bending sensor 140 in addition to the result of sensing by the motion sensors. The bending sensor 140 may include a bend sensor. The number and shape of bend sensors are variable. Various examples of the shape of the bend sensor and a method for sensing bending thereof are described below.

Method for Sensing Bending Using Bend Sensor

FIGS. 25 to 38 are views to illustrate various methods for sensing a bending shape of a flexible display apparatus using a bend sensor according to an embodiment of the present disclosure.

Figure 25:
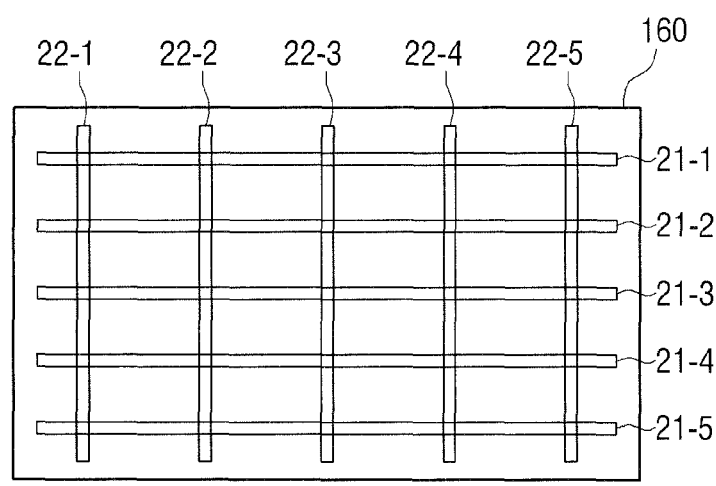
FIGS. 25 to 38 are view to illustrate various methods for sensing a bending shape of a flexible display apparatus using a bend sensors according to an embodiment of the present disclosure.

Referring to FIG. 25, the flexible display apparatus 100 may include a bend sensor which is disposed on one surface such as a front surface or a rear surface of the display 160, or a bend sensor which is disposed on opposite surfaces of the display 160. The bending sensor 140 receives a value sensed by the bend sensor and transmits the value to the controller 120.

The bend sensor refers to a sensor that can be bent and has a resistance value which varies according to a degree of bending. The bend sensor may be implemented in various forms such as an optical fiber bend sensor, a pressure sensor, and a strain gauge.

The controller 120 may sense a resistance value of the bend sensor using a level of a voltage applied to the bend sensor or a magnitude of a current flowing in the bend sensor, and may sense a bending state at a location of the corresponding bend sensor according to the resistance value.

In FIG. 25, the bend sensors may be embedded in a front surface of the display 160. However, this is merely an example and the bend sensors may be embedded in a rear surface of the display 160 or may be embedded in both surfaces. The shapes, number, and locations of the bend sensors may also be variously changed. For example, a single bend sensor or a plurality of bend sensors may be connected with the display 160. The single bend sensor may sense a single bending data and may have a plurality of sensing channels to sense a plurality of bending data.

FIG. 25 illustrates an example of a plurality of bar-shaped bend sensors which are arranged in a vertical direction and a horizontal direction in a grid pattern.

Referring to FIG. 25, the bending sensor 140 includes bend sensors 21-1 to 21-5 which are arranged in a first direction, and bend sensors 22-1 to 22-5 which are arranged in a second direction which is perpendicular to the first direction. The bend sensors are disposed away from one another by a predetermined distance.

In FIG. 25, five bend sensors (21-1 to 21-5, 22-1 to 22-5) are arranged in each of the horizontal direction and the vertical direction in a grid formation. However, this is merely an example and the number of bend sensors may be changed according to a size of the flexible display apparatus. The bend sensors are arranged in the horizontal direction and the vertical direction to sense bending from the entire area of the flexible display apparatus. Accordingly, when only a part of the flexible display apparatus is flexible or when the flexible display apparatus needs to sense bending from only a part of the apparatus, the bend sensor may be arranged in only a corresponding portion of the apparatus.

Each of the bend sensors 21-1 to 21-5, 22-1 to 22-5 may be implemented by using an electric resistance sensor which uses an electric resistance, or a micro optical fiber sensor which uses a strain of an optical fiber. The bend sensor is described below under the assumption that the bend sensor is the electric resistance sensor for the convenience of explanation.

Figure 26:
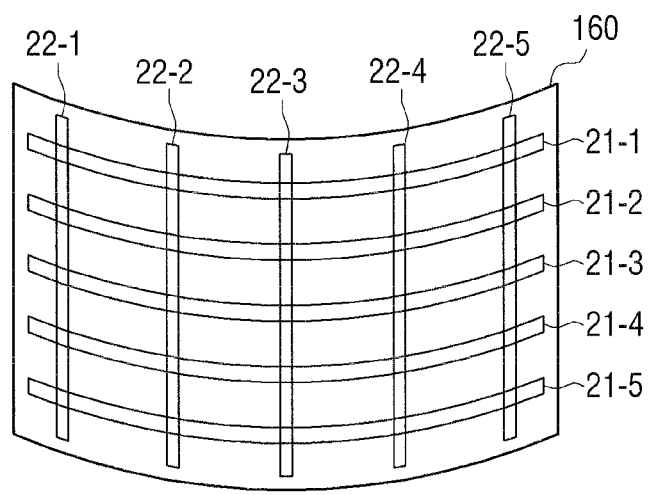

Referring to FIG. 26, when the flexible display apparatus 100 is bent so that the center area with reference to left and right edges is oriented downwardly, tension caused by bending is exerted to the bend sensors 21-1 to 21-5 which are arranged in the horizontal direction. Accordingly, the resistance value of each of the bend sensors 21-1 to 21-5 arranged in the horizontal direction is changed. The bending sensor 140 senses the change in the output value output from each of the bend sensor 21-1 to 21-5 and thus determines that bending is performed in the horizontal direction with reference to the center of a display surface.

In FIG. 26, the center area is bent in a downward direction (a Z− direction) which is perpendicular to the display surface. However, even when the center area is bent in an upward direction (a Z+ direction) with reference to the display surface, the bending may be sensed based on the change in the output values of the bend sensors 21-1 to 21-5 arranged in the horizontal direction. FIG. 10 illustrates bending in the Z+ direction.

Figure 27:
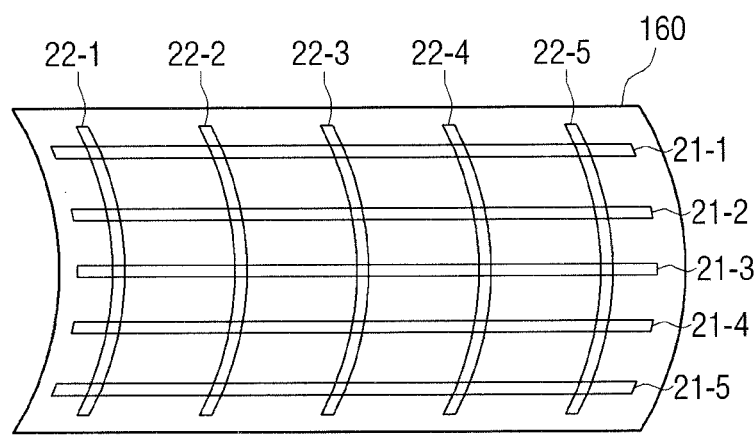

Referring to FIG. 27, when the flexible display apparatus 100 is bent so that the center area with reference to upper and lower edges is oriented upwardly, tension is exerted to the bend sensors 22-1 to 22-5 which are arranged in the vertical direction. The bending sensor 140 may sense shape deformation of the vertical direction based on the output values of the bend sensors 22-1 to 22-5 arranged in the vertical direction.

Figure 28:
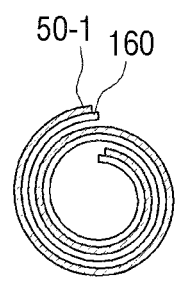

Although the bending in the Z+ direction is illustrated in FIG. 27, bending in the Z− direction may also be sensed using the bend sensors 22-1 to 22-5 which are arranged in the vertical direction. FIG. 28 illustrates bending in the Z− direction.

When shape deformation occurs in a diagonal direction, tension is exerted to all of the bend sensors which are arranged in the horizontal direction and the vertical direction. Accordingly, the shape deformation of the diagonal direction may be sensed based on the output values of the bend sensors which are arranged in the horizontal and vertical directions.

When the flexible display apparatus 100 is bent, the bend sensors, which are arranged on one surface or opposite surfaces of the flexible display apparatus 100, are also bent and have resistance values corresponding to a magnitude of exerted tension, and output values corresponding to the resistance values.

The magnitude of the tension increases in proportion to a degree of bending. For example, when the greatest degree of bending occurs on the center area, the greatest tension is exerted to the bend sensor which is disposed on the center area and the bend sensor has the greatest resistance value. On the other hand, the degree of bending decreases toward the outside. Accordingly, the bend sensor has smaller resistance values as the bend sensor goes away from the center.

When the resistance value output from the bend sensor has the greatest value at a specific point and gradually decreases in outward directions, the bending sensor 140 may determine that the area from which the greatest resistance value is sensed is most significantly bent. When an area has no change in the resistance value, the bending sensor 140 determines that the area is a flat area in which bending is not performed. When an area has the resistance value changed more than a predetermined value, determines that the area is a bent area in which a degree of bending occurs.

The controller 120 may sense a size of a bending line, a direction of the bending line, a location of the bending line, a number of bending lines, a number of times that bending is performed, a bending speed of a shape deformation, a size of a bending area, a location of the bending area, and a number of bending areas, based on a relationship between the points at which a change in the resistance value is sensed.

When a distance between the points at which the change in the resistance value is sensed lies within a predetermined distance, the points are sensed as one bending area. On the other hand, when the distance between the points at which the change in the resistance value is sensed lies beyond the predetermined distance, different bending areas are delineated with reference to these points.

Folding refers to a state in which the flexible display apparatus 100 is bent by more than a predetermined angle. When the resistance value sensed by the bending sensor 140 is greater than or equal to a predetermined value, the flexible display apparatus 100 determines that folding is performed. When the resistance value is less than the predetermined value, the flexible display apparatus 100 determines that general bending is performed.

When the flexible display apparatus 100 is bendable to such an extent that two edges meet with each other, the controller 130 may determine whether the bending is folding, considering touch as well. When the right edge of the flexible display apparatus 100 is bent in the Z+ direction and is folded toward the front surface, areas further away from each other are brought into contact with each other on the front surface of the flexible display apparatus. In this case, touch is sensed in one area of the display surface and a change in the resistance value is greater than that in normal bending. Accordingly, the controller 120 calculates a distance from the edge where bending occurs to the bending line, and, when touch is sensed at a point which is further away from the bending line in the opposite direction as much as the calculated distance, the controller 120 determines that folding is performed.

When folding is performed, the folding area is divided into two areas with reference to a folding line. The folding line refers to a line which connects points at which the greatest resistance value is output in each folding area. The meaning of the folding line may be the same as that of the bending line.

When folding is sensed, the controller 120 may perform a different operation from that of normal bending. For example, the controller 120 may display a different screen on each folding area.

As described above, the flexible display apparatus 100 may be rolled like paper. The controller 120 may determine whether rolling is performed or not using a result sensing by the motion sensors 110-1 to 110-n. A method for determining a rolling using the bend sensor is described below.

Figure 29:
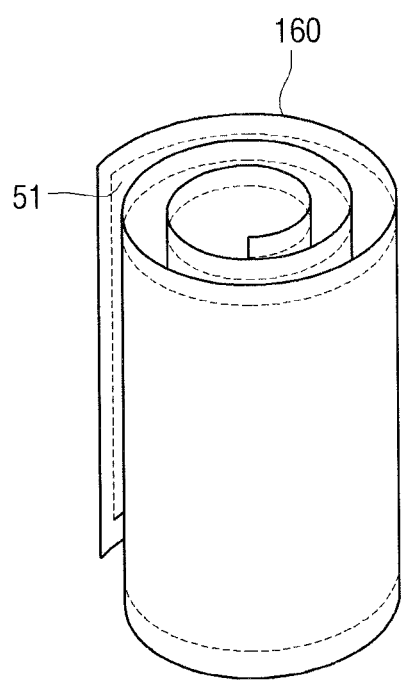
Figure 30:
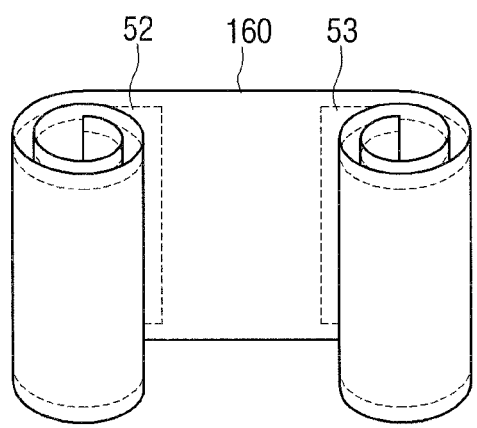

FIGS. 28 to 30 are views to illustrate a method for sensing a rolling of the flexible display apparatus according to an embodiment of the present disclosure.

Referring to FIGS. 28-30, the rolling is also determined based on a bending angle. For example, if bending of more than a predetermined bending angle is sensed over a predetermined area, the bending corresponds to a rolling deformation. On the other hand, if bending of less than the predetermined bending angle is sensed in an area relatively smaller than that of rolling, the bending corresponds to a folding deformation. The normal bending, folding, and rolling described above may be determined based on a radius of curvature besides the bending angle.

A state in which the rolled flexible display apparatus 100 has a substantially circular or oval cross section may be set to correspond to rolling, regardless of a radius of curvature.

FIG. 28 illustrates a cross section view when the flexible display apparatus 100 is rolled. As described above, when the flexible display apparatus 100 is rolled, tension is exerted to bend sensors which are arranged on one surface or opposite surfaces of the flexible display apparatus. In this case, since magnitudes of tension exerted to the bend sensors are deemed to be similar within a predetermined range, resistance values output from the bend sensors are also similar within a predetermined range.

In order to perform the rolling, bending should be performed to have a curvature greater than a predetermined curvature. When the rolling is performed, a bending area greater than that of normal bending or folding is formed. Accordingly, when bending of an angle greater than a predetermined bending angle is performed continuously on an area greater than a predetermined size, the controller 120 determines that rolling is performed. In the rolling state, the front surface and the rear surface of the flexible display apparatus are brought into contact with each other. For example, as shown in FIG. 28, when one edge of the flexible display apparatus 100 is bent in the Z+ direction and is rolled inward the display surface, the display surfaces, (i.e., the front surface and the rear surface on which a bend sensor 50-1 is disposed) are brought into contact with each other.

Accordingly, in another example, the controller 120 may determine whether the flexible display apparatus 100 is rolled according to whether the front surface and the rear surface of the flexible display apparatus 100 are brought into contact with each other or not. In this case, the bending sensor 140 may include the touch sensor 150 as described above. When the resistance values output from the bend sensors are similar within a predetermined range and touch is sensed by the touch sensors disposed on the front surface and the rear surface of the flexible display apparatus, the controller 120 determines that the flexible display apparatus is rolled. The controller 120 may determine whether the flexible display apparatus 100 is bent and some areas of the flexible display apparatus 100 are brought into contact with each other or are close to each other using a magnetic sensor, an optical sensor, or a proximity sensor instead of the touch sensor.

FIGS. 29 and 30 are views to illustrate a method for delineating a rolling area according to an embodiment of the present disclosure.

Referring to FIGS. 29 and 30, the rolling area refers to an entire area of the flexible display apparatus which is bent and rolled. Like in a normal bending or folding, the rolling area refers to one or two or more areas which include all points of bend sensors at which different resistance values from those of the original state are output. The method for defining and dividing the rolling area is the same as that of the bending or folding area, and thus a redundant explanation is omitted.

When the flexible display apparatus 100 is wholly rolled as shown in FIG. 29, an entire area 51 of the flexible display apparatus 100 is defined as the rolling area. When the flexible display apparatus 100 is rolled in part and points at which different resistance values from those of the original state are output and are distanced from each other by a predetermined distance as shown in FIG. 30, then partial areas 52 and 53 of the flexible display apparatus 100 are delineated as different rolling areas.

As described above, the flexible display apparatus 100 is bent in various shapes and the controller 120 senses each bending state based on a result of sensing by the bending sensor 140. The controller 120 may sense a bending shape, a bending location, and a bending direction based on a result of sensing by the bending sensor 140.

Figure 31:
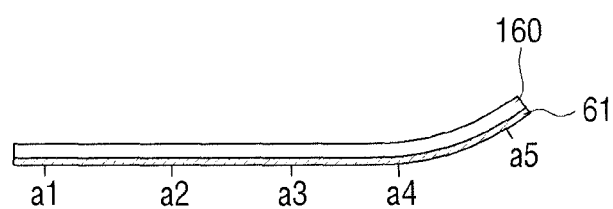
Figure 32:
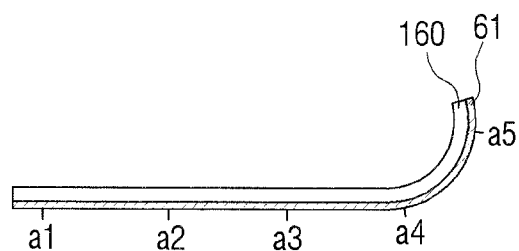

FIGS. 31 and 32 are views to illustrate a method for determining a degree of bending according to an embodiment of the present disclosure.

Referring to FIGS. 31 and 32, the flexible display apparatus 100 determines a degree of bending of the flexible display apparatus 100 using a change in the resistance value output from the bend sensor at a predetermined interval.

The controller 120 calculates a difference between a resistance value of a point where the greatest resistance value of a bend sensor is output and a resistance value output at a point which is disposed away from the point of the greatest resistance value by a predetermined distance.

The controller 120 determines a degree of bending using the calculated difference in the resistance value. The flexible display apparatus 100 divides the degree of bending into a plurality of levels, matches each level with a resistance value of a predetermined range, and stores the matched values.

Accordingly, the flexible display apparatus 100 determines the degree of bending according to which level of the plurality of levels corresponds to the calculated resistance value difference.

For example, as shown in FIGS. 31 and 32, the degree of bending is determined based on a difference between a resistance value output at a point a5 where a bend sensor 61 disposed on the rear surface of the flexible display apparatus 100 outputs the greatest resistance value, and a resistance value output at a point a4 which is disposed away from the point a5 by a predetermined distance.

A level corresponding to the resistance value difference, which is calculated in the embodiment shown in FIGS. 31 and 32, is identified from among the plurality of pre-stored levels, and a degree of bending is determined based on the identified level. The degree of bending may be represented by a bending angle or an intensity of bending.

Since the degree of bending illustrated in FIG. 32 is greater than that of FIG. 31, the difference between the resistance value output at the point a5 and the resistance value output at the point a4 in the embodiment shown in FIG. 32 is greater than the difference between the resistance value output at the point a5 and the resistance value output at the point a4 in the embodiment shown in FIG. 31. Accordingly, when the flexible display apparatus 100 is bent as shown in FIG. 32, the controller 120 may determine that the degree of bending is increased.

The controller 120 may perform an appropriate operation according to a degree of bending. For example, when the degree of bending is increased while a channel changing operation is performed, the controller 120 may increase a channel changing speed or may extend a channel changing range. On the other hand, when the degree of bending is decreased, the channel changing is performed more slowly or within a smaller number of channels. Volume control or content conversion may be performed differently according to the degree of bending.

As described above, the flexible display apparatus 100 may be bent in different directions, a Z+ direction or a Z− direction.

The bending direction may be sensed in various ways. For example, two bend sensors may be disposed one on the other and the bend direction is determined based on a difference of change in the resistance value of each bend sensor. A method for sensing a bending direction using overlapping bend sensors is described below with reference to FIGS. 33 to 35.

Figure 33:
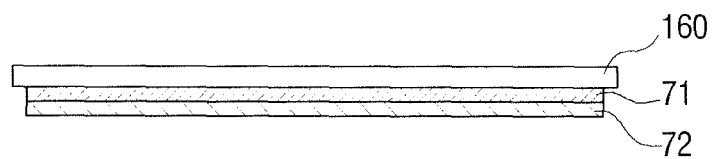
Figure 34:
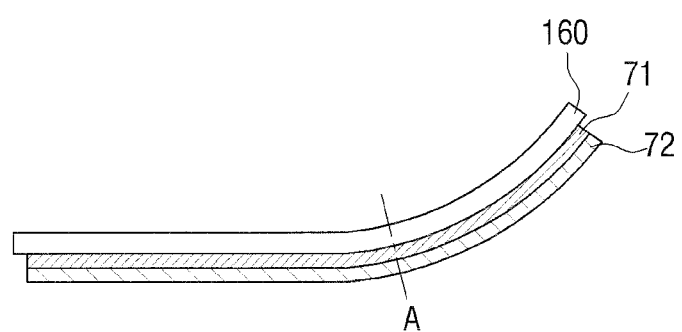
Figure 35:
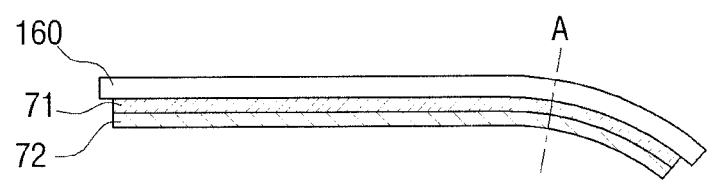

For the convenience of explanation, in FIGS. 33 to 35, the method is explained on the assumption that normal bending is performed. However, the same method may be applied to folding or rolling.

Referring to FIG. 33, two bend sensors 71 and 72 may be disposed overlapping each other on one side of the display 160. In this case, when bending is performed in one direction, different resistance values are output from the upper bend sensor 71 and the lower bend sensor 72 at a point where the bending is performed. Accordingly, a bending direction may be determined by comparing the resistance values of the two bend sensors 71 and 72 at the same point.

When the flexible display apparatus 100 is bent in the Z+ direction as shown in FIG. 34, tension exerted to the lower bend sensor 72 is greater than that of the upper bend sensor 71 at a point 'A' corresponding to a bending line.

On the other hand, when the flexible display apparatus 100 is bent toward the rear surface as shown in FIG. 35, tension exerted to the upper bend sensor 71 is greater than that of the lower bend sensor 72.

Accordingly, the controller 120 senses the bending direction by comparing the resistance values of the two bend sensors 71 and 72 at the point A.

Although the two bend sensors are disposed overlapping each other on one side of the display 160 in FIGS. 33 to 35, the bend sensors may be disposed on opposite surfaces of the display 160.

Figure 36:
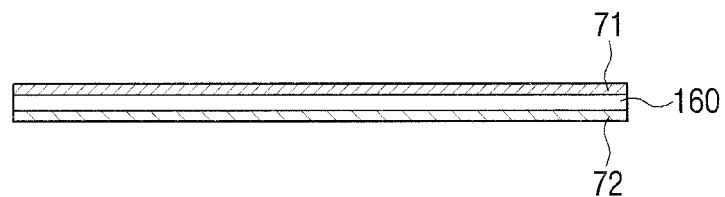

FIG. 36 illustrates the two bend sensors 71 and 72 which are disposed on the opposite surfaces of the display 160. Accordingly, when the flexible display apparatus 100 is bent in a first direction perpendicular to the screen, (i.e., the Z+ direction), the bend sensor which is disposed on a first surface of the opposite surfaces of the display 160 is subject to a compressive force, whereas the bend sensor which is disposed on a second surface is subject to tension. On the other hand, when the flexible display apparatus 100 is bent in a second direction opposite to the first direction, (i.e., the Z− direction), the bend sensor disposed on the second surface is subject to a compressive force, whereas the bend sensor disposed on the first surface is subject to tension. As described above, the different values are detected from the two bend sensors according to the bend direction and the controller 120 determines the bending direction according to a detection characteristic of the value.

Although the bending direction is sensed using the two bend sensors in FIGS. 33 to 36, the bending direction may be sensed using only a strain gauge disposed on one surface of the display 160. A compressive force or tension is exerted to the strain gauge disposed on one surface according to a bending direction, and thus a bending direction can be determined by identifying a characteristic of the output value.

The bend sensor 71 may be implemented in a form of a looped curve forming a circle, a quadrangle, or other polygons, and may be disposed along an edge of the display 160. The controller 120 may determine a point at which a change in an output value of the looped curve is sensed to be a bending area. The bend sensor may be connected to the display 160 in a form of an open curve such as an S shape, a Z shape, or a zigzag shape. The two bend sensors may intersect.

Although line type bend sensors are used in the above-described various embodiments, bending may be sensed using a plurality of separate strain gauges.

Figure 37:
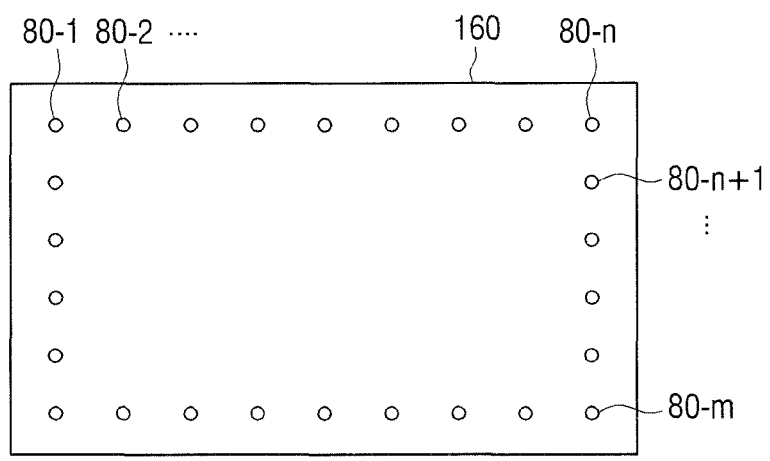
Figure 38:
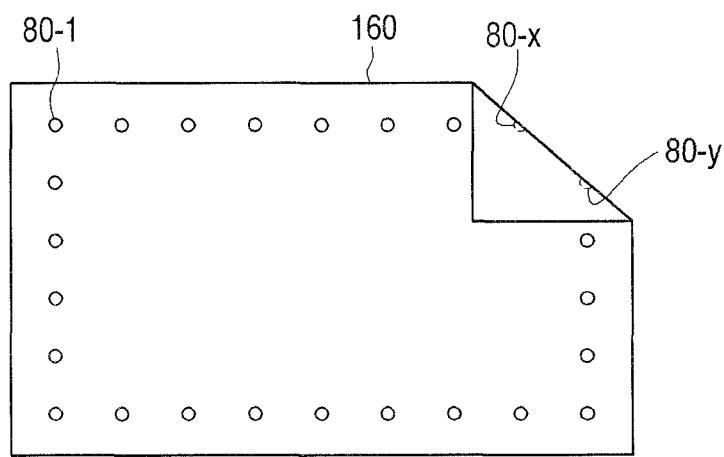

FIGS. 37 and 38 are views to illustrate a method for sensing bending using a plurality of strain gauges according to an embodiment of the present disclosure. The strain gauge uses metal or a semiconductor in which a resistance is greatly changed according to an applied force, and senses deformation of a surface of an object to be measured according to a change in the resistance value. It is common that a material such as metal increases a resistance value when its length is stretched by an external force, and decreases the resistance value when the length is contracted. Accordingly, it is determined whether bending is performed by sensing a change in the resistance value.

Referring to FIG. 37, a plurality of strain gauges are arranged along an edge of the display 160. The number of strain gauges may be changed according to a size and a shape of the display 160, or a predetermined bending sensing resolution, etc.

In the state in which the strain gauges are arranged as shown in FIG. 37, a user may bend a certain point in an arbitrary direction. When a certain corner is bent as shown in FIG. 38, a force is exerted to a strain gauge 80-$x$ overlapped with a bending line from among strain gauges 80-1 to 80-$n$ which are arranged in a horizontal direction. Accordingly, an output value of the corresponding strain gauge 80-$x$ increases in comparison with output values of the other strain gauges. A force is also exerted to a strain gauge 80-$y$ overlapped with the bending line from among strain gauges 80-$n$, 80-$n+1$ to 80-$m$ which are arranged in a vertical direction, and thus an output value is changed. The controller 120 determines that a line connecting the two strain gauges 80-$x$ and 80-$y$ in which the output values are changed is a bending line.

Method for Using Motion Sensors and Bend Sensors and Calibration Thereof

As described above, the flexible display apparatus 100 may determine a bending shape using the motion sensors and the bend sensors altogether.

Figure 39:
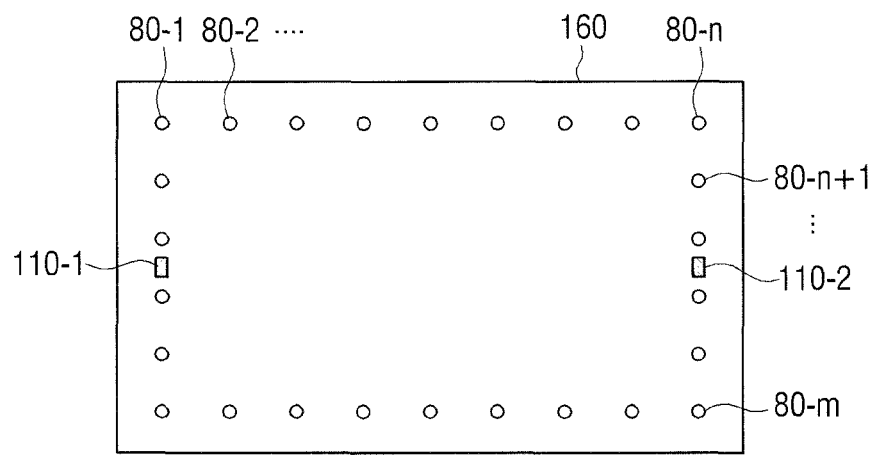
FIG. 39 is a view illustrating a configuration of a flexible display apparatus which includes a bend sensor and a plurality of motion sensors according to an embodiment of the present disclosure.

FIG. 39 is a view illustrating a configuration of a flexible display apparatus which includes a motion sensor and a bend sensor according to an embodiment of the present disclosure.

Referring to FIG. 39, a plurality of bend sensors 80-1 to 80-$m$ are arranged along an edge area of the flexible display apparatus 100. A gap between the bend sensors may be constantly maintained, and the bend sensors may be arranged more densely on a portion where bending is frequently performed and may be arranged with a large gap therebetween on a portion where bending is rarely performed.

The motion sensors 110-1 and 110-2 may be disposed along with the bend sensors. In FIG. 39, two motion sensors 110-1 and 110-2 are disposed on the left and right edges of the flexible apparatus 100. However, the number and location of the motion sensors may be variously changed.

The controller 120 may determine a bending shape using the bend sensors and the motion sensors collectively. For example, when a bending line is determined by the two bend sensors as shown in FIG. 38 and a motion is sensed by the motion sensor which is disposed on one of the two areas divided by the bending line, the controller 120 may determine a bending shape of a corresponding portion based on the motion direction.

The controller 120 may determine a bending line or a bending area using the bend sensor, and may determine a bending direction or a degree of bending using the motion sensor. Accordingly, the controller 120 may determine a bending shape by combining the results of sensing by the bend sensor and the motion sensor.

The controller 120 may determine a bending shape based on sensing values of the bend sensors and determine a bending shape using the motion sensors, and may finally determine that corresponding bending is performed when the results of the determining are consistent with each other. When the results of the determining are not consistent with each other, the controller 120 may determine the bending shape again. When the bending shape is determined using the different types of sensors collectively as described above, the accuracy may be further improved.

When the bend sensors are used, an error characteristic of the bend sensors may be changed due to long use of the flexible apparatus or an environmental effect (temperature, humidity, or etc.). For example, when the bend sensors are used for a long time, the bend sensors may stretch and thus the resistance value at the bending time may be different from that of the initial state.

The controller 120 may perform a calibration operation to compensate for the error characteristic of the bend sensors. When a predetermined calibration shape is sensed, the controller 120 calculates a compensation value based on the sensing values output from the bend sensors while the calibration shape is sensed, and performs the calibration operation to compensate for the sensing values of the bend sensors using the calculated compensation value.

The calibration shape refers to a bending shape which is set to perform the calibration operation of the flexible apparatus 100. For example, the calibration shape refers to bending that is sensed when the flexible apparatus 100 is bent or rolled to have its opposite ends brought into contact with each other and thus bending is sensed by all of the bend sensors disposed on the overall area of the flexible apparatus 100.

The controller 120 may determine whether the calibration shape is sensed or not using the motion sensors and the bend sensors. The motion sensors may be used normally even when an error is generated in the output values of the bend sensors, and thus the controller 120 may determine whether the calibration shape is sensed or not based on only the output values of the motion sensors.

Information on the calibration shape is stored in the storage 130. The manufacturer of the flexible apparatus 100 may measure the output values of the bend sensors when the calibration shape is performed on the flexible apparatus 100 prior to releasing the product, and may store the output values in the storage 130. The sensing values output from the bend sensors when the calibration shape is taken are determined as ideal sensing values, and are stored in the storage 130.

Figure 40:
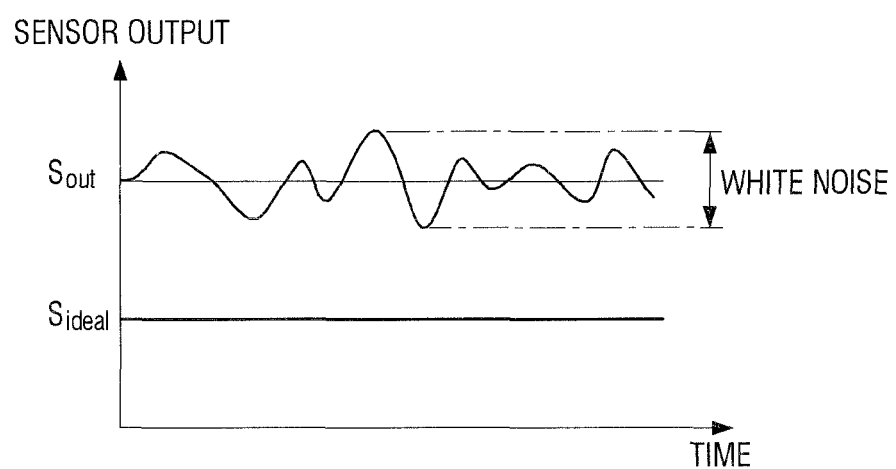
FIGS. 40 and 41 are views to illustrate a method for performing calibration for a bend sensor according to an embodiment of the present disclosure.
Figure 41:
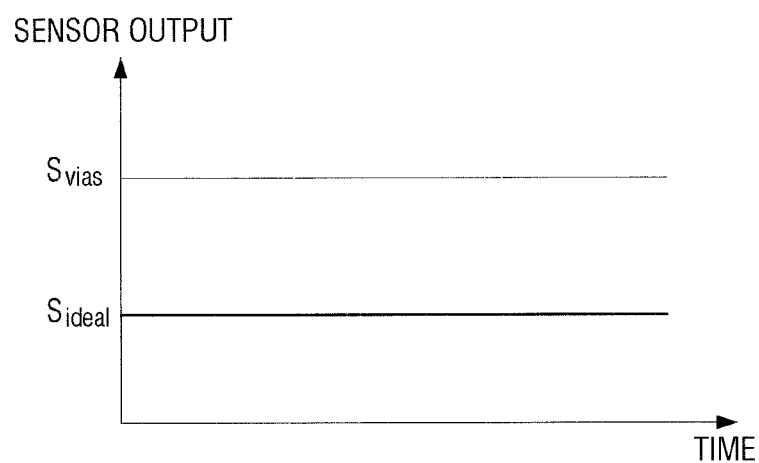

FIGS. 40 and 41 are graphs to illustrate a calibration operation according to an embodiment of the present disclosure.

Referring to FIG. 40, the controller 120 compares an output value ($S_{out}$) which is output from the bend sensor when the calibration shape is taken, and an ideal sensing value ($S_{ideal}$) which is stored in the storage 130. In this case, white noise is included in the real output value ($S_{out}$) as shown in FIG. 40. The controller 120 removes the white noise by averaging the real output values ($S_{out}$) on a predetermined time basis.

FIG. 41 illustrates a vias value ($S_{vias}$) of the real output value from which the white noise is removed according to an embodiment of the present disclosure.

Referring to FIG. 41, the controller 120 compares the vias value ($S_{vias}$) and the ideal sensing value ($S_{ideal}$) and determines a difference between them as a compensation value, and stores the determined compensation value in the storage 130. Accordingly, the calibration operation is completed.

The controller 120 may compensate for the error by deducting the compensation value from an output value which is output from the bend sensor when the calibration shape is withdrawn. Although the vias value is sensed greater than the ideal sensing value in FIG. 41, the vias value may be sensed less than the ideal sensing value according to a placement location of the bend sensor and a characteristic of the calibration shape. In this case, the controller 120 may compensate for the error by adding the compensation value to the real output value.

In the above-described embodiment, the controller 120 automatically performs the calibration operation when the calibration shape is sensed. However, the calibration operation may start according to a separate command. For example, the controller 120 may perform the calibration operation when a button provided on a body of the flexible apparatus 100 is pressed by the user or a calibration menu displayed on the screen of the flexible apparatus 100 is pressed. In this case, when selection of the button or the calibration menu is sensed, the controller 120 may output a guide message to ask whether to take the calibration shape through the screen or speaker. When the user takes the calibration shape within a predetermined time, the controller 120 may perform the calibration operation using an output value which is output from the bend sensor at that state.

In FIGS. 40 and 41, the compensation value is calculated by comparing the output values and the ideal output value which has been already stored. However, a reference value may be changed through the calibration operation. For example, when the calibration operation starts, the controller 120 calculates the vias value by averaging the output values output from the bend sensors when the calibration shape is maintained. The controller 120 sets the calculated vias value as a reference value and stores the value in the storage 130. When the calibration shape is withdrawn, the controller 120 determines the bending state by comparing the output values output from the bend sensors after that and the reference value stored in the storage 130. According to the present embodiment, the user frequently performs the calibration operation and updates the reference value, so that the accuracy of determination of the bending shape can be improved.

The flexible apparatus 100 may be implemented by using a general apparatus without a display function, or may be implemented by using a flexible display apparatus with a display function as described above. The flexible apparatus 100 may be implemented by using a portable apparatus such as a mobile phone, a tablet PC, a Personal Digital Assistant (PDA), a laptop PC, and an electronic book from among the flexible display apparatuses. In particular, when the flexible apparatus 100 is implemented by using a portable apparatus such as a smartphone which has become popular recently, the flexible apparatus 100 may include various elements.

Figure 42:
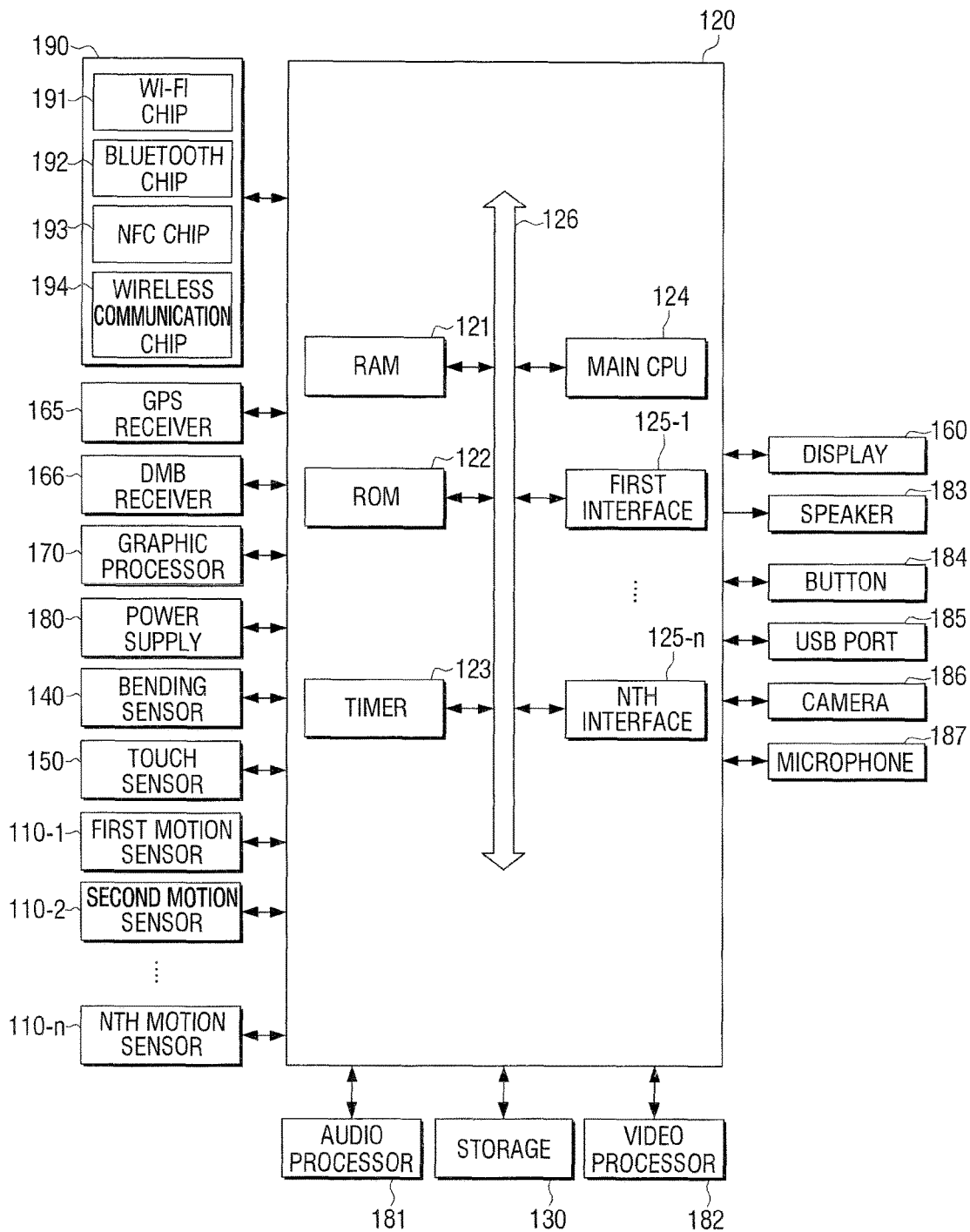
FIG. 42 is a block diagram illustrating a configuration of a flexible display apparatus according to various embodiments of the present disclosure.

FIG. 42 is a block diagram illustrating an example of a flexible apparatus which includes various elements according to an embodiment of the present disclosure.

Referring to FIG. 42, the flexible apparatus includes a plurality of motion sensors 110-1 to 110-n, a controller 120, a storage 130, a bending sensor 140, a touch sensor 150, a display 160, a GPS receiver 165, a DMB receiver 166, a graphic processor 170, a power supply 180, an audio processor 181, a video processor 182, a speaker 183, a button 184, a USB port 185, a camera 186, a microphone 187, and a communicator 190.

The configurations and the operations of the motion sensors 110-1 to 110-n, the bending sensor 140, and the display 160 have been described above in detail.

The touch sensor 150 may include a touch sensor which is implemented by using a capacitive type or a resistive type of sensor. The capacitive type calculates touch coordinates by sensing minute electricity excited in a user's body when a part of the user's body touches the surface of the display 160, using a dielectric substance coated on the surface of the display 160. The resistive type includes two electrode plates, and, when a user touches a screen, calculates touch coordinates by sensing an electric current flowing due to contact between upper and lower plates at the touched point. As described above, the touch sensor may be embodied in various forms. The controller 120 may determine a shape of a touch manipulation based on a sensing signal which is sensed by the touch sensor 150. The touch manipulation may include simple touch, tap, touch and hold, move, flick, drag and drop, pinch in, and pinch out.

Although not shown in FIG. 42, the flexible apparatus may include a pressure sensor, a proximity sensor, and a grip sensor in addition to the bending sensor 140 and the touch sensor 150.

The pressure sensor senses a magnitude of pressure exerted to the flexible apparatus 100 when the user performs a touch or bending manipulation, and provides the magnitude of pressure to the controller 120. The pressure sensor may include a piezo film which is embedded in the display 160 and outputs an electric signal corresponding to the magnitude of pressure. When the touch sensor 150 is implemented by using a resistive touch sensor, the resistive touch sensor may also perform the function of the pressure sensor. The proximity sensor senses a motion which approaches without directly contacting the display surface. The proximity sensor may be implemented by using various types of sensors such as a high-frequency oscillation type proximity sensor which forms a high frequency magnetic field and detects an electric current induced by a magnetic characteristic which is changed when an object approaches, a magnetic type proximity sensor which uses a magnet, and a capacitive type proximity sensor which detects capacitance that changes when an object approaches, etc. The grip sensor is disposed on a border, a bezel, or a handle of the flexible apparatus separately from the pressure sensor, and senses a user's grip. The grip sensor may be implemented by using a pressure sensor or a touch sensor.

The controller 120 determines a bending shape of the user by analyzing various sensing signals which are generated by various types of sensors such as the motion sensor 110-1 to 110-n, the bending sensor 140, the touch sensor 150, the pressure sensor, the proximity sensor, and the grip sensor, and performs an operation corresponding to the bending shape. The controller 120 may perform a control operation according to various input methods such as a touch manipulation, motion input, voice input, and button input, besides the bending.

The controller 120 may execute an application which is stored in the storage 130, may configure an execution screen of the application, and may display the execution screen. The controller 120 may play back various contents which are stored in the storage 130. The controller 120 may communicate with external apparatuses through the communicator 190.

The communicator 190 may communicate with various types of external apparatuses according to various communication methods. The communicator 190 may include various communication chips such as a Wi-Fi chip 191, a Bluetooth chip 192, a Near Field Communication (NFC) chip 193, and a wireless communication chip 194.

The Wi-Fi chip 191, the Bluetooth chip 192, and the NFC chip 193 communicate with external apparatuses in a Wi-Fi method, a Bluetooth method, and an NFC method, respectively. The NFC chip 193 is operated in the NFC method, which uses 13.56 MHz from among various RF-ID frequency bands such as 135 kHz, 13.56 MHz, 433 MHz, 860~960 MHz, and 2.45 GHz. When the Wi-Fi chip 191 or the Bluetooth chip 192 is used, a variety of connection information such as an SSID and a session key is exchanged and connection is established using the connection information, and a variety of information is exchanged. The wireless communication chip 194 communicates with external apparatuses according various communication standards such as IEEE, Zigbee, $3^{rd}$ generation (3G), $3^{rd}$ Generation Partnership Project (3GPP), and Long Term Evolution (LTE).

The GPS receiver 165 receives a GPS signal from a GPS satellite and calculates a current position of the flexible apparatus 100.

The DMB receiver 166 receives and processes a DMB signal.

The graphic processor 170 generates a screen including various objects such as an icon, an image, and text using a calculator (not shown) and a renderer (not shown). The calculator calculates attribute values of each object to be displayed according to a layout of the screen, such as coordinates values, a shape, a size, and a color. The renderer generates a screen of various layouts including objects based on the attribute values calculated by the calculator. The screen generated by the renderer is displayed on a display area of the display 160.

The power supply 180 is an element that supplies power to each element of the flexible apparatus 100. The power supply 180 may include an anode collector, an anode electrode, an electrolyte, a cathode electrode, a cathode collector, and a sheath enclosing the aforementioned elements. The power supply 180 may be implemented by using a secondary cell which can be charged or discharge electricity. The power supply 180 may be implemented in a flexible form so that the power supply 180 can be bent along with the flexible apparatus 100. In this case, the collectors, the electrodes, the electrolyte, and the sheath may be made of flexible materials. A detailed configuration and materials of the power supply 180 will be explained in detail below.

The audio processor 181 is an element that processes audio data. The audio processor 181 may perform various processing operations such as decoding, amplification, and noise filtering with respect to the audio data.

The video processor 182 is an element that processes video data. The video processor 182 may perform various image processing operations such as decoding, scaling, noise filtering, frame rate conversion, and resolution conversion with respect to the video data.

The audio processor 181 and the video processor 182 may be used to process multimedia content or DMB signals and reproduce them.

The display 160 displays a video frame processed by the video processor 182 and the screen generated by the graphic processor 170.

The speaker 183 outputs various notification sounds or voice messages as well as various audio data processed by the audio processor 181.

The button 184 may be implemented by using various kinds of buttons such as a mechanical button, a touch button, and a wheel, which are formed on a certain area of the flexible apparatus 100, such as a front surface, a side surface, and a bottom surface of a body exterior of the flexible apparatus 100.

The USB port 185 may communicate with various external apparatuses through a USB cable.

The camera 186 is an element that captures a still image or a moving picture according to control of the user. The camera 186 may be a plurality of cameras including a front camera and a rear camera.

The microphone 187 receives a user's voice or other sounds and converts the sounds into audio data. The controller 120 may use the user's voice input through the microphone 187 for a call process or may convert the user voice to audio data and store the audio data in the storage 130.

When the camera 186 and the microphone 187 are provided, the controller 120 may perform control operations according to a user voice which is input through the microphone 187 or a user motion which is recognized by the camera 186. The flexible apparatus 100 may be controlled by shape deformation or touch and also may be operated in a motion control mode or a voice control mode. In the motion control mode, the controller 120 activates the camera 186 and captures a user, traces a change in the user motion, and performs a corresponding control operation. In the voice control mode, the controller 120 may perform voice recognition by analyzing a user voice input through the microphone 187 and performing a control operation according to the analyzed user voice.

In addition, the flexible apparatus 100 may further include various external input ports to be connected to various external terminals, such as a headset, a mouse, and a Local Area Network (LAN).

The above-described operation of the controller 120 may be performed by a program which is stored in the storage 130. The storage 130 may store Operating System (O/S) software to drive the flexible apparatus 100, various applications, various data which is input or set when an application is executed, and various data such as content, bending shapes, characteristic information of motion sensors, and reference information.

The controller 120 controls the overall operation of the flexible apparatus 100 using various programs stored in the storage 130.

The controller 120 includes a Random Access Memory (RAM) 121, a Read Only Memory (ROM) 122, a timer 123, a main Central Processing Unit (CPU) 124, first to nth interfaces 125-1~125-n, and a bus 126.

The RAM 121, the ROM 122, the timer 123, the main CPU 124, and the first to the nth interfaces 125-1~125-n may be connected to one another through the bus 126.

The first to the nth interfaces 125-1~125-n are connected to the above-described various elements. One of these interfaces may be a network interface which is connected to an external apparatus through a network.

The main CPU 124 accesses the storage 130 and performs booting using the O/S stored in the storage 130. The main CPU 124 performs various operations using the various programs, content, and data stored in the storage 130.

The ROM 122 stores a set of commands to boot the system. When a turn on command is input and power is supplied, the main CPU 124 copies the O/S stored in the storage 130 to the RAM 121 according to a command stored in the ROM 122, executes the O/S and boots the system. When the booting is completed, the main CPU 124 copies the various applications stored in the storage 130 into the RAM 121, executes the applications copied into the RAM 121, and performs various operations.

When a sensing signal of a sensor is received, the main CPU 124 stores diverse information on the operations at that point of time, such as an application or a function that has been performed before, or a screen layout which is being displayed at that point of time, in the storage 130. The main CPU 124 also determines which type of bending is performed based on the sensing signal.

As described above, the plurality of motion sensors 110-1 to 110-n output sensing values corresponding to their states when the portions where those sensors are arranged are tilted or rotated by bending. In this case, signs and sizes of the sensing values of the motion sensors 110-1 to 110-n which are disposed on different locations vary according to a bending shape. Accordingly, relationships between the sensing values are arranged as a database in advance and stored in the storage 130. The main CPU 124 executes a program to determine a type of bending. The main CPU 124 may determine a type of bending corresponding to sensing values based on the database which is stored in the storage 130 as the program is executed.

The main CPU 124 may control the timer 123 to count a time. Accordingly, when no sensing signal is changed for a predetermined time, the main CPU 124 determines that bending and hold is performed. When sensing signals are not maintained and are continuously changed, and return to their original values, the main CPU 124 determines that bending and flat in which the flexible apparatus is unbent after having been bent is performed. As described above, the main CPU 124 may distinguish bending and flat and bending and hold using the timer 123.

When the determination is completed, the main CPU 124 identifies information on a function matched with the determined bending shape from the storage 130, loads an application for performing the function into the RAM 121, and executes the application.

In FIG. 42, the flexible apparatus is illustrated as an apparatus which is equipped with various functions such as a function of communicating, a function of receiving a broadcast, a function of reproducing a video, and a display function for example, and various elements of the flexible display apparatus 100 are schematically illustrated. Accordingly, some of the elements illustrated in FIG. 42 may be omitted or modified, or another element may be added.

As described above, the controller 120 may perform various operations by executing a program stored in the storage 130.

Figure 43:
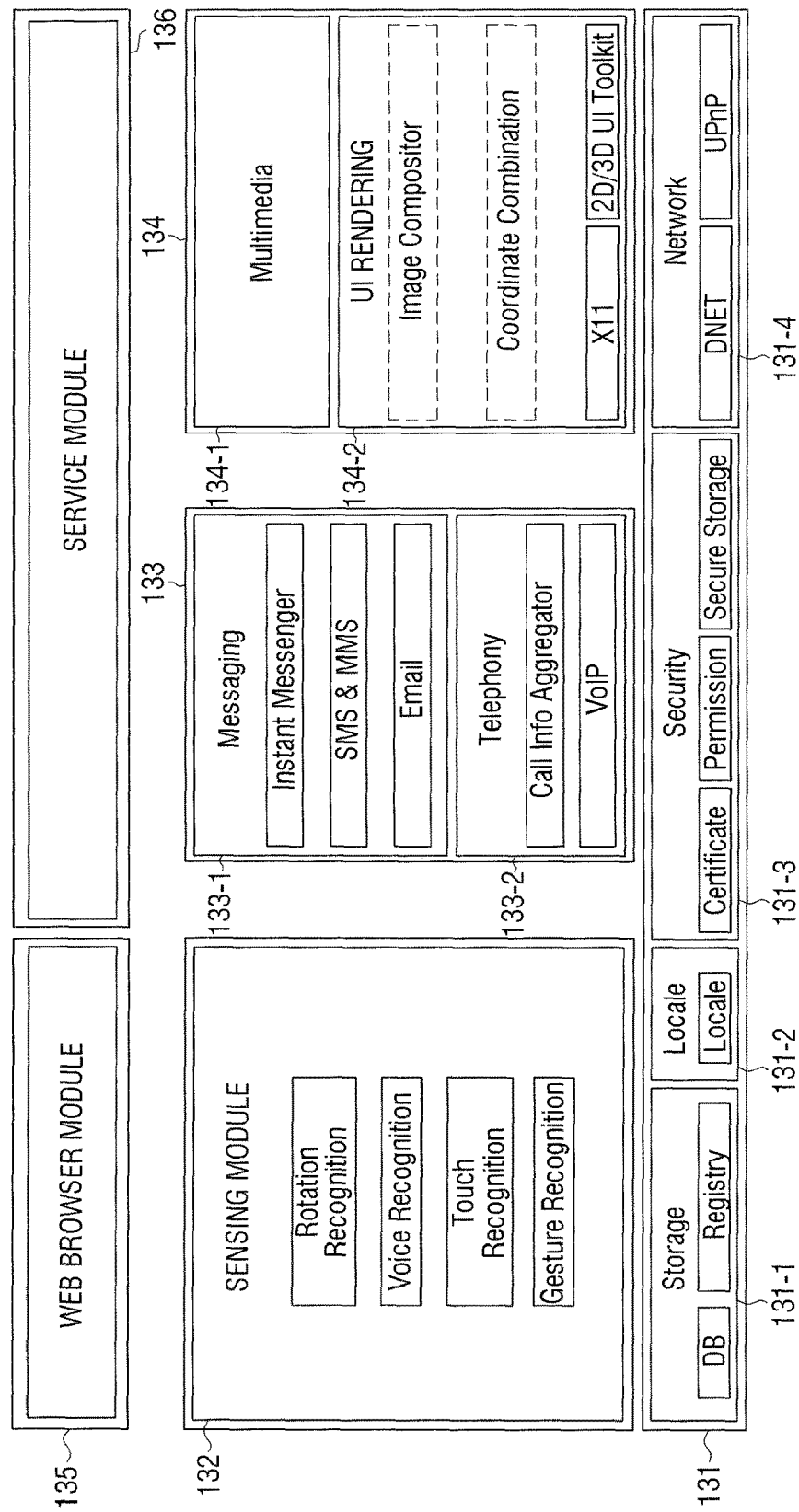
FIG. 43 is a view illustrating a configuration of a program which is stored in a storage according to an embodiment of the present disclosure.

FIG. 43 is a view to explain software stored in a storage according to an embodiment of the present disclosure.

Referring to FIG. 43, software including a base module 131, a sensing module 132, a communication module 133, a presentation module 134, a web browser module 135, and a service module 136 may be stored in the storage 130.

The base module 131 processes signals transmitted from hardware included in the flexible apparatus 100 and transmits the signals to an upper layer module.

The base module 131 includes a storage module 131-1, a location-based module 131-2, a security module 131-3, and a network module 131-4.

The storage module 131-1 is a program module which manages a DataBase (DB) or a registry. The main CPU 134 may access the database in the storage 130 using the storage module 131-1, and may read out various data. The location-based module 131-2 is a program module which is interlocked and/or interacts with various hardware such as a GPS chip and supports a location-based service. The security module 131-3 is a program module which supports certification for hardware, permission of a request, and a secure storage. The network module 131-4 is a module to support network connection, and includes a Distributed.net (DNET) module and a Universal Plug and Play (UPnP) module.

The sensing module 132 is a module which collects information from various sensors, and analyzes and manages the collected information. The sensing module 132 detect manipulation attributes such as coordinates values of a point where touch is performed, a touch moving direction, a moving speed, and a moving distance. The main CPU 124 executes the sensing module 132 and calculates a pitch angle, a roll angle, and a yaw angle using sensing values which are sensed by the plurality of motion sensors. In this case, the above-described equations may be used. The main CPU 124 may determine a bending shape by comparing characteristic relationships of the pitch angle, the roll angle, and the yaw angle and a pre-stored database. When the database is generated based on the sensing values, the main CPU 124 may not calculate the pitch angle, the roll angle, and the yaw angle, and may determine the bending shape by detecting bending shape information corresponding to the sensing values sensed by the motion sensors from the database. In addition, according to circumstances, the sensing module 132 may include a face recognition module, a voice recognition module, a motion recognition module, and an NFC recognition module.

The communication module 133 is a module to communicate with an external apparatus. The communication module 133 includes a messaging module 133-1, such as a messenger program, a Short Message Service (SMS) and Multimedia Message Service (MMS) program, and an email program, and a telephony module 133-2 which includes a call information aggregator program module and a Voice over Internet Protocol (VoIP) module.

The presentation module 134 is a module which generates a display screen. The presentation module 134 includes a multimedia module 134-1 to reproduce multimedia content and output the multimedia content, and a User Interface (UI) rendering module 134-2 to process a UI and graphics. The multimedia module 134-1 may include a player module, a camcorder module, and a sound processing module. Accordingly, the multimedia module 134-1 generates a screen and a sound by reproducing various multimedia content. The UI rendering module 134-2 may include an image compositor module to combine images, a coordinate combination module to combine coordinates on a screen to display an image and generate coordinates, an X11 module to receive various events from hardware, and a 2D/3D UI toolkit to provide a tool for configuring a UI of a 2D or 3D format.

The web browser module 135 is a module which performs web-browsing and accesses a web server. The web browser module 135 may include a web view module to render and view a web page, a download agent module to download, a bookmark module, and a web-kit module.

The service module 136 is a module which includes various applications to provide services matched with a bending shape when the bending shape is determined. The service module 136 may include various program modules such as a navigation program, a content reproducing program, a game program, an e-book program, a calendar program, a notification management program, and other widgets. Each program module may be matched with various shape deformation states such as bending and flat or bending and hold.

Although various program modules are illustrated in FIG. 43, some of the program modules may be omitted, modified, or added according to type and characteristic of the flexible apparatus 100. For example, if the flexible apparatus 100 is implemented by using a remote controller which excludes the display function and controls an external apparatus with only the flexibility, the presentation module 134, the web browser module 135, or the service module 136 may be excluded. In this case, only a module to detect a characteristic of a bending shape and a registry to indicate information on a control signal matched with the bending shape may be stored in the storage 130.

On the other hand, when the plurality of motion sensors are provided, much power may be consumed in each motion sensor. Accordingly, the controller 120 may activate the plurality of motion sensors only when necessary.

Figure 44:
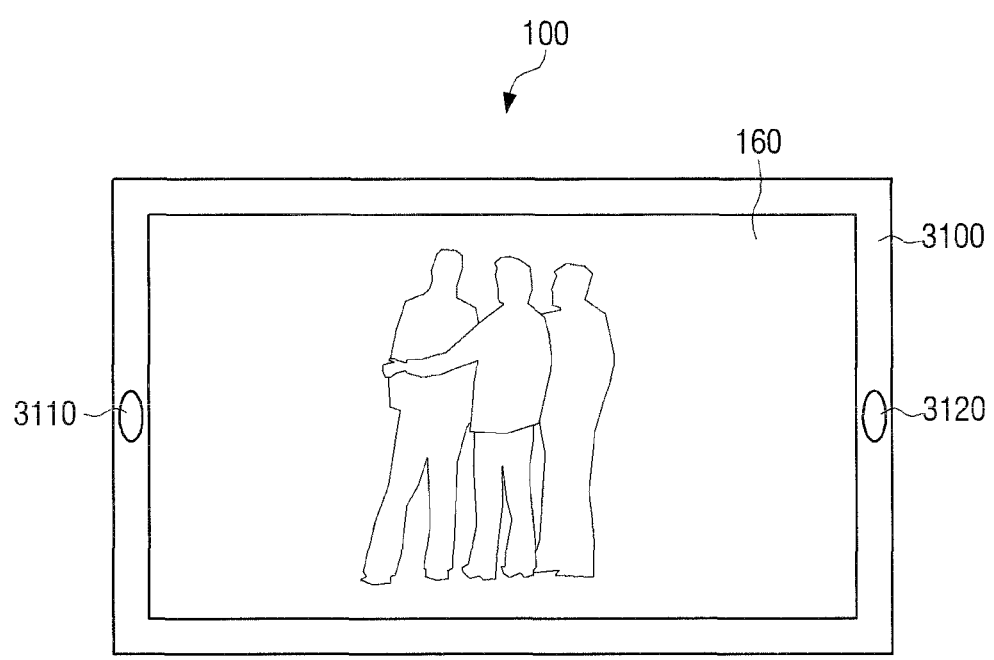
FIGS. 44 and 45 are views to illustrate a method for activating a motion sensor according to a user touch according to an embodiment of the present disclosure.
Figure 45:
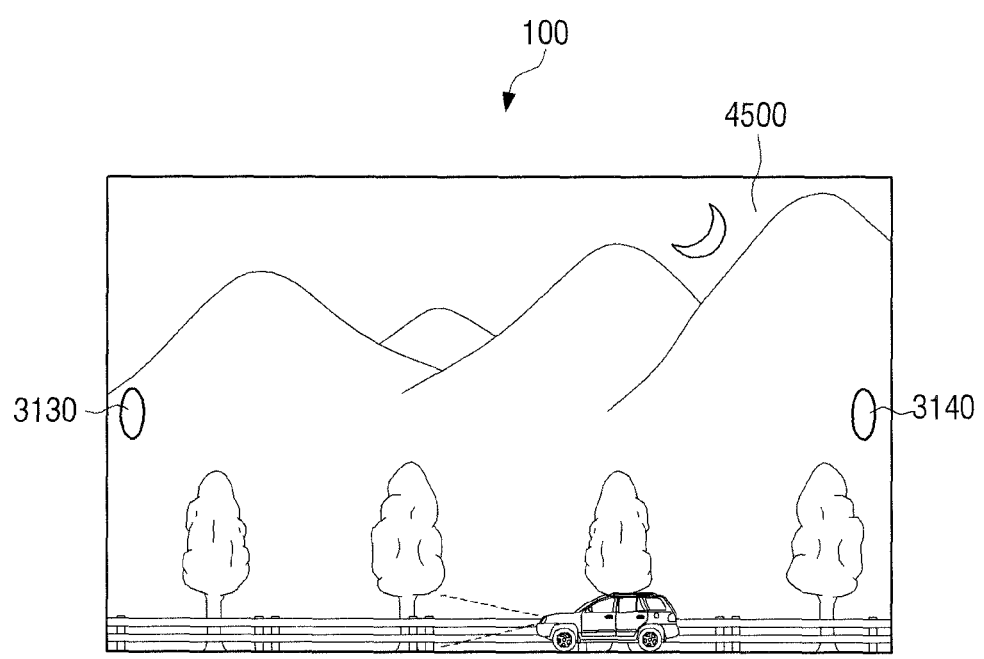

FIGS. 44 and 45 are views to illustrate a method for activating a motion sensor according to a user touch according to an embodiment of the present disclosure.

Referring to FIG. 44, the flexible apparatus 100 includes a bezel 3100 which is formed along an edge of the display 160.

The bezel 3100 may also be made of a flexible material so that it can be bent along with the display 160. Buttons 3110 and 3120 are provided on the bezel 3100. When a user touch on at least one of the buttons 3110 and 3120 is sensed, the controller 120 may activate the motion sensors. In this case, the other sensors such as bend sensors and touch sensors may be activated along with the motion sensors. The activating recited herein refers to an operation of supplying power to the motion sensors. The controller 120 may activate the sensors for a predetermined time since a user touch is performed. When bending is sensed from each of the sensors including the motion sensors, the controller 120 extends the activating time of the sensors.

The user may bend the flexible apparatus 100 while selecting the above-described buttons 3110 and 3120. When both the buttons 3110 and 3120 are touched and bending is performed, the controller 120 may recognize that the user is holding and bending the flexible apparatus 100 with both hands. When only one button is touched and bending is performed, the controller 120 may recognize that the user is holding and bending the flexible apparatus 100 with one hand. The controller 120 may disregard a bending manipulation that is sensed when none of the buttons 3110 and 3120 is touched.

Although the two buttons 3110 and 3120 are illustrated in FIG. 44, the number of buttons may be changed according to an embodiment and locations of the buttons may also be changed to various different locations. The buttons 3110 and 3120 may also be implemented by using a touch button or other types of buttons besides the mechanical button.

Although FIG. 44 illustrates buttons 3110 and 3120 provided on the bezel 3100, the button may be implemented in a dome key form or may be implemented by using a part of a touch screen panel or a part of a touch pad. Additionally, when the user's grip on a specific location is sensed using a grip sensor or a proximity sensor which is disposed on a specific location of the flexible apparatus 100, the controller 120 may determine that a button is selected.

Although FIG. 44 illustrates the bezel 3100, the bezel 3100 may be omitted according to a type of the flexible apparatus 100. In this case, a button may be provided on a side of the flexible display apparatus 100.

A virtual button may be displayed on the screen of the display 160. FIG. 45 is a view illustrating the flexible apparatus 100 which does not include the bezel 3100.

Referring to FIG. 45, an entire front surface of the flexible apparatus 100 may serve as the display 160. In this case, since there is no bezel 3100, there is no space for the buttons 3110 and 3120. Accordingly, in this case, button menus 3130 and 3140 may be displayed on certain areas on the screen 4500. When at least one of the button menus 3130 and 3140 is selected, the controller 120 may activate each of the sensors including the motion sensors.

The button menus 3130 and 3140 shown in FIG. 45 may be displayed in various shapes such as a circle, a quadrangle, and a star shape. In addition, a brightness of the buttons may be increased, different surface textures may be given to the buttons, or local vibration may be generated, without marking a location of the button, so that the user can recognize the location.

According to another embodiment, the button menus 3130 and 3140 may not be displayed and the sensors may be activated within only a predetermined time since a certain area of the screen 4500 is touched, or only while a certain area of the screen 4500 is touched.

As described above, the flexible apparatus 100 may include various hardware elements and software elements, and thus may provide various services. The services may be matched with bending shapes and may be controlled by the user. An operation corresponding to a bending shape may vary according to an application which is executed in the flexible apparatus when bending is performed.

Examples of various control operations which are performed according to bending shapes are described below.
Examples of Control Operations According to Bending Shapes FIG. 46 illustrates an example of a control operation which is performed when one edge is bent according to an embodiment of the present disclosure.

Figure 46:
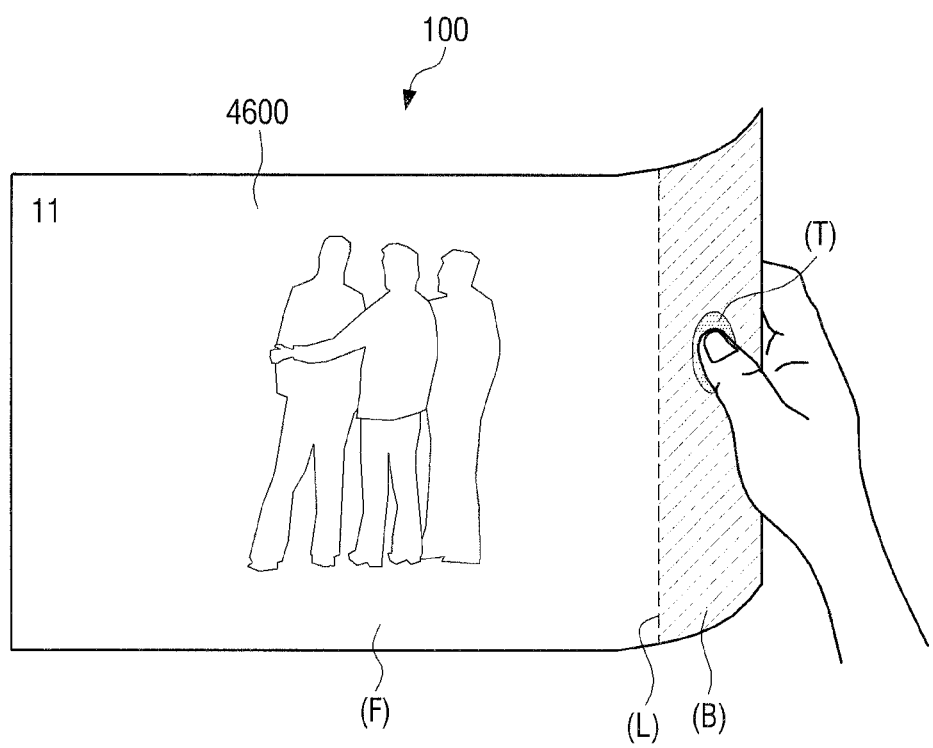
FIGS. 46 to 54 are views to illustrate various examples of operations which are performed according to bending shapes according to an embodiment of the present disclosure.
Figure 46:
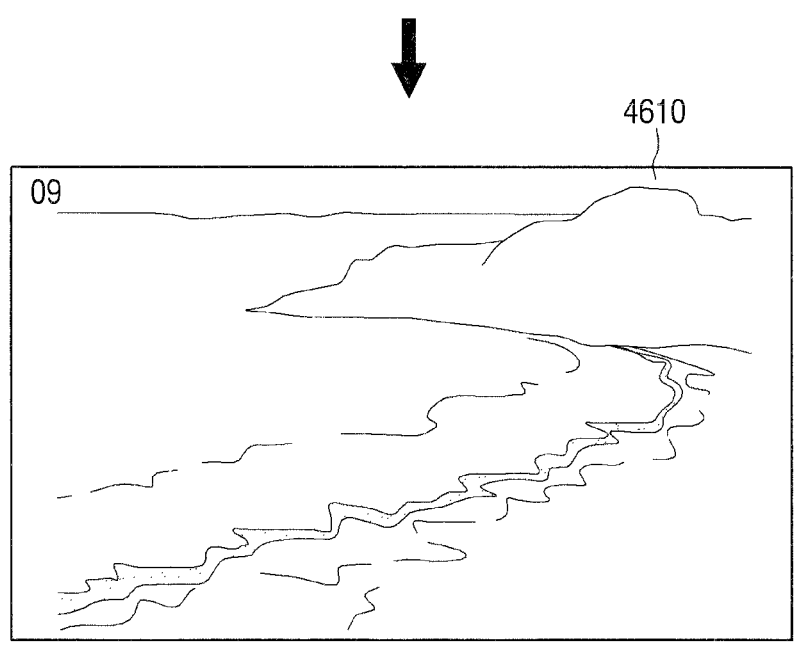

Referring to FIG. 46, the user bending manipulation is performed when the flexible apparatus 100 executes a Digital Media Broadcast (DMB) application. In this case, a broadcast screen may be displayed only on the flat area (F) other than the bending area (B).

In the state in which a broadcast screen 4600 received through broadcast channel 11 is displayed as shown in FIG. 46, when a user bending manipulation including bending one edge in the Z+ direction and then unbending it is performed as shown in FIG. 46, the flexible apparatus 100 may perform a channel changing operation to broadcast screen 4610. Broadcast channel 11 is changed to a previous broadcast channel, such as broadcast channel 9. When the bending is performed in the Z− direction in the same way or the left edge is bent, broadcast channel 11 is changed to a next broadcast channel, such as broadcast channel 13.

In FIG. 46, when a bending angle increases, a channel changing speed may increase or a channel changing range may increase. That is, channel changing, which has been performed by one channel, is performed by 5 or 10 channels. In FIG. 46, the channel changing operation is performed by the user bending manipulation. However, this is merely an example. Various other operations may be matched with the bending shape and may be performed.

Figure 47:
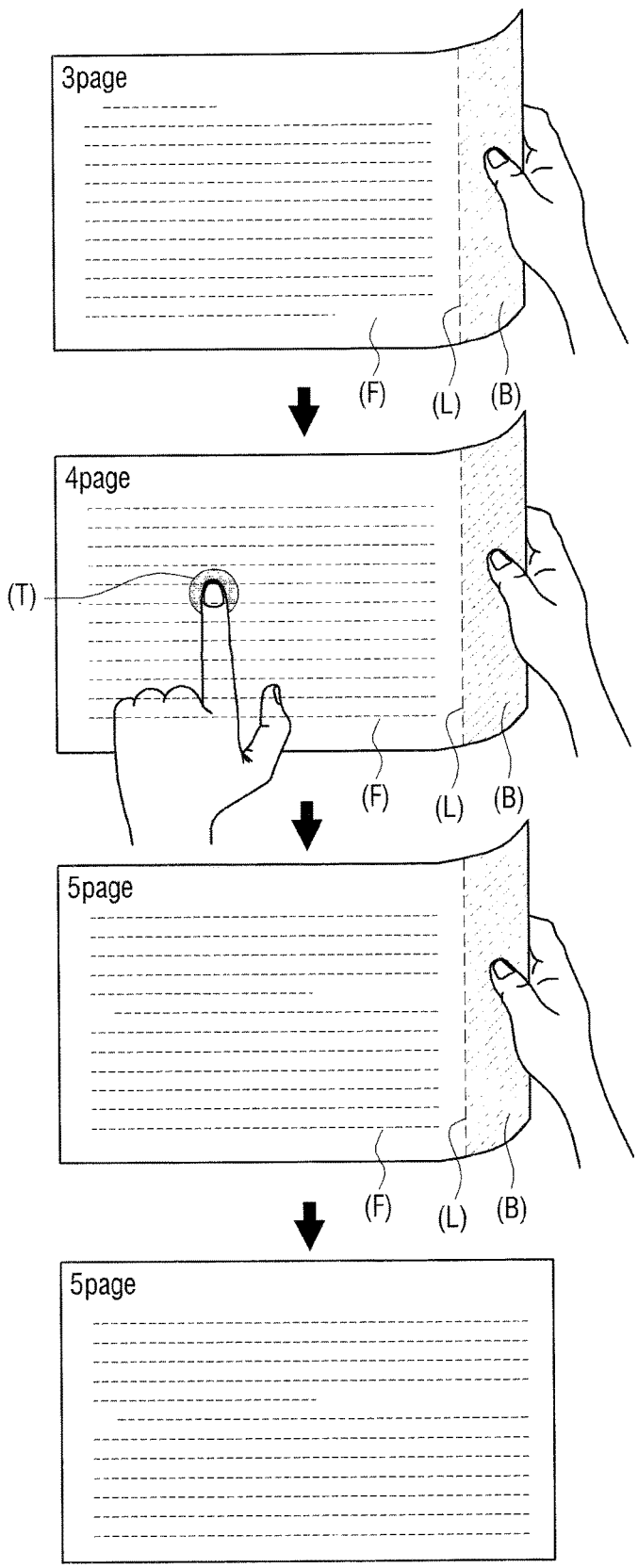

FIG. 47 illustrates an example of an operation when bending and touch are simultaneously performed according to an embodiment of the present disclosure. In FIG. 47, the flexible display 100 is executing an e-book application.

Referring to FIG. 47, when the user holds the right edge of the display 160 and bends the display 160 in the Z+ direction, the next page (page 4) of a current page (page 3) is displayed on the display 160.

When the user continues to bend the right edge in the Z+ direction, the next page (page 5) is displayed on the display 160.

When the user touches the screen of the display 160 in this process, a bookmark is set on the corresponding page.

When the user terminates bending when page 5 is being displayed and the entire area of the display 160 becomes flat, page 5 is continuously displayed on the display 160.

Figure 48:
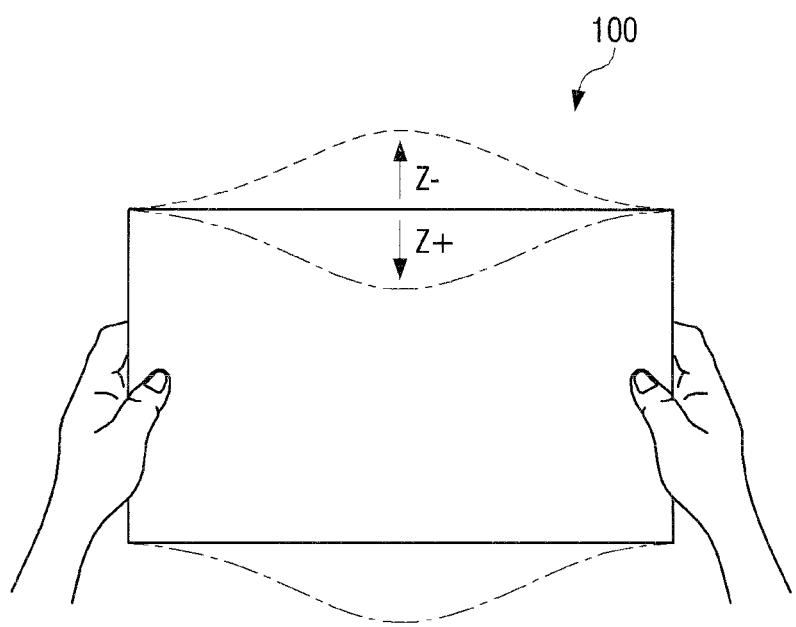

FIG. 48 is a view to explain a swinging operation according to an embodiment of the present disclosure.

Referring to FIG. 48, when the user holds the flexible apparatus 100 with both hands and moves the flexible apparatus 100 repeatedly up and down, bending in the Z+ direction and bending in the Z− direction are alternately performed. The method for determining a swinging operation has been described above and thus a redundant explanation is omitted.

When the swinging operation is performed, the flexible apparatus 100 performs an operation corresponding to the swinging operation. For example, when a swinging operation is performed while various objects such as an icon, an image, text, and a photo, etc. are being displayed on the display 160, the flexible apparatus 100 may delete the objects one by one.

Figure 49:
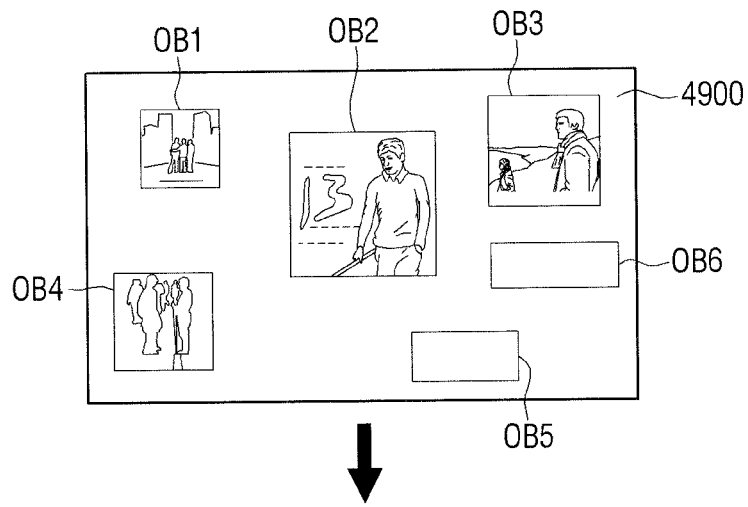
Figure 49:
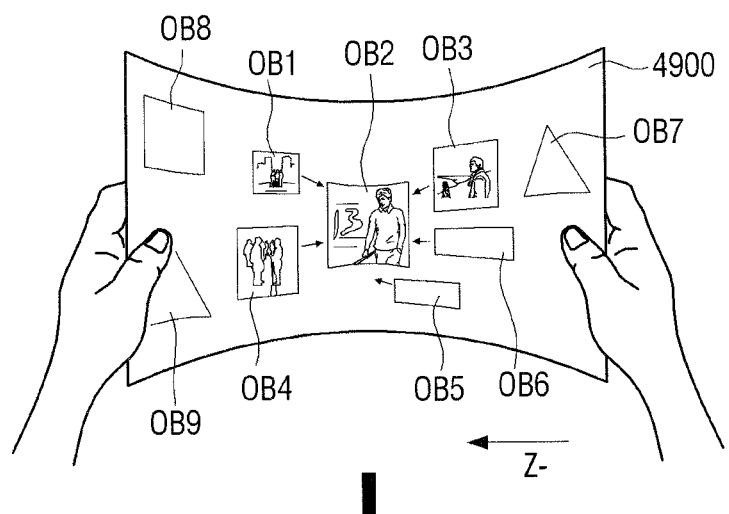
Figure 49:
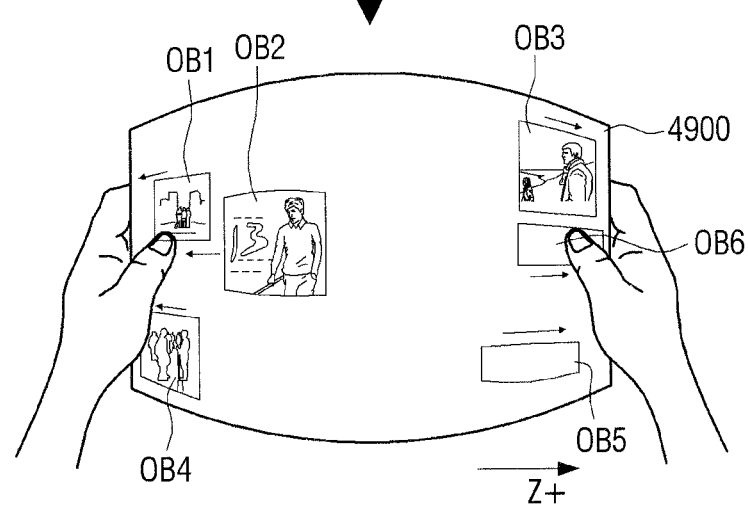

FIG. 49 is a view to explain an example of an operation which is performed when the user holds the flexible apparatus 100 with both hands and bends it according to an embodiment of the present disclosure.

Referring to FIG. 49, when bending is performed in the Z− direction while a plurality of objects OB1 to OB6 are displayed on a screen 4900 of the display 160, the objects OB1 to OB6 displayed on the screen are moved toward a bending line. In addition, objects OB7 to OB9 that are not displayed in a flat state are newly displayed and are moved toward the bending line.

If bending is performed in the Z+ direction, the objects are moved toward opposite edges with reference to the bending line. Accordingly, the objects that are moved to the opposite edges disappear from the screen.

In FIG. 49, when bending in the Z− direction and bending in the Z+ direction are alternately repeated at a high speed, the flexible apparatus 100 determines that a swinging operation is performed. Accordingly, the objects displayed on the screen disappear one by one as if they are shaken off from the screen.

Figure 50:
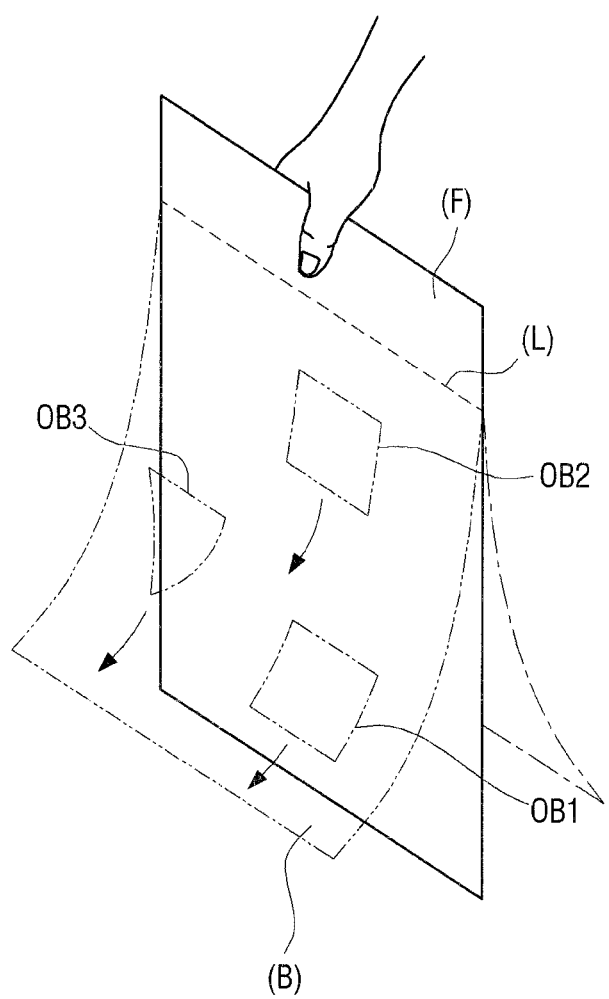

FIG. 50 is a view to explain a shaking operation according to an embodiment of the present disclosure.

Referring to FIG. 50, when the user holds one edge of the flexible apparatus 100 and shakes the flexible apparatus 100, the flexible apparatus 100 is alternately bent in the Z+ direction and the Z− direction. One part which is held by the user is maintained in a flat state (F) and the other part is bent with reference to a boundary line (L) so that a bending area (B) is formed. As shown in FIG. 50, a direction in which the user holds the flexible apparatus 100 is defined as an X+ direction and the opposite direction is defined as an X− direction.

When a shaking operation is performed while a plurality of objects OB1, OB2, and OB3 are displayed on the screen of the display 160 as shown in FIG. 50, the objects are moved in the X− direction and displayed. When the objects OB1, OB2, and OB3 are moved to the edge of the X− direction, the objects are deleted.

Figure 51:
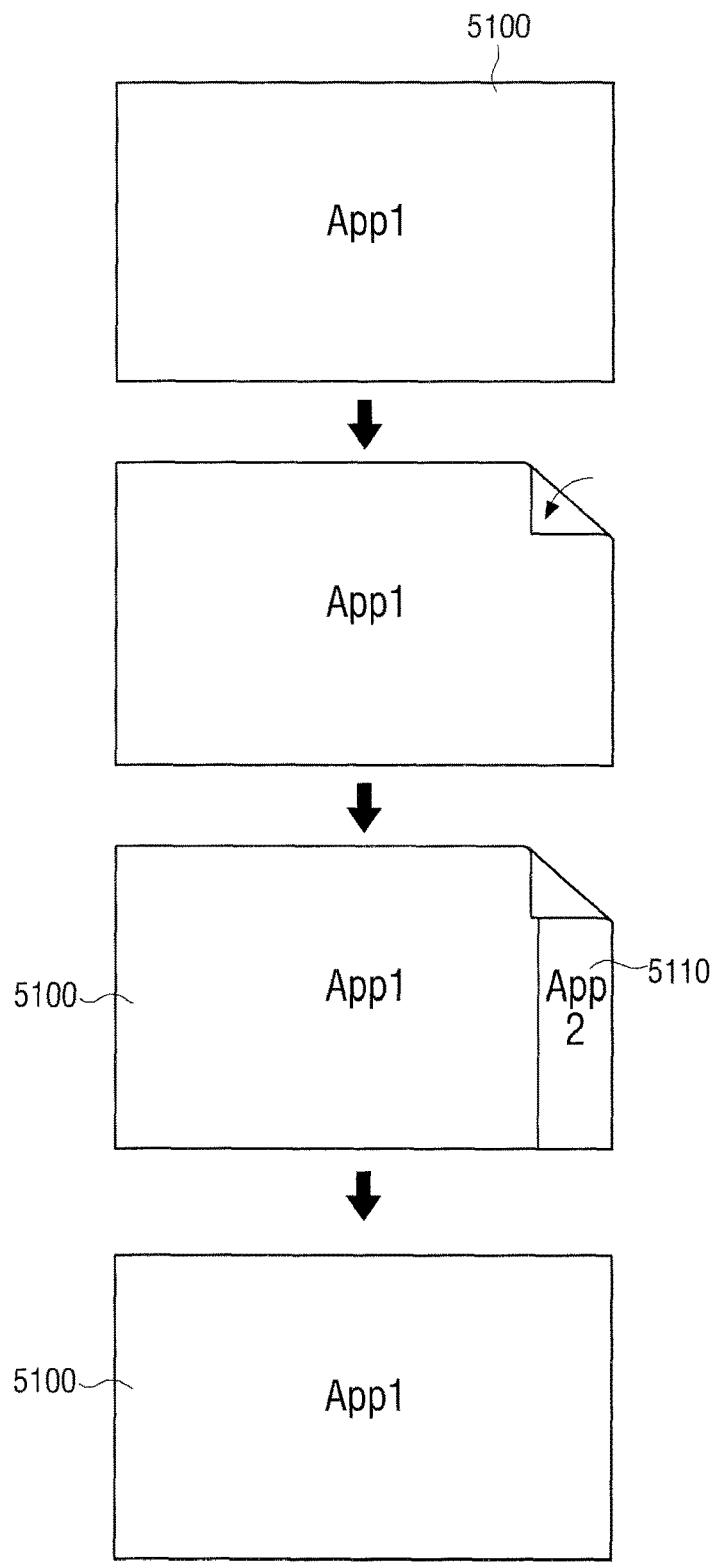

FIG. 51 is a view illustrating an operation of the flexible apparatus which is performed when bending and hold is performed on a corner according to an embodiment of the present disclosure.

Referring to FIG. 51, in a state in which a first application APP1 is executed and an execution screen 5100 is displayed, when a corner is bent and the bent state is maintained, a new area 5110 is opened on an edge including the corner. An edge is divided with reference to an end point of the boundary line and the new area 5110 is opened on the edge.

The flexible apparatus 100 displays an execution screen of another application APP2 which is different from the original screen 5100 on the new area 5110.

When a touch is performed on the two areas in which a plurality of different applications are executed as described above, a background screen or other basic user interfaces may be displayed instead of the application execution screens displayed on the two areas. For example, when the two areas are touched simultaneously or when a gesture of touching the two areas simultaneously and spreading fingers apart in a horizontal direction is performed, the two areas 5100 and 5110 are separated from each other horizontally and the screen is converted into the background screen or the basic UI.

Also, when multi-touch is performed on the two areas 5100 and 5110 and a flick is performed in a manner that touched points are moved in a direction toward a boundary, the execution screens of the applications APP1 and APP2 are changed with each other. In this state, if the hold state is released, the original screen 5100 is restored.

In FIG. 51, the two areas 5100 and 5110 are clearly divided with reference to one boundary line. However, when general bending which has a radius of curvature greater than a predetermined value is performed rather than bending having a small radius of curvature such as folding, a boundary line between the screens may be formed softly. The application execution screens may be overlapped with each other on the bent area and a transparent gradation effect may be applied so that the two areas can be naturally displayed, or a mosaic effect is applied so that the two areas can be represented as being overlapped with each other.

Figure 52:
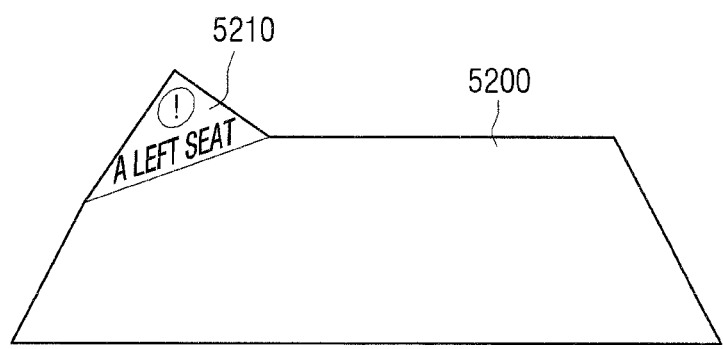

FIG. 52 is a view illustrating another example of an operation which is performed when bending and hold is performed on a corner according to an embodiment of the present disclosure.

Referring to FIG. 52, a notification window displaying diverse state information about a currently executed application may be displayed on a corner. When the flexible apparatus 100 executes a messenger program, an execution screen of the messenger program is displayed on a screen

5200 as show in FIG. 52. In this state, a notification window 5210 may display information indicating a current state of a user or a user's interlocutor.

The user may change the state by touching the notification window 5210. Referring to FIG. 52, when the notification window 5210 is touched, the current state of the user is changed to a state 'Do Not Disturb'. Information on this state is displayed on the notification window 5210. The user may turn off the state 'Do Not Disturb' by displaying the notification window 5210 again. The notification window 5210 may also display information on an acquaintance who logs in.

When the notification window 5210 is not required any longer, the user may spread the corner and may make the notification window 5210 disappear. In FIG. 52, the bending and hold is performed on the corner in a diagonal direction and the message displayed on the notification window is aligned in parallel with the bending line. However, this should not be considered as limiting. The angle of the aligning direction of the message may be rotated in a clockwise direction so that the message can be aligned in parallel with an upper edge of the screen 5200 rather than the bending line.

Figure 53:
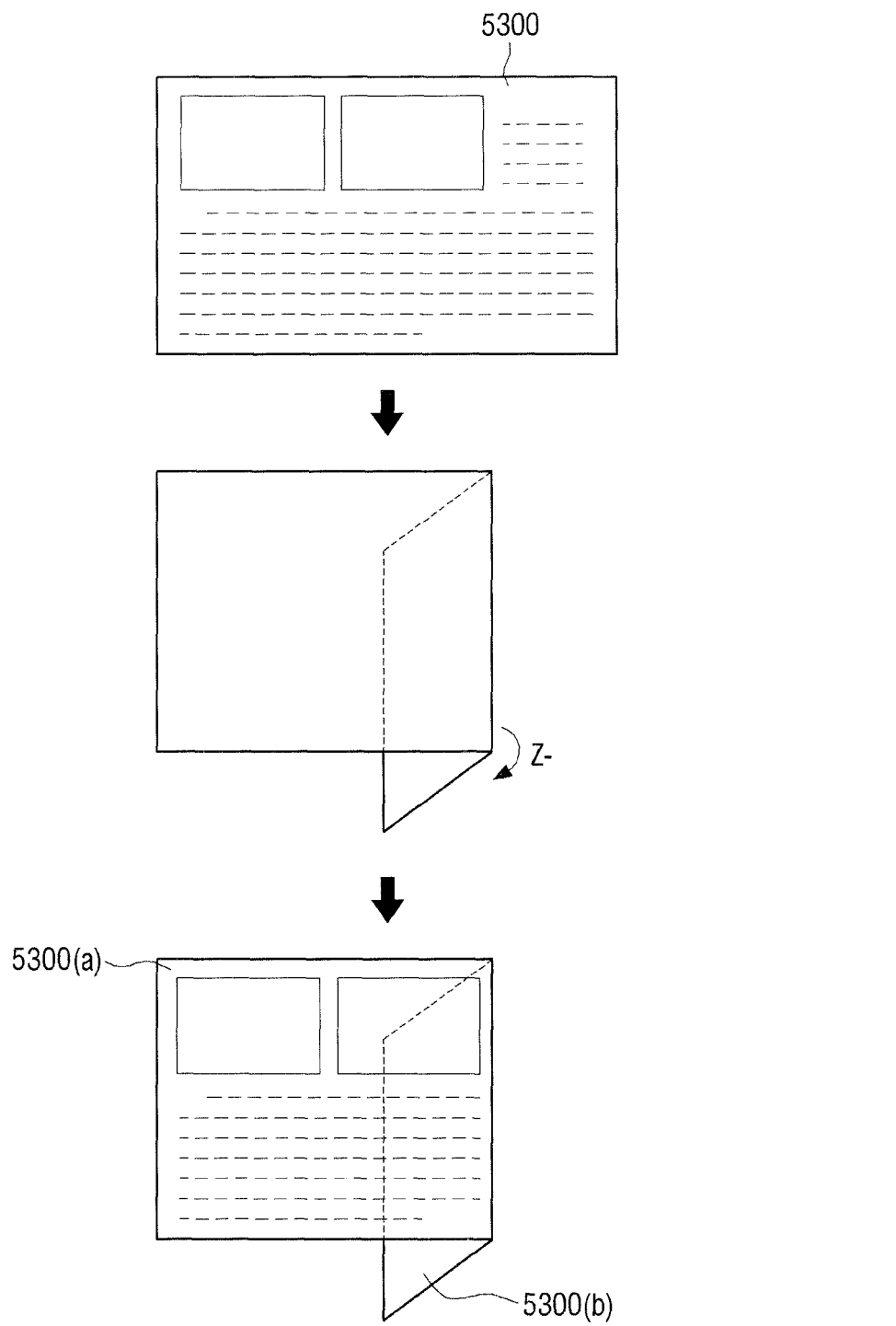

FIG. 53 is a view illustrating another example of a function which is performed when bending is performed according to an embodiment of the present disclosure.

Referring to FIG. 53, when a certain area is bent backward while a certain screen 5300 is displayed, the screen is divided into two screens with reference to a boundary line. The original screen 5300 is displayed on a first area 5300 (*a*) of the divided screens. In this case, a layout and a size of the original screen 5300 may be adjusted according to the first area 5300 (*a*). The other screen, a second area 5300(*b*), is closed.

In FIG. 53, the flexible apparatus 100 is bent in a vertical direction. However, the same operation may be performed when the flexible apparatus 100 is bent in a horizontal direction or a diagonal direction. For example, in FIG. 53, when the flexible apparatus 100 is bent in the diagonal direction and the state is held, the screen is divided into two triangular screens. One of the screens may display thumbnail images or a list, and the other screen may enlarge an object which is selected from the thumbnail images or the list and display the object.

When the flexible apparatus 100 is folded in the opposite direction to FIG. 53, and the opposite edges are brought into contact with each other with reference to the center of the screen, the controller 120 may turn off the flexible apparatus 100, inactivate only the display 160, or may convert the state into a standby state. In this state, when the two areas contacting each other are separated from each other by more than a predetermined gap, the flexible apparatus 100 may be automatically turned on or the display 160 is turned on. The brightness of the screen may be adjusted according to an unfolding angle or time.

As described above, the bending may be performed in various shapes in various locations, and accordingly, various applications or functions may be executed or a screen layout may be changed.

In the above-described embodiments, a width length of the display 160 is longer than a height length. However, this is merely an example. A size, a shape, and an aspect ratio of the display 160 may vary according to a type of the flexible apparatus.

Figure 54:
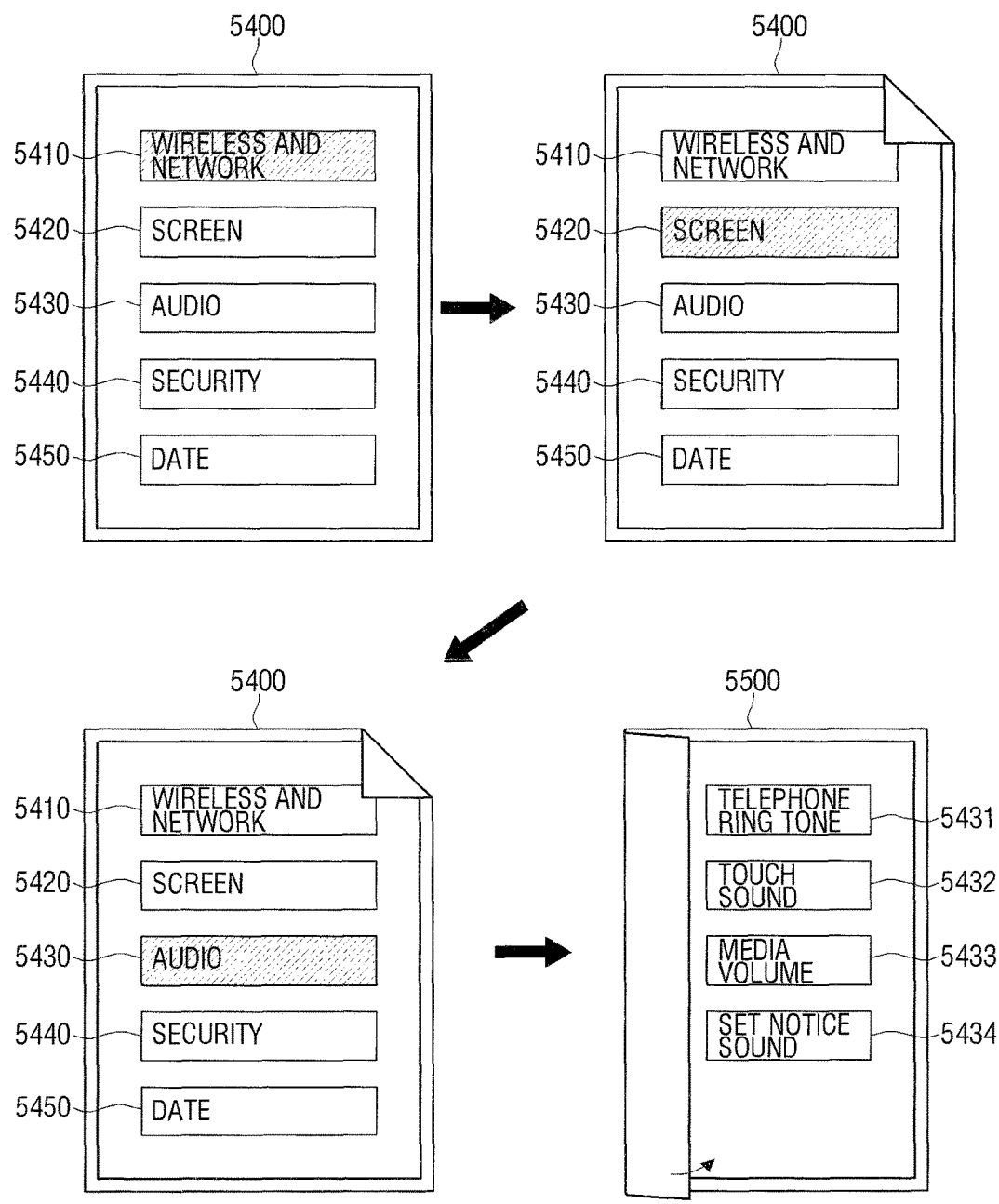

FIG. 54 is a view to illustrate a method for performing a menu navigation operation according to a bending shape in a flexible apparatus which includes a display 160 having a height length longer than a width length according to an embodiment of the present disclosure.

Referring to FIG. 54, the flexible apparatus 100 may display a menu screen 5400 which includes a plurality of menus. The menu screen 5400 may be displayed when a specific menu is selected or a specific bending shape occurs.

When bending is performed while the menu screen 5400 is displayed, the controller 120 may perform a menu navigation operation for a plurality of menus 5410 to 5450 according to a bending shape. The menu navigation operation includes various operations of identifying and selecting a menu such as a menu moving operation, a menu selecting operation, a menu page changing operation, a menu scroll operation, and a main and sub menus displaying operation.

The menu moving operation refers to an operation of moving a cursor or other selection marks between menus. The menu selecting operation refers to an operation of selecting one menu. The menu page changing operation refers to an operation of changing a current menu page to a previous menu page or a next menu page when the menus are arranged on a page basis. The menu scroll operation refers to an operation of scrolling the menus that are not displayed on the screen in one menu page to make them appear on the screen or disappear from the screen. The main and sub menu displaying operation refers to an operation of displaying sub menus belonging to one menu when the menu is selected, or displaying a main menu to which the menus belong.

Referring to FIG. 54, when the right upper corner is bent one time while the first menu 5410 is highlighted on the menu screen 5400, the menu moving operation is performed to move the highlight to the next menu 5420. When the right upper corner is bent one more time, the highlight is moved to the next menu 5430. In this state, when the left edge is bent, the highlighted menu 5430 is selected and a sub menu screen 5500 belonging to the menu 5430 is displayed. Sub-menus 5431 to 5434 belonging to the main menu 5430 are displayed on the sub menu screen 5500. One of the sub menus 5431 to 5434 is highlighted on the sub menu screen 5500. Accordingly, when the upper corner is bent again while the sub menu screen 5500 is displayed, the highlight is moved. When the left edge is bent while the highlight is displayed on one of the sub menus, the corresponding sub menu is selected and a UI screen corresponding to the selected sub menu is displayed.

Although not shown in FIG. 54, when many menus are displayed on the screen such that all of the menus cannot be displayed on one menu screen, the menu scroll operation may be performed by bending the upper edge or lower edge.

In the above example, the menus are displayed in the form of a list. However, when the menus are displayed in the form of icons, the menu navigation operation may be performed according to the bending shape. Although the right upper corner or left edge is bent in FIG. 54, the characteristics of the bending shapes and corresponding menu navigation operations may be matched with each other in various methods.

Various basic operations other than the menu navigation operation, such as zoom in, zoom out, channel changing, and volume control may be performed and controlled according to the bending shape.

In the above-described embodiments, the flexible apparatus 100 is a flat type. However, the flexible apparatus 100 is not necessarily in a flat type and may be implemented by using various types. Hereinafter, various examples of an exterior will be explained.

Figure 55:
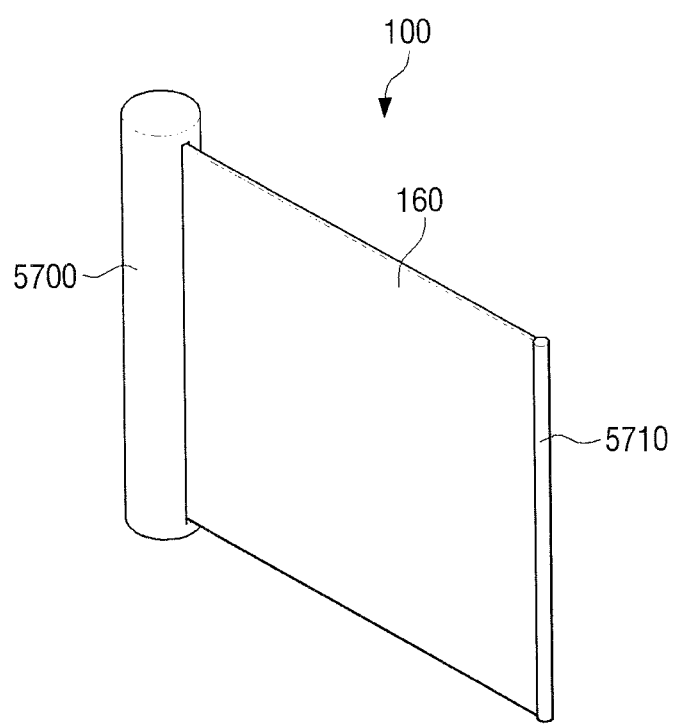
FIG. 55 is a view illustrating another example of an exterior of a flexible display apparatus according to an embodiment of the present disclosure.

FIG. 55 is a view illustrating an example of a detailed shape of an exterior of a flexible apparatus according to an embodiment of the present disclosure.

Referring to FIG. 55, the flexible apparatus 100 includes a body 5700, a display 160, and a grip part 5710.

The body 5700 serves as a kind of a case containing the display 160. When the flexible apparatus 100 includes various elements as shown in FIG. 42, the elements except for the display 160 and some sensors may be mounted in the body 5700.

The body 5700 includes a rotation roller (not shown) to roll the display 160. Accordingly, the display 160 is rolled around the rotation roller and is embedded in the body 5700 when the flexible apparatus 100 is not in use. When the user grips the grip part 5710 and pulls the display 160, the rotation roller is rotated in a direction opposite to the rolling direction so that the rolling is released, and the display 160 comes out from the body 5700. A stopper may be provided on the rotation roller. Accordingly, when the user pulls the grip part 5710 by more than a predetermined distance, the rotation of the rotation roller is stopped by the stopper and thus the display 160 is fixed.

The user may perform various functions using the display 160 which is exposed to the outside. When the user presses a button to release the stopper, the stopper is released and the rotation roller is rotated in a reverse direction, so that the display 160 is rolled into the body 5700. The stopper may be formed in a switch shape to stop an operation of a gear to rotate the rotation roller. Those that are used in a general rolling structure may be used as the rotation roller and the stopper, and thus detailed illustration and description thereof are omitted.

The body 5700 includes a power supply 180. The power supply 180 may be embodied in various forms such as a battery connection portion on which a disposable battery is mounted, a secondary cell which is reusable for a number of times by being charged by the user, or a solar cell which generates electricity using solar heat. When the power supply 180 is implemented by using the secondary cell, the user may connect the body 5700 to an external power source through a wire and may charge the power supply 180.

In FIG. 55, the body 5700 has a cylindrical shape. However, the body 5700 may have a rectangular shape or other polygonal shapes. The display 160 may also be embodied in other forms such as enclosing the body 5700, rather than being exposed to the outside from the body 5700 by being pulled.

Figure 56:
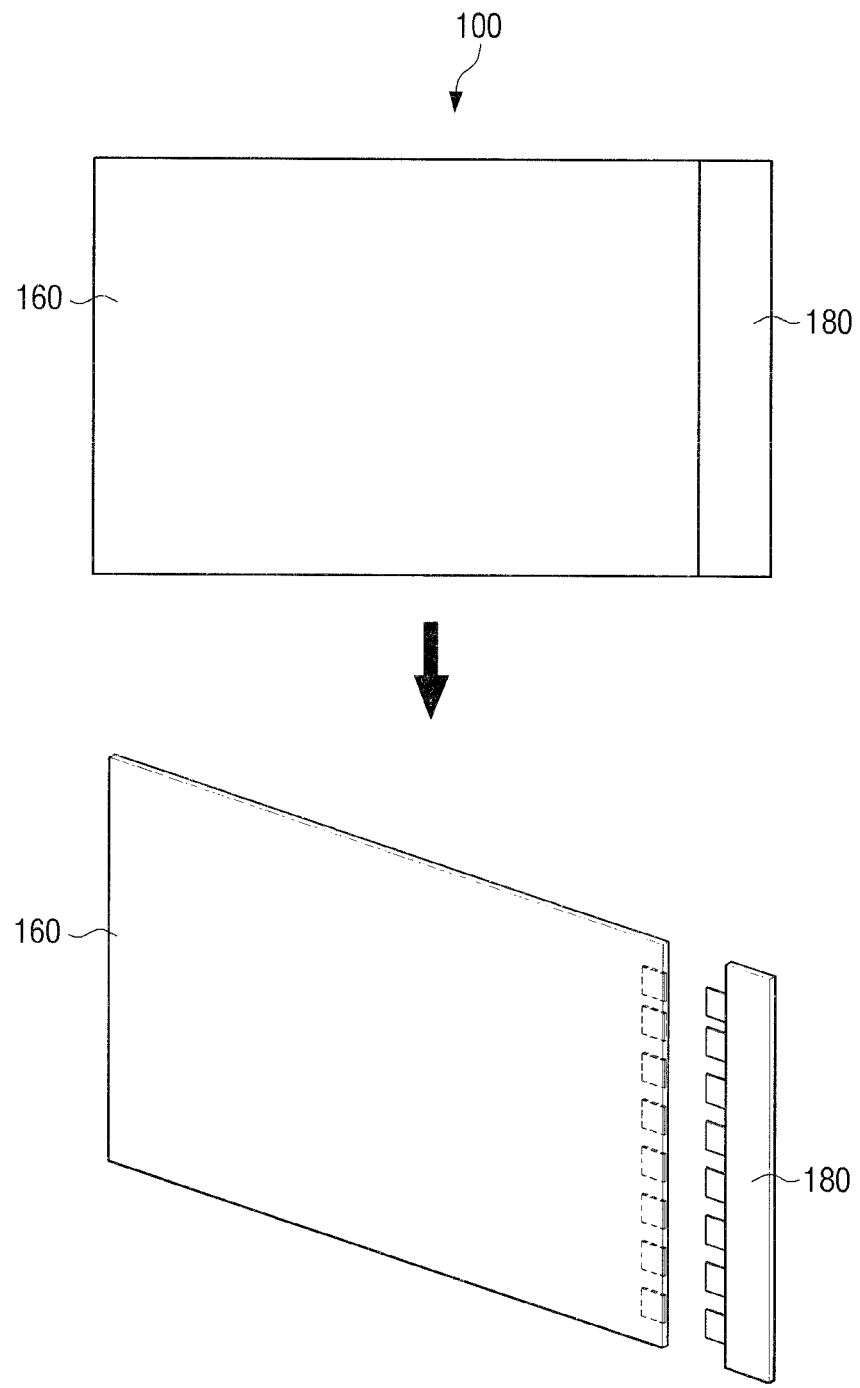
FIG. 56 is a view illustrating a shape of a flexible display apparatus where a power supply is attachable and detachable according to an embodiment of the present disclosure.

FIG. 56 is a view illustrating a flexible display apparatus in which a power supply is attached or detached according to an embodiment of the present disclosure.

Referring to FIG. 56, the power supply 180 is provided on one edge of the flexible apparatus to be attached to or detached from the flexible apparatus.

The power supply 180 is made of a flexible material and thus is bendable along with the display 160. The power supply 180 may include a cathode collector, a cathode electrode, an electrolyte, an anode electrode, an anode collector, and a sheath enclosing the aforementioned elements.

For example, the collector may be implemented by using an alloy such as TiNi having good elasticity, metal such as copper and aluminum, a conductive material such as metal coated with carbon, carbon, and a carbon fiber, or a conducting polymer such as polypyrole.

The cathode electrode may be manufactured by a negative electrode material such as metal such as lithium, natrium, zinc, magnesium, cadmium, hydrogen storage alloy, and lead, nonmetal such as carbon, and a high molecular electrode material such as organosulfur.

The anode electrode may be manufactured by a positive electrode material such as sulfur and metal sulfide, lithium transition metal oxide such as $LiCoO_2$, and a high molecular electrode material such as $SOCl_2$, $MnO_2$, $Ag_2O$, $Cl_2$, $NiCl_2$, and $NiOOH$. The electrolyte unit may be implemented in a gel form using PEO, PVdF, PMMA, and PVAC.

The sheath may use a general polymer resin. For example, PVC, HDPE, or epoxy may be used. In addition to (or instead of) these, any material that can prevent damage of a thread-type cell and is freely flexible or bendable may be used for the sheath.

Each of the anode electrode and the cathode electrode in the power supply 180 may include a connector to be electrically connected to an external source.

Referring to FIG. 56, the connector protrudes from the power supply 180 and a recess corresponding to a location, a size, and a shape of the connector is formed on the display 160. Accordingly, the power supply 180 is connected with the display 160 as the connector and the recess are connected to each other. The connector of the power supply 180 is connected to a power connection pad of the flexible display apparatus 100 to supply power to the flexible display apparatus 100.

Although the power supply 180 is attached to or detached from one edge of the flexible apparatus 100 in FIG. 56, this is merely an example. A location and a shape of the power supply 180 may be changed according to a product characteristic. For example, when the flexible apparatus 100 has a predetermined thickness, the power supply 180 may be mounted on a rear surface of the flexible apparatus 100.

Figure 57:
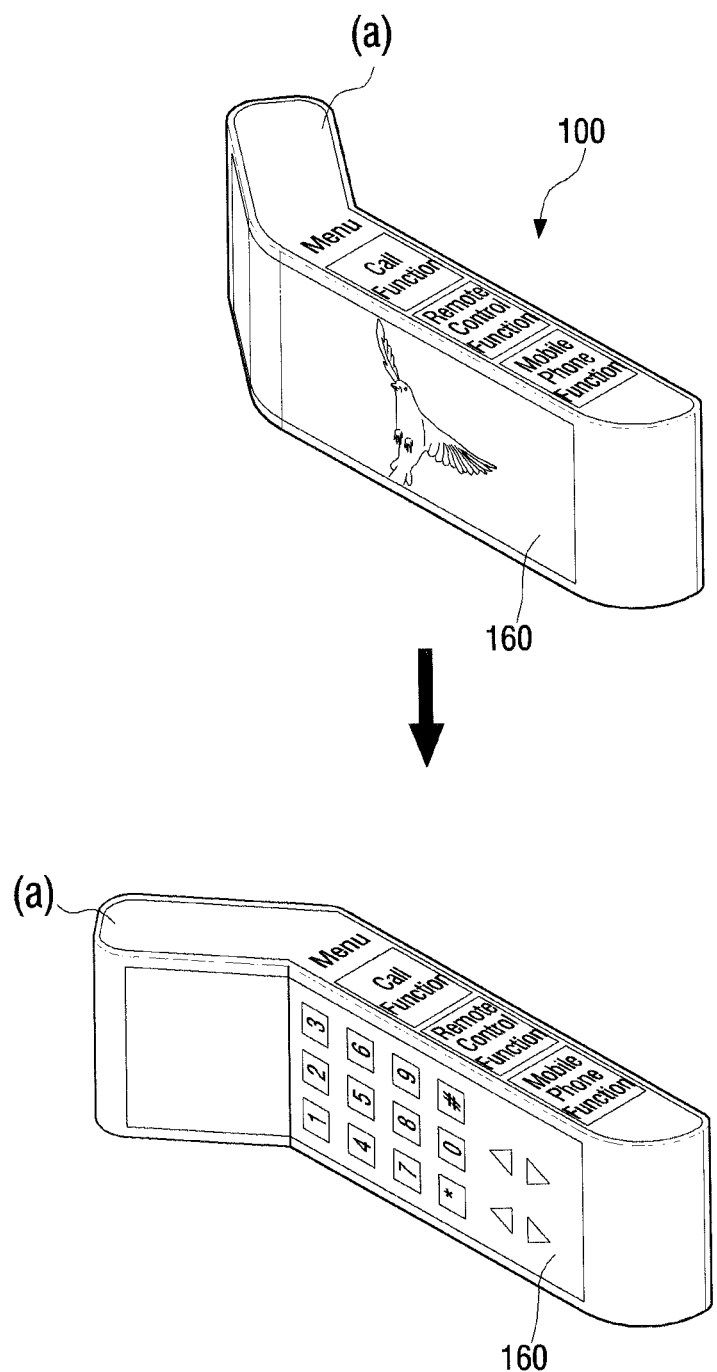
FIGS. 57 and 58 are views illustrating various examples of an exterior of a flexible display apparatus according to an embodiment of the present disclosure.

FIG. 57 is a view illustrating a flexible apparatus of a 3-dimensional structure rather than a flat panel structure according to an embodiment of the present disclosure.

Referring to FIG. 57, a display 160 is disposed on one side of the flexible display apparatus 100, and various hardware such as a button, a speaker, a microphone, and an IR lamp are provided on another side.

A whole outer case or a part of the outer case of the flexible apparatus 100 shown in FIG. 57 is made of rubber or other polymer resins, and is flexibly bendable. Accordingly, the whole flexible apparatus 100 or a part of the flexible apparatus 100 may have flexibility.

The flexible apparatus 100 may perform a new operation which is different from a previous operation when bending is performed. For example, the flexible apparatus 100, which normally performs a remote control function to control an external apparatus, may perform a calling function when one area is bent. When the remote control function is performed, a remote control button may be displayed on the display 160, and, when the calling function is performed, a dial pad may be displayed on the display 160.

Figure 58:
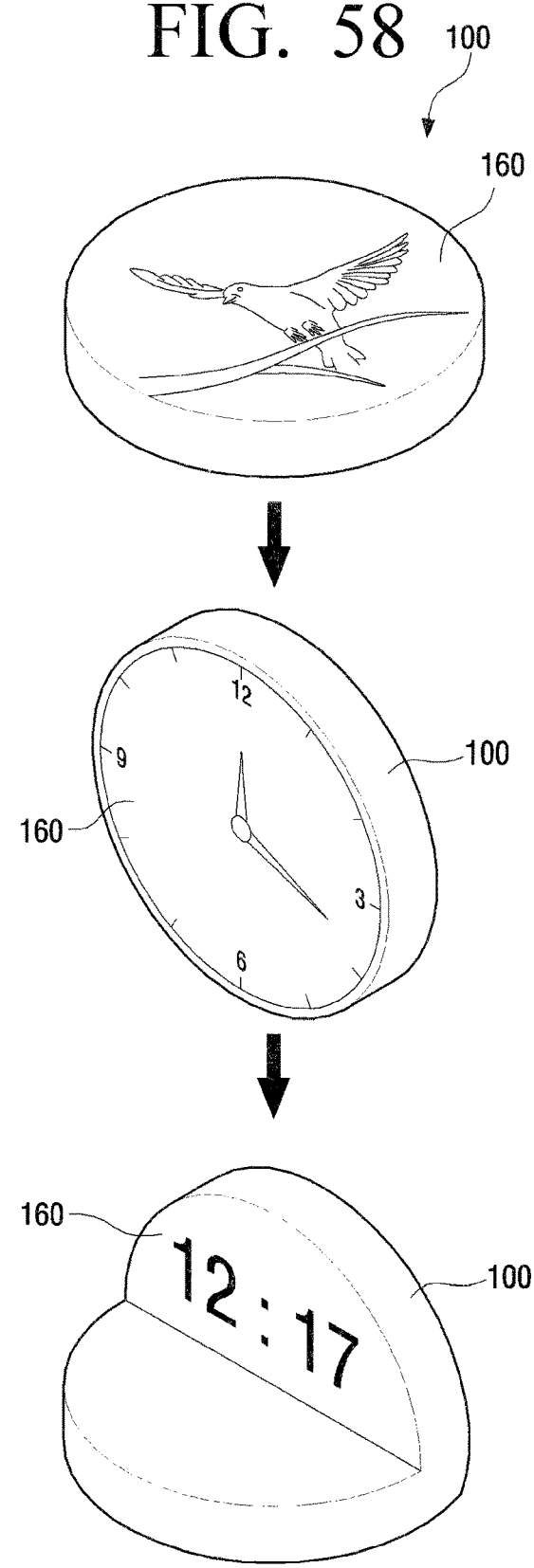

FIG. 58 illustrates a circular type flexible apparatus according to an embodiment of the present disclosure.

Referring to FIG. 58, a visually or functionally different operation may be performed according to a shape in which the flexible apparatus 100 is placed or folded. For instance, when the flexible apparatus is placed on a bottom horizontally, photos or other content are displayed, and, when the flexible display apparatus stands on the bottom in an upright position, a clock function is performed. When a center of the flexible display apparatus 100 is bent by 90°, a laptop PC function may be performed. In this case, one of the folded areas displays a soft keyboard and the other area displays a display window. In addition to (or instead of) these, the flexible apparatus may be embodied in various forms.

According to the above-described various embodiments, the flexible apparatus may determine various types of bending shapes using the plurality of motion sensors in addition to the sensors such as the bend sensors or touch sensors. When the bending shape is determined, the flexible apparatus may execute a function matched with the bending shape.

Figure 59:
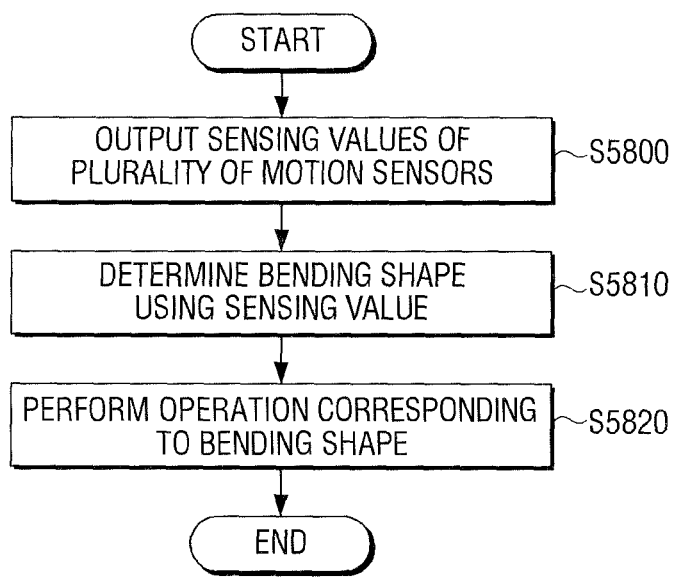
FIG. 59 is a flowchart illustrating a method for controlling an operation of a flexible apparatus according to an embodiment of the present disclosure.

FIG. 59 is a flowchart to illustrate a method for controlling an operation of a flexible apparatus according to various embodiments of the present disclosure.

Referring to FIG. 59, the plurality of motion sensors which are disposed on different locations over the entire surface of the flexible apparatus output sensing values at operation 55800.

The flexible apparatus 100 determines a bending shape using the sensing values at operation 55810. To determine the bending shape, the flexible apparatus 100 may determine at least one of a bending direction, a degree of bending, a bending area, and a bending shape by comparing results of sensing changes in positions by the plurality of motion sensors. The flexible apparatus 100 determines the bending shape by comparing results of the determining and bending shape information which is recorded on a database. The results of sensing the changes in the positions may include a pitch angle, a roll angle, and a yaw angle which are calculated based on the sensing values output from the motion sensors. The placement locations and configurations of the motion sensors, the method for calculating the pitch angle, the roll angle, and the yaw angle, and the method for determining the bending shape have been described above, and a redundant explanation is omitted.

Accordingly, an operation corresponding to the bending shape is performed at operation 55820. The bending shape may include various types of bending such as general bending, folding, multi-bending, bending and move, bending and flat, bending and hold, bending and twist, twist, swing, shaking and rolling. The operation of the flexible apparatus may vary according to bending characteristics such as a type of bending, a bending location, a bending direction, a degree of bending, a bending speed, a number of times that bending occurs, and a bending time, and an operation state of the flexible apparatus at the time when bending is performed.

For example, the flexible apparatus may terminate a function or application that has been executed, and may execute a new function or application. The flexible apparatus may also execute a sub function belonging to a currently executed function or application according to a bending shape. For example, as shown in FIGS. 46 and 47, a function that is supported by a currently executed application, such as channel changing or bookmarking, may be executed. In addition, the flexible apparatus may convert an operation mode according to a bending shape. For example, when bending is performed while the flexible apparatus is operated in one of a camera mode and a video recording mode, the mode may be converted into the other mode of the camera mode and the video recording mode. A screen layout may also be changed according to a bending shape. A new screen may be displayed on an area that is delineated by a bending shape, or objects displayed on the screen such as an image, a photo, a text, and an icon may slide in a tilting direction according to a bending shape.

Various operations corresponding to bending shapes have been described in detail in the above-described embodiments, and thus additional illustration and explanation are not provided.

In an embodiment in which elements to sense a user manipulation such as a touch sensor, a button, a pressure sensor, a grip sensor, and a proximity sensor are further provided, the method for controlling the operation of the flexible apparatus may further include controlling an activation state of each of the plurality of motion sensors according to whether a user manipulation is sensed or not.

When the bending sensor is further included and a predetermined calibration shape is sensed, the method for controlling the operation of the flexible apparatus may further include calculating a compensation value based on the sensing value output from the bend sensor while the calibration shape is sensed, and compensating for the sensing value of the bend sensor using the compensation value.

The method for determining the bending shape and the method for controlling the operation of the flexible apparatus according to the above-described various embodiments may be implemented by using a program and provided to the flexible display apparatus.

A non-transitory computer readable medium, which stores a program for performing the method including: outputting sensing values of a plurality of motion sensors mounted in a body of a flexible apparatus, determining a bending shape of the body using the sensing values of the plurality of motion sensors, and performing an operation corresponding to the bending shape, may be provided.

The non-transitory computer readable medium refers to a medium that stores data semi-permanently rather than storing data for a very short time, such as a register, a cache, and a memory, and is readable by an apparatus. The above-described various applications or programs may be stored in a non-transitory computer readable medium such as a Compact Disc (CD), a Digital Versatile Disk (DVD), a hard disk, a Blu-ray disk, a Universal Serial Bus (USB), a memory card, and a Read Only Memory (ROM).

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A flexible apparatus comprising:
a memory;
a touch sensor;
a plurality of motion sensors disposed in a plurality of locations of the flexible apparatus, respectively; and
a processor configured to:
activate at least one of the plurality of motion sensors based on a touch input being sensed by the touch sensor,
identify a bending shape of the flexible apparatus among a predetermined plurality of bending shapes based on a change in motion sensed by the at least one of the activated plurality of motion sensors, and
perform an operation corresponding to the identified bending shape based on operation information corresponding to the identified bending shape of the flexible apparatus stored in the memory.

2. The flexible apparatus as claimed in claim 1, wherein the identified bending shape comprises a degree of bending and a bending direction.

3. The flexible apparatus as claimed in claim 1, wherein each of the plurality of motion sensors is configured to sense a change in a position with reference to at least one of 3D space axes.

4. The flexible apparatus as claimed in claim 1, wherein the plurality of motion sensors are disposed on corner areas of the flexible apparatus.

5. The flexible apparatus as claimed in claim 1, wherein the plurality of motion sensors comprise:
   a first motion sensor disposed on a center of a first edge area from among edge areas of the flexible apparatus; and
   a second motion sensor disposed on a center of a second edge area which is opposite the first edge area from among the edge areas of the flexible apparatus.

6. The flexible apparatus as claimed in claim 1,
   wherein the processor is configured to:
   in response to the touch input being sensed by the touch sensor while the plurality of motion sensors are in an inactive state, activate the plurality of motion sensors, and
   in response to a predetermined time being elapsed after the touch input is sensed by the touch sensor, deactivate the activated plurality of motion sensors.

7. The flexible apparatus as claimed in claim 1, further comprising:
   a bend sensor configured to sense a bending state of the flexible apparatus,
   wherein the processor is configured to identify the bending shape based on an output value of the bend sensor and the change in motion sensed by at least one of the plurality of motion sensors.

8. The flexible apparatus as claimed in claim 7, wherein, based on a predetermined calibration shape being sensed, the processor is configured to calculate a compensation value using the output value of the bend sensor while the predetermined calibration shape is sensed, and compensate for the output value of the bend sensor based on the compensation value.

9. The flexible apparatus as claimed in claim 1, wherein the plurality of motion sensors comprise at least one of an acceleration sensor, a geomagnetic sensor, or a gyro sensor.

10. The flexible apparatus as claimed in claim 1, further comprising a flexible display configured to display a screen of the flexible display corresponding to the bending shape.

11. A method for controlling an operation of a flexible apparatus, the method comprising:
   activating at least one of a plurality of motion sensors based on a touch input being sensed by a touch sensor;
   identifying a bending shape of the flexible apparatus among a predetermined plurality of bending shapes based on a change in motion sensed by the at least one of the activated plurality of motion sensors; and
   performing an operation corresponding to the identified bending shape based on operation information corresponding to the identified bending shape of the flexible apparatus stored in a memory.

12. The method as claimed in claim 11,
   wherein the identified bending shape comprises a degree of bending and a bending direction.

13. The method as claimed in claim 11,
   wherein each of the plurality of motion sensors is configured to sense a change in a position with reference to at least one of 3D space axes.

14. The method as claimed in claim 11, wherein the plurality of motion sensors are disposed on corner areas of the flexible apparatus.

15. The method as claimed in claim 11, wherein the plurality of motion sensors comprise:
   a first motion sensor disposed on a center of a first edge area from among edge areas of the flexible apparatus; and
   a second motion sensor disposed on a center of a second edge area which is opposite the first edge area from among the edge areas of the flexible apparatus.

16. The method as claimed in claim 11, further comprising:
   in response to a touch input being sensed by the touch sensor while the plurality of motion sensors are in an inactive state, activating the plurality of motion sensors,
   in response to a predetermined time being elapsed after the touch input is sensed by the touch sensor, deactivating the activated plurality of motion sensors.

17. The method as claimed in claim 11,
   wherein the flexible apparatus comprises a bend sensor configured to sense a bending state of the flexible apparatus, and
   wherein the identifying of the bending shape comprises identifying the bending shape based on an output value of the bend sensor and the change in motion sensed by at least one of the plurality of motion sensors.

18. The method as claimed in claim 17, further comprising:
   based on a predetermined calibration shape being sensed, calculating a compensation value using a sensing value of the bend sensor while the predetermined calibration shape is sensed; and
   compensating for the sensing value of the bend sensor based on the compensation value.

19. The method as claimed in claim 11, wherein the plurality of motion sensors comprise at least one of an acceleration sensor, a geomagnetic sensor, or a gyro sensor.

20. The method as claimed in claim 11, further comprising displaying a screen corresponding to the bending shape.

* * * * *